(12) United States Patent
Honda et al.

(10) Patent No.: US 7,865,767 B2
(45) Date of Patent: Jan. 4, 2011

(54) STORAGE SYSTEM AND METHOD FOR COPYING DATA TO PLURALITY OF SITES

(75) Inventors: Yoshihisa Honda, Odawara (JP); Kenichi Miki, Odawara (JP); Tomoki Shoji, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 11/968,222

(22) Filed: Jan. 2, 2008

(65) Prior Publication Data

US 2008/0301492 A1    Dec. 4, 2008

(30) Foreign Application Priority Data

May 30, 2007    (JP)    ............................. 2007-143085

(51) Int. Cl.
*G06F 12/00* (2006.01)

(52) U.S. Cl. ............................ 714/6; 714/5; 711/162; 710/38

(58) Field of Classification Search .................... 714/6; 711/114, 16, 2; 710/38
See application file for complete search history.

(56) References Cited

U.S. PATENT DOCUMENTS

| | | | |
|---|---|---|---|
| 7,325,111 B1 * | 1/2008 | Jiang et al. | 711/162 |
| 7,343,514 B2 * | 3/2008 | Yamato et al. | 714/6 |
| 2001/0050915 A1 * | 12/2001 | O'Hare et al. | 370/400 |
| 2003/0014433 A1 * | 1/2003 | Teloh et al. | 707/204 |
| 2003/0177321 A1 * | 9/2003 | Watanabe | 711/161 |
| 2003/0191627 A1 * | 10/2003 | Au | 704/9 |
| 2003/0229764 A1 * | 12/2003 | Ohno et al. | 711/147 |
| 2004/0064543 A1 * | 4/2004 | Ashutosh et al. | 709/224 |
| 2005/0114730 A1 * | 5/2005 | Iwamura et al. | 714/13 |
| 2005/0119000 A1 * | 6/2005 | Nasielski et al. | 455/433 |
| 2005/0166016 A1 * | 7/2005 | Morimoto | 711/114 |
| 2005/0166018 A1 | 7/2005 | Miki | |
| 2006/0010300 A1 * | 1/2006 | Arakawa et al. | 711/162 |
| 2006/0047664 A1 * | 3/2006 | Suzuki et al. | 707/10 |
| 2007/0038824 A1 | 2/2007 | Suishu et al. | |
| 2007/0078809 A1 * | 4/2007 | Semkow et al. | 707/2 |
| 2007/0263554 A1 * | 11/2007 | Finn | 370/256 |
| 2008/0072001 A1 * | 3/2008 | Ashour et al. | 711/162 |

FOREIGN PATENT DOCUMENTS

| | | |
|---|---|---|
| JP | 2005-84953 | 3/2005 |
| JP | 200584953 | 3/2005 |
| JP | 2005-215885 | 8/2005 |

* cited by examiner

*Primary Examiner*—Scott T Baderman
*Assistant Examiner*—Chae Ko
(74) *Attorney, Agent, or Firm*—Brundidge & Stanger, P.C.

(57) ABSTRACT

A storage system of the present invention carries out remote copying among a plurality of sites, detects a new copy path when a failure occurs, and resumes remote copying. The storage system comprises a plurality of sites. Each site comprises a host and a storage controller. The controller of each site comprises a copy controller, a failure detector, a candidate detector, and a resume controller. The failure detector detects a failure that occurs in a remote copy configuration. The candidate detector detects a candidate for a copy path. The resume controller resumes remote copying using any one copy path from among copy path candidates detected in the respective sites.

18 Claims, 54 Drawing Sheets

FIG. 5
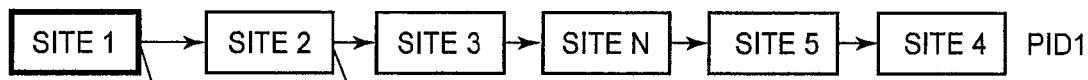
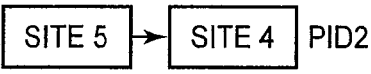
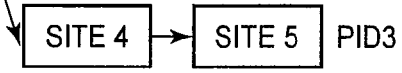
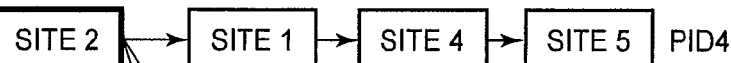
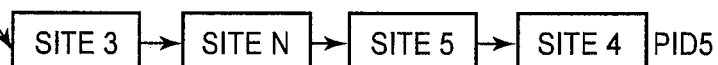
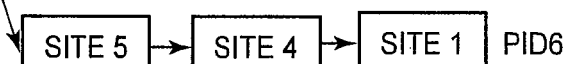
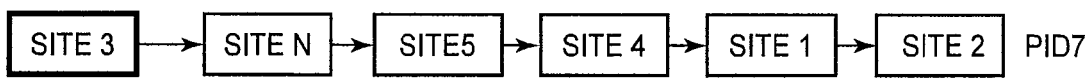
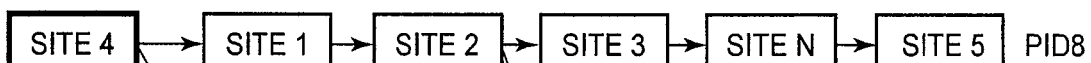
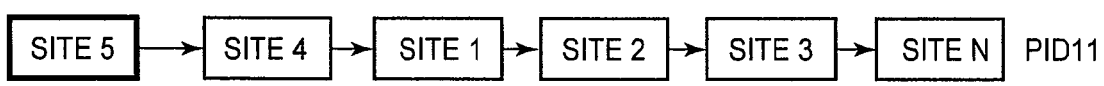
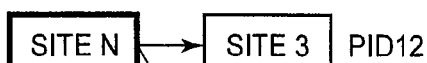
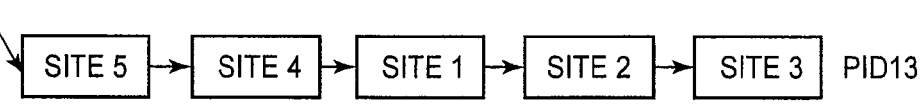

FIG. 6

COPY-TARGET INFORMATION TABLE (SITE 1) — T1(1)

| COPY SOURCE | NO. OF COPY-TARGET SITES | COPY-TARGET |
|---|---|---|
| SITE 1 | 2 | SITE 2 |
| | | SITE 4 |

↑ C11  C12  C13

COPY-TARGET INFORMATION TABLE (SITE 2) — T1(2)

| COPY SOURCE | NO. OF COPY-TARGET SITES | COPY-TARGET |
|---|---|---|
| SITE 2 | 2 | SITE 1 |
| | | SITE 3 |
| | | SITE 5 |

COPY-TARGET INFORMATION TABLE (SITE 3) — T1(3)

| COPY SOURCE | NO. OF COPY-TARGET SITES | COPY-TARGET |
|---|---|---|
| SITE 3 | 1 | SITE N |

COPY-TARGET INFORMATION TABLE (SITE 4) — T1(4)

| COPY SOURCE | NO. OF COPY-TARGET SITES | COPY-TARGET |
|---|---|---|
| SITE 4 | 2 | SITE 1 |
| | | SITE 5 |

COPY-TARGET INFORMATION TABLE (SITE 5) — T1(5)

| COPY SOURCE | NO. OF COPY-TARGET SITES | COPY-TARGET |
|---|---|---|
| SITE 5 | 1 | SITE 4 |

COPY-TARGET INFORMATION TABLE (SITE N) — T1(N)

| COPY SOURCE | NO. OF COPY-TARGET SITES | COPY-TARGET |
|---|---|---|
| SITE N | 2 | SITE 3 |
| | | SITE 5 |

FIG. 7

SITE INFORMATION TABLE (PRIOR TO ARBITRATION START)

| C21 | C22 | C23 | C24 | C25 | C26 | C27 | C28 |
|---|---|---|---|---|---|---|---|
| NO. OF SITES | SITE # | IP ADDRESS | PRIORITY | LIFE DETERMINATION | TABLE CREATION FLAG | COUNT | PATH ID |
| N | SITE 1 | IP1 | PN1 | — | — | — | — |
|  | SITE 2 | IP2 | PN2 | — | — | — | — |
|  | SITE 3 | IP3 | PN3 | — | — | — | — |
|  | ⋮ | ⋮ | ⋮ | ⋮ | ⋮ | ⋮ | ⋮ |
|  | SITE N | IPN | PNn | — | — | — | — |

T2

SITE INFORMATION TABLE (DURING ARBITRATION)

| NO. OF SITES | SITE # | IP ADDRESS | PRIORITY | LIFE DETERMINATION | TABLE CREATION FLAG | COUNT | PATH ID |
|---|---|---|---|---|---|---|---|
| N | SITE 1 | IP1 | PN1 | OPERATION SUSPENDED | — | — | — |
|  | SITE 2 | IP2 | PN2 | IN OPERATION | CREATED | 4 | PID5 |
|  | SITE 3 | IP3 | PN3 | IN OPERATION | NOT CREATED | — | — |
|  | ⋮ | ⋮ | ⋮ | ⋮ | ⋮ | ⋮ | ⋮ |
|  | SITE N | IPN | PNn | IN OPERATION | CREATED | 2 | PID12 |

COPY PATH MANAGEMENT TABLE (SITE 2) T3(2)

| NO. OF COPY PATHS (C31) | PATH ID (C32) | COUNT (NO. OF SURVIVING SITES) (C33) | NEXT SITE PRIORITY (C34) |
|---|---|---|---|
| 3 | PID4 | 0 | — |
|  | PID5 | 4 | PN3 |
|  | PID6 | 2 | PN5 |

PATH CONFIGURATION TABLE (SITE 2) T4(2)

| PATH ID (C41) | NO. OF SITES ON PATH (C42) | FIRST CONNECTION-TARGET SITE (C43) | SECOND CONNECTION-TARGET SITE (C44) | THIRD CONNECTION-TARGET SITE (C45) | FOURTH CONNECTION-TARGET SITE (C46) | FIFTH CONNECTION-TARGET SITE (C47) |
|---|---|---|---|---|---|---|
| PID4 | 3 | 1 | 4 | 5 | — | — |
| PID5 | 4 | 3 | N | 5 | 4 | — |
| PID6 | 3 | 5 | 4 | 1 | — | — |

FIG. 9

COPY PATH MANAGEMENT TABLE (SITE N) T3(N)

| | C31 | C32 | C33 | C34 |
|---|---|---|---|---|
| | NO. OF COPY PATHS | PATH ID | COUNT (NO. OF SURVIVING SITES) | NEXT SITE PRIORITY |
| | 2 | PID12 | 1 | PN3 |
| | | PID13 | 2 | PN5 |

PATH CONFIGURATION TABLE (SITE 2) T4(N)

| C41 | C42 | C43 | C44 | C45 | C46 | C47 |
|---|---|---|---|---|---|---|
| PATH ID | NO. OF SITES ON PATH | FIRST CONNECTION-TARGET SITE | SECOND CONNECTION-TARGET SITE | THIRD CONNECTION-TARGET SITE | FOURTH CONNECTION-TARGET SITE | FIFTH CONNECTION-TARGET SITE |
| PID12 | 1 | 3 | — | — | — | — |
| PID13 | 5 | 5 | 4 | 1 | 2 | 3 |

FIG. 21

COPY-TARGET INFORMATION TABLE (SITE 1) — T1A(1)

| COPY SOURCE (C11) | NO. OF COPY-TARGET SITES (C12) | COPY-TARGET (C13) | WEIGHT (C14) |
|---|---|---|---|
| SITE 1 | 2 | SITE 2 | W1 |
|  |  | SITE 4 | W2 |

COPY-TARGET INFORMATION TABLE (SITE 2) — T1A(2)

| COPY SOURCE | NO. OF COPY-TARGET SITES | COPY-TARGET | WEIGHT |
|---|---|---|---|
| SITE 2 | 2 | SITE 1 | W3 |
|  |  | SITE 3 | W4 |
|  |  | SITE 5 | W5 |

COPY-TARGET INFORMATION TABLE (SITE 3) — T1A(3)

| COPY SOURCE | NO. OF COPY-TARGET SITES | COPY-TARGET | WEIGHT |
|---|---|---|---|
| SITE 3 | 1 | SITE N | W6 |

COPY-TARGET INFORMATION TABLE (SITE 4) — T1A(4)

| COPY SOURCE | NO. OF COPY-TARGET SITES | COPY-TARGET | WEIGHT |
|---|---|---|---|
| SITE 4 | 2 | SITE 1 | W7 |
|  |  | SITE 5 | W8 |

COPY-TARGET INFORMATION TABLE (SITE 5) — T1A(5)

| COPY SOURCE | NO. OF COPY-TARGET SITES | COPY-TARGET | WEIGHT |
|---|---|---|---|
| SITE 5 | 1 | SITE 4 | W9 |

COPY-TARGET INFORMATION TABLE (SITE N) — T1A(N)

| COPY SOURCE | NO. OF COPY-TARGET SITES | COPY-TARGET | WEIGHT |
|---|---|---|---|
| SITE N | 2 | SITE 3 | W10 |
|  |  | SITE 5 | W11 |

FIG. 22

SITE INFORMATION TABLE (PRIOR TO ARBITRATION START) T2A

| C21 | C22 | C23 | C24 | C25 | C26 | C27 | C29 | C28 |
|---|---|---|---|---|---|---|---|---|
| NO. OF SITES | SITE # | IP ADDRESS | PRIORITY | LIFE DETERMINATION | TABLE CREATION FLAG | COUNT | TOTAL WEIGHT VALUE | PATH ID |
| N | SITE 1 | IP1 | PN1 | — | — | — | — | — |
|  | SITE 2 | IP2 | PN2 | — | — | — | — | — |
|  | SITE 3 | IP3 | PN3 | — | — | — | — | — |
|  | ... | ... | ... | ... | ... | ... | ... | ... |
|  | SITE N | IPN | PNn | — | — | — | — | — |

FIG. 23

COPY PATH MANAGEMENT TABLE (SITE 2) — T3A(2)

| C31 | C32 | C33 | C35 | C34 |
|---|---|---|---|---|
| NO. OF COPY PATHS | PATH ID | COUNT (NO. OF SURVIVING SITES) | TOTAL VALUE OF WEIGHTS OF SITES | NEXT SITE PRIORITY |
| 3 | PID4 | 0 | W3+W2+W8 | — |
|  | PID5 | 4 | W4+W6+W11+W9 | PN3 |
|  | PID6 | 2 | W5+W9+W7 | PN5 |

PATH CONFIGURATION TABLE (SITE 2) — T4A(2)

| C41 | C42A | C43A | C44A | C45A | C46A | C47A |
|---|---|---|---|---|---|---|
| PATH ID | NO. OF SITES ON PATH | FIRST CONNECTION-TARGET SITE | SECOND CONNECTION-TARGET SITE | THIRD CONNECTION-TARGET SITE | FOURTH CONNECTION-TARGET SITE | FIFTH CONNECTION-TARGET SITE |
| PID4 | 3 | 1,W3 | 4,W2 | 5,W8 | — | — |
| PID5 | 4 | 3,W4 | N,W6 | 5,W11 | 4,W9 | — |
| PID6 | 5 | 5,W5 | 4,W9 | 1,W7 | — | — |

FIG. 32

COPY-TARGET INFORMATION TABLE (SITE 1) — T1B(1)

| COPY SOURCE (C11) | NO. OF COPY-TARGET SITES (C12) | COPY-TARGET (C13) | PENALTY (C14A) |
|---|---|---|---|
| SITE 1 | 2 | SITE 2 | PE1 |
|  |  | SITE 4 | PE2 |

COPY-TARGET INFORMATION TABLE (SITE 2) — T1B(2)

| COPY SOURCE | NO. OF COPY-TARGET SITES | COPY-TARGET | PENALTY |
|---|---|---|---|
| SITE 2 | 2 | SITE 1 | PE3 |
|  |  | SITE 3 | PE4 |
|  |  | SITE 5 | PE5 |

COPY-TARGET INFORMATION TABLE (SITE 3) — T1B(3)

| COPY SOURCE | NO. OF COPY-TARGET SITES | COPY-TARGET | PENALTY |
|---|---|---|---|
| SITE 3 | 1 | SITE N | PE6 |

COPY-TARGET INFORMATION TABLE (SITE 4) — T1B(4)

| COPY SOURCE | NO. OF COPY-TARGET SITES | COPY-TARGET | PENALTYT |
|---|---|---|---|
| SITE 4 | 2 | SITE 1 | PE7 |
|  |  | SITE 5 | PE8 |

COPY-TARGET INFORMATION TABLE (SITE 5) — T1B(5)

| COPY SOURCE | NO. OF COPY-TARGET SITES | COPY-TARGET | PENALTY |
|---|---|---|---|
| SITE 5 | 1 | SITE 4 | PE9 |

COPY-TARGET INFORMATION TABLE (SITE N) — T1B(N)

| COPY SOURCE | NO. OF COPY-TARGET SITES | COPY-TARGET | PENALTY |
|---|---|---|---|
| SITE N | 2 | SITE 3 | PE10 |
|  |  | SITE 5 | PE11 |

FIG. 33

SITE INFORMATION TABLE (PRIOR TO ARBITRATION START) — T2B

| C21 | C22 | C23 | C24 | C25 | C26 | C27 | C29A | C28 |
|---|---|---|---|---|---|---|---|---|
| NO. OF SITES | SITE # | IP ADDRESS | PRIORITY | LIFE DETERMINATION | TABLE CREATION FLAG | COUNT | TOTAL PENALTY VALUE | PATH ID |
| N | SITE 1 | IP1 | PN1 | — | — | — | — | — |
|  | SITE 2 | IP2 | PN2 | — | — | — | — | — |
|  | SITE 3 | IP3 | PN3 | — | — | — | — | — |
|  | ⋮ | ⋮ | ⋮ | ⋮ | ⋮ | ⋮ | ⋮ | ⋮ |
|  | SITE N | IPN | PNn | — | — | — | — | — |

FIG. 34

COPY PATH MANAGEMENT TABLE (SITE 2) T3B(2)

| C31 | C32 | C33 | C35A | C34 |
|---|---|---|---|---|
| NO. OF COPY PATHS | PATH ID | COUNT (NO. OF SURVIVING SITES) | TOTAL PENALTY VALUE | NEXT SITE PRIORITY |
| 3 | PID4 | 0 | PE3+PE2+PE8 | — |
|  | PID5 | 4 | PE4+PE6+PE11+PE9 | PN3 |
|  | PID6 | 2 | PE5+PE9+PE7 | PN5 |

PATH CONFIGURATION TABLE (SITE 2) T4B(2)

| C41 | C42A | C43A | C44A | C45A | C46A | C47A |
|---|---|---|---|---|---|---|
| PATH ID | NO. OF SITES ON PATH | FIRST CONNECTION-TARGET SITE | SECOND CONNECTION-TARGET SITE | THIRD CONNECTION-TARGET SITE | FOURTH CONNECTION-TARGET SITE | FIFTH CONNECTION-TARGET SITE |
| PID4 | 3 | 1,PE3 | 4,PE2 | 5,PE8 | — | — |
| PID5 | 4 | 3,PE4 | N,PE6 | 5,PE11 | 4,PE9 | — |
| PID6 | 3 | 5,PE5 | 4,PE9 | 1,PE7 | — | — |

FIG. 38

| COPY-TARGET INFORMATION TABLE (SITE 1) | | | | T1D(1) |
|---|---|---|---|---|
| C11 | C12 | C13 | C14D | |
| COPY SOURCE | NO. OF COPY-TARGET SITES | COPY-TARGET | DATA REFLECTION TIME | |
| SITE 1 | 2 | SITE 2 | TR1 | |
| | | SITE 4 | TR2 | |

| COPY-TARGET INFORMATION TABLE (SITE 2) | | | | T1D(2) |
|---|---|---|---|---|
| COPY SOURCE | NO. OF COPY-TARGET SITES | COPY-TARGET | DATA REFLECTION TIME | |
| SITE 2 | 2 | SITE 1 | TR3 | |
| | | SITE 3 | TR4 | |
| | | SITE 5 | TR5 | |

| COPY-TARGET INFORMATION TABLE (SITE 3) | | | | T1D(3) |
|---|---|---|---|---|
| COPY SOURCE | NO. OF COPY-TARGET SITES | COPY-TARGET | DATA REFLECTION TIME | |
| SITE 3 | 1 | SITE N | TR6 | |

| COPY-TARGET INFORMATION TABLE (SITE 4) | | | | T1D(4) |
|---|---|---|---|---|
| COPY SOURCE | NO. OF COPY-TARGET SITES | COPY-TARGET | DATA REFLECTION TIME | |
| SITE 4 | 2 | SITE 1 | TR7 | |
| | | SITE 5 | TR8 | |

| COPY-TARGET INFORMATION TABLE (SITE 5) | | | | T1D(5) |
|---|---|---|---|---|
| COPY SOURCE | NO. OF COPY-TARGET SITES | COPY-TARGET | DATA REFLECTION TIME | |
| SITE 5 | 1 | SITE 4 | TR9 | |

| COPY-TARGET INFORMATION TABLE (SITE N) | | | | T1D(N) |
|---|---|---|---|---|
| COPY SOURCE | NO. OF COPY-TARGET SITES | COPY-TARGET | DATA REFLECTION TIME | |
| SITE N | 2 | SITE 3 | TR10 | |
| | | SITE 5 | TR11 | |

FIG. 39

SITE INFORMATION TABLE (PRIOR TO ARBITRATION START) T2D

| NO. OF SITES C21 | SITE # C22 | IP ADDRESS C23 | PRIORITY | LIFE DETERMINATION C24 | TABLE CREATION FLAG C25 | C26 COUNT | C27 TOTAL REFLECTION TIME VALUE | C29D PATH ID C28 |
|---|---|---|---|---|---|---|---|---|
| N | SITE 1 | IP1 | PN1 | — | — | — | — | — |
|  | SITE 2 | IP2 | PN2 | — | — | — | — | — |
|  | SITE 3 | IP3 | PN3 | — | — | — | — | — |
|  | ⋮ | ⋮ | ⋮ | ⋮ | ⋮ | ⋮ | ⋮ | ⋮ |
|  | SITE N | IPN | PNn | — | — | — | — | — |

FIG. 40

COPY PATH MANAGEMENT TABLE (SITE 2) T3D(2)

| C31 | C32 | C33 | C35D | C34 |
|---|---|---|---|---|
| NO. OF COPY PATHS | PATH ID | COUNT (NO. OF SURVIVING SITES) | TOTAL REFLECTION TIME VALUE | NEXT SITE PRIORITY |
| 3 | PID4 | 0 | TR3+TR2+TR8 | — |
| | PID5 | 4 | TR4+TR6+TR11+TR9 | PN3 |
| | PID6 | 2 | TR5+TR9+TR7 | PN5 |

PATH CONFIGURATION TABLE (SITE 2) T4D(2)

| C41 | C42 | C43D | C44D | C45D | C46D | C47D |
|---|---|---|---|---|---|---|
| PATH ID | NO. OF SITES ON PATH | FIRST CONNECTION-TARGET SITE | SECOND CONNECTION-TARGET SITE | THIRD CONNECTION-TARGET SITE | FOURTH CONNECTION-TARGET SITE | FIFTH CONNECTION-TARGET SITE |
| PID4 | 3 | 1,TR3 | 4,TR2 | 5,TR8 | — | — |
| PID5 | 4 | 3,TR4 | N,TR6 | 5,TR11 | 4,TR9 | — |
| PID3 | 5 | 5,TR5 | 4,TR9 | 1,TR7 | — | — |

FIG. 44

COPY-TARGET INFORMATION TABLE (SITE 1) — T1E(1)

| C11<br>COPY SOURCE | C12<br>NO. OF COPY-TARGET SITES | C13<br>COPY-TARGET | C14E<br>RECOVERY TIME |
|---|---|---|---|
| SITE 1 | 2 | SITE 2 | TR1 |
|  |  | SITE 4 | TR2 |

COPY-TARGET INFORMATION TABLE (SITE 2) — T1E(2)

| COPY SOURCE | NO. OF COPY-TARGET SITES | COPY-TARGET | RECOVERY TIME |
|---|---|---|---|
| SITE 2 | 2 | SITE 1 | TR3 |
|  |  | SITE 3 | TR4 |
|  |  | SITE 5 | TR5 |

COPY-TARGET INFORMATION TABLE (SITE 3) — T1E(3)

| COPY SOURCE | NO. OF COPY-TARGET SITES | COPY-TARGET | RECOVERY TIME |
|---|---|---|---|
| SITE 3 | 1 | SITE N | TR6 |

COPY-TARGET INFORMATION TABLE (SITE 4) — T1E(4)

| COPY SOURCE | NO. OF COPY-TARGET SITES | COPY-TARGET | RECOVERY TIME |
|---|---|---|---|
| SITE 4 | 2 | SITE 1 | TR7 |
|  |  | SITE 5 | TR8 |

COPY-TARGET INFORMATION TABLE (SITE 5) — T1E(5)

| COPY SOURCE | NO. OF COPY-TARGET SITES | COPY-TARGET | RECOVERY TIME |
|---|---|---|---|
| SITE 5 | 1 | SITE 4 | TR9 |

COPY-TARGET INFORMATION TABLE (SITE N) — T1E(N)

| COPY SOURCE | NO. OF COPY-TARGET SITES | COPY-TARGET | RECOVERY TIME |
|---|---|---|---|
| SITE N | 2 | SITE 3 | TR10 |
|  |  | SITE 5 | TR11 |

FIG. 47

COPY PATH MANAGEMENT TABLE (SITE 1) T3F(1)

| C31 | C32 | C33 | C34 |
|---|---|---|---|
| NO. OF COPY PATHS | PATH ID | COUNT (NO. OF SURVIVING SITES) | NEXT SITE PRIORITY |
| 2 | PID101 | | |
|  | PID102 | | |

PATH CONFIGURATION TABLE (SITE 1) T4F(1)

| C41 | C42 | C43 | C44 | C45 |
|---|---|---|---|---|
| PATH ID | NO. OF SITES ON PATH | FIRST CONNECTION-TARGET SITE | SECOND CONNECTION-TARGET SITE | THIRD CONNECTION-TARGET SITE |
| PID101 | 5 | 2 | 3 | N |
|  |  | 4 | 5 | — |
| PID102 | 5 | 2 | 3 | N |
|  |  | 4 | 5 | — |

STORAGE SYSTEM AND METHOD FOR COPYING DATA TO PLURALITY OF SITES

CROSS-REFERENCE TO RELATED APPLICATIONS

This application relates to and claims priority from Japanese Patent Application No. 2007-143085 filed on May 30, 2007, the entire disclosure of which is incorporated herein by reference.

BACKGROUND OF THE INVENTION

1. Field of the Invention

The present invention relates to a storage system and a method for copying data among a plurality of sites.

2. Description of the Related Art

A storage system, for example, comprises at least one storage controller, called a disk array subsystem or the like, and provides data storage services to a host computer (hereinafter, "host"). A storage controller, for example, can arrange a large number of disk drives in an array, and can construct a storage area based on RAID (Redundant Array of Independent Disks).

Further, as with so-called disaster recovery systems, it is also possible to install a backup site in a distant location from a main site in preparation for a regional-scale disaster. A backup storage controller is installed at the backup site, and the same data groups as the main site are stored in this storage controller.

In a first prior art, it is possible to prepare for a regional-scale disaster by remote copying data from the storage controller of the main site to another storage controller at a backup site (Japanese Patent Laid-open No. 2005-215885). Consequently, even if the main site is shut down due to failure, data processing services can be continued using the backup site. However, if a failure should occur at the only backup site before the main site recovers, data processing services can no longer be provided to the host.

Accordingly, a second prior art is proposed by which a plurality of backup sites are provided so that system redundancy can be ensured even when the main site is down (Japanese Patent Laid-open No. 2005-84953). In this second prior art, a plurality of secondary storage controllers are respectively connected to a primary storage controller as disclosed in paragraph numbers 0008 through 0010 thereof. When the storage content of the primary storage controller is updated, this updated content is immediately sent to one of the secondary storage controllers, and reflected in the storage content of the one secondary storage controller. Further, the storage content of the primary storage controller is stored as journal data, and the other secondary storage controller arbitrarily reads out this journal data and reflects same in its own storage content. Then, the one secondary storage controller creates journal data based on a data update command from the main storage controller, and stores this journal data. When the main storage controller goes down, the other secondary storage controller reads out journal data from the one secondary storage controller, and updates its own storage content.

In the prior art, data copies are maintained by either two sites or three sites, thereby making it possible to heighten resistance to disasters and the like. However, even when three sites are provided, the reliability of data protection decreases if any one or two of the sites fail. Accordingly, it will most likely be necessary to maintain copies of data at more numerous sites in order to heighten data protection reliability.

In the case of a constitution in which a copy path for remote copying is established between a plurality of sites, and data is copied to the respective sites, if a failure occurs in a portion of the sites or in the communication path between sites, it is necessary to reconfigure the copy path using normal sites and communication paths. However, the more numerous the sites involved in remote copying, the more difficult it is to reconfigure a copy path subsequent to a failure occurring. This is because of the need to reconfigure the copy path taking into account the order of data written from the host, and the direction of remote copying.

SUMMARY OF THE INVENTION

With the foregoing in mind, an object of the present invention is to provide a storage system and method for copying data among a plurality of sites constituted so as to enable a copy path spanning a plurality of sites to be reconfigured relatively quickly and to maintain reliability even when the number of sites involved in data copying increases. Other objects of the present invention should become clear from the descriptions of the embodiments explained below.

To solve for the above-mentioned problem, a storage system having a plurality of sites, which conforms with one aspect of the present invention, comprises communication paths, which are respectively set in advance between a prescribed plurality of sites of the respective sites; a copy controller for copying data among a plurality of sites pre-selected from the respective sites via a copy path, which is constituted using the pre-selected plurality of sites and a plurality of communication paths pre-selected from the respective communication paths; a failure detector for detecting whether or not a failure has occurred during data copying by the copy controller; a candidate detector, which detects at least one copy path candidate when the failure occurrence has been detected by the failure detector; and a resume controller, which when there are a plurality of copy path candidates detected by the candidate detector, selects one new copy path from among the plurality of copy path candidates, and resumes the data copy by the copy controller using this new copy path.

In an embodiment of the present invention, the copy controller, failure detector, candidate detector, and resume controller are provided in each of the plurality of sites.

In an embodiment of the present invention, the failure detector detects the occurrence of a failure based on at least one of the presence or absence of a heart beat signal, which is communicated by the respective sites, and the success or failure of communication related to the data copying.

In an embodiment of the present invention, the candidate detector detects at least one path available for data copying based on information related to available communication paths and available sites, respectively evaluates these detected available paths based on a preset first evaluation criterion, and detects the available candidate for which the evaluation result is the best as the copy path candidate.

In an embodiment of the present invention, when a plurality of available paths have the same evaluation result according to the first evaluation criterion, the candidate detector detects any one available path as the copy path candidate in accordance with a preset second evaluation criterion.

In an embodiment of the present invention, the first evaluation criterion is the size of the number of the sites included in the available path, and the better evaluation results are obtained as the number of sites included in the available path increases.

In an embodiment of the present invention, the first evaluation criterion is the size of a weight preset for either the sites or the communication paths included in the available paths.

In an embodiment of the present invention, the first evaluation criterion is the level of priority or the size of penalty preset on either the sites or the communication paths included in the available paths.

As the weight, at least one of the time required until data is stored in a site comprising an available path, and the time required to recover a site comprising an available path can be used.

In an embodiment of the present invention, the second evaluation criterion is the size of the weight preset for either the sites or communication paths included in the available paths.

In an embodiment of the present invention, the second evaluation criterion is the level of priority or the size of penalty preset on either the sites or the communication paths included in the available paths.

In an embodiment of the present invention, when there are a plurality of candidate detectors, and when the candidate detectors each detect a copy path candidate, the resume controller evaluates the respective copy path candidates based on a preset third evaluation criterion, and selects as the new copy path the copy path candidate for which the evaluation result is the best.

In an embodiment of the present invention, the third evaluation criterion is the size of the number of the sites included in the copy path candidates, and the better evaluation results are obtained as the number of sites included in the copy path candidate increases.

In an embodiment of the present invention, the third evaluation criterion is the size of the weight preset for either the sites or communication paths included in the copy path candidates.

In an embodiment of the present invention, the third evaluation criterion is the level of priority or the size of penalty preset for either the sites or the communication paths included in the copy path candidates.

The resume controller can also comprise a diagnostic unit for diagnosing the availability of the selected new copy path. The diagnostic unit allows the use of the selected new copy path when the number of sites included in the selected new copy path exceeds a preset prescribed value.

An embodiment of the present invention comprises a simulation unit, which simulates the occurrence of a failure for each element of a copy path, and which evaluates a new copy path capable of being selected when this simulated failure occurs.

In a storage system having N sites (where N is a natural number of not less than 4), which conforms to another aspect of the present invention, (1) the sites each comprise a storage controller, which reads and writes data from and to a storage device based on an access request from an external device, (2) first communication paths for copying data in a preset direction are established between prescribed sites of the respective sites, (3) the respective sites are mutually connected via a second communication path for exchanging with other sites management information for use in data copying, and (4) the storage controller is respectively provided with a copy controller for copying data in a prescribed order among respective storage controllers inside a pre-selected plurality of sites of the respective sites via a copy path constituted from the pre-selected plurality of storage controllers and a pre-selected plurality of first communications paths of the respective first communication paths; a failure detector for detecting whether or not a failure has occurred during data copying by the copy controller; a candidate detector for detecting at least one copy path candidate which has its own site as the starting point based on the management information collected from the respective storage controllers inside other sites via the second communication path and a preset first evaluation criterion and a second evaluation criterion, when the failure occurrence has been detected by the failure detector; and a resume controller, which, by acquiring via the second communication path the respective copy path candidates detected in the respective storage controllers inside the other respective sites, selects any one of the copy path candidates, from among the copy path candidate detected in its own site and the respective copy path candidates detected in the other respective sites, as a new copy path based on the third evaluation criterion, and when the number of storage controllers included in the selected new copy path exceeds a preset prescribed value, resumes the data copy by the copy controller using the new copy path.

A method for copying data among a plurality of sites conforming to yet another aspect of the present invention, in which communication paths available for data copying are preset among a prescribed plurality of sites of the respective sites, this method being capable of executing, in the respective sites, the steps of: carrying out data copying using a copy path, which is constituted from a pre-selected plurality of sites of the respective sites and a pre-selected plurality of communication paths of the respective communication paths, which is a step of receiving data from a preset copy-source site, storing this received data in its own site, and also sending the received data to a preset copy-target site; detecting whether or not a failure has occurred during the data copying; detecting at least one copy path candidate, which has its own site as the starting point, when the failure occurrence has been detected; selecting as a new copy path any one of the copy path candidates from among copy path candidates detected in other respective sites, and the copy path candidate detected in its own site; diagnosing the availability of the selected new copy path; and notifying the other sites to resume the data copying using this new copy path when the use of the selected new copy path has been allowed.

At least a portion of the means, functions and steps of the present invention may be constituted as a computer program, which is read in and executed by a microcomputer. A computer program like this, for example, can be stored and distributed on a storage medium, such as a hard disk or optical disk. Or, the computer program can also be supplied via a communication network like the Internet. Furthermore, the above-described characteristic features of the present invention can also be arbitrarily combined.

BRIEF DESCRIPTION OF THE DRAWINGS

FIG. 5 is a schematic diagram showing path available for remote copying having the respective sites as starting points;

FIG. 6 is a schematic diagram showing a copy-target information table;

FIG. 7 is a schematic diagram showing a site information table;

FIG. 8 is a schematic diagram showing a copy path management table and a path configuration table;

FIG. 9 is a schematic diagram showing the same tables as FIG. 8 held at a different site;

FIG. 21 is a schematic diagram showing a copy-target information table used in a storage system related to a second embodiment;

FIG. 22 is a schematic diagram showing a site information table;

FIG. 23 is a schematic diagram showing a copy path management table and a path configuration table;

FIG. 32 is a flowchart showing a copy path candidate-selection process executed in a storage system related to a seventh embodiment;

FIG. 33 is a schematic diagram showing a site information table;

FIG. 34 is a schematic diagram showing a copy path management table and a path configuration table;

FIG. 38 is a schematic diagram showing a copy-target information table used in a storage system related to an eighth embodiment;

FIG. 39 is a schematic diagram showing a site information table;

FIG. 40 is a schematic diagram showing a copy path management table and a path configuration table;

FIG. 44 is a schematic diagram showing a copy-target information table used in a storage system related to a ninth embodiment;

FIG. 47 is a schematic diagram showing a copy path management table and a path configuration table;

DESCRIPTION OF THE PREFERRED EMBODIMENTS

Figure 1A:
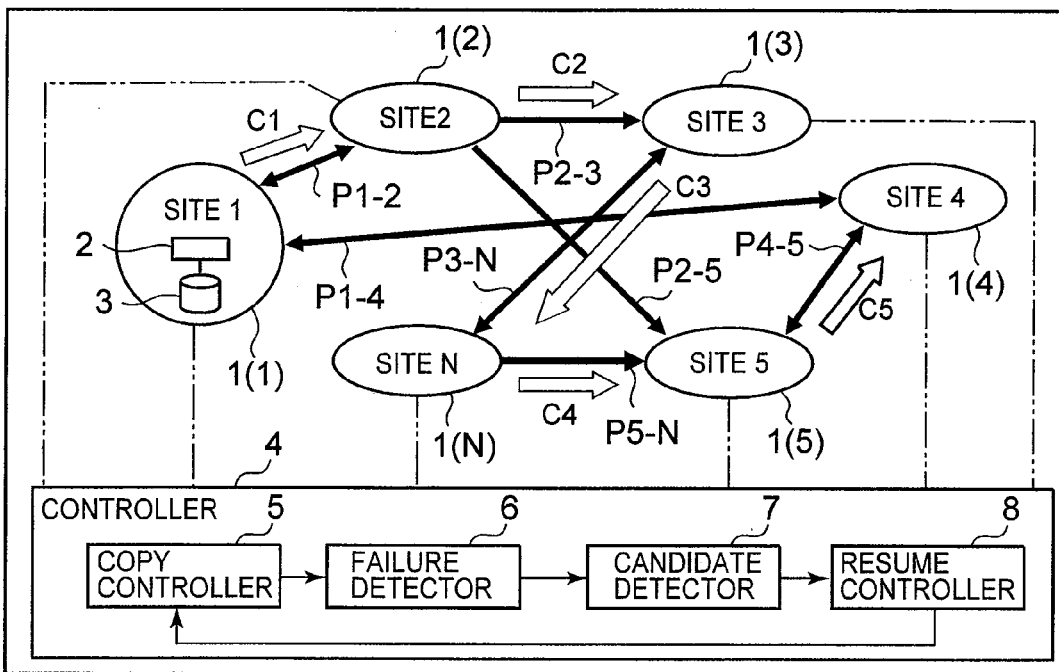
FIGS. 1A-1C are schematic diagrams showing an overall outline of an embodiment of the present invention.

The embodiments of the present invention will be explained below based on the figures. FIG. 1 is a schematic diagram showing an overall concept of this embodiment. FIG. 1A shows the status under normal circumstances. The storage system comprises a plurality of sites 1 (1) through 1 (N). In the following explanation, a site will simply be called site 1 when there is no need to distinguish between the respective sites, and the reference numerals (1) through (N) will be omitted.

The respective sites comprise at least one host 2 and a storage controller 3. A host 2 corresponds to an "external device" or a higher-level device. The storage controller 3 can also be called a storage apparatus.

The detailed configurations of the host 2 and storage controller 3 will be made clear in the embodiment explained hereinbelow. Briefly stated, the host 2, for example, is constituted as a server computer or mainframe computer, and comprises an application program like a database management program (hereinafter, application). The storage controller 3, for example, comprises a storage device like a hard disk drive or flash memory device, and provides the host 2 with a logical storage area (logical volume) established on the physical storage area of the storage device. The host 2 application reads and writes data from and to the logical volume.

Communication paths P1-2, P2-3, P1-4, P5-N (hereinafter, may be referred to generically as communication paths P) are set in advance between prescribed sites 1 of the respective sites 1. Since these communication paths are used for remote copying, the copy-enabled direction is also preset. For example, the communication path P1-2 configured between site 1 (1) and site 1 (2) is configured such that two-way data copying is possible, from site 1 (1) to site 1 (2) and from site 1 (2) to site 1 (1). The communication path P2-3 configured between site 1 (2) and site 1 (3) is configured to enable data copying only from site 1 (2) to site 1 (3), and copying of data from site 1 (3) to site 1 (2) is not possible. Thus, the copy-source site, copy-target site, and copy-enabled direction are respectively configured for each communication path P for remote copying.

The storage controllers 3 of the respective sites 1 each comprise a controller 4. The controller 4 comprises a copy controller 5, failure detector 6, candidate detector 7 and resume controller 8. Furthermore, in addition to this, the controller 4 also comprises functions for receiving an access request from the host 2 and reading and writing data from and to the logical volume.

The copy controller 5 receives write data from the preset copy-source site 1, stores the received data in the logical volume, and transfers the received write data to the preset copy-target site 1. Taking the copy controller 5 inside site 1 (2) as an example, the copy-source site is site 1 (1), and the copy-target site is site 1 (3). Site 1 (1) is the starting point of a remote copy in the storage system, and a copy-source site does not exist. Site 1 (4) constitutes the end point of remote copying in the storage system, and a copy-target site does not exist.

Information related to the copy-source site and copy-target site is preset in the copy controllers 5 of the respective sites 1. Consequently, for the storage system as a whole, for example, a copy path of site 1 (1)→site 1 (2)→site 1 (3)→site 1 (N)→site 1 (5)→site 1 (4) is configured, and data is copied in this order.

More specifically, in a first copy C1, write data written to the storage controller 3 of site 1 (1) from the host 2 is sent to the storage controller 3 of site 1 (2), and stored in the storage controller 3 of site 1 (2). In a second copy C2, write data is sent from the storage controller 3 of site 1 (2) to the storage controller 3 of site 1 (3), and stored in the storage controller 3 of site 1 (3). Similarly thereafter, write data is stored in the storage controller 3 of site 1 (N) by a third copy C3, stored in the storage controller 3 of site 1 (5) by a fourth copy C4, and stored in the storage controller 3 of site 1 (4) by a fifth copy C5.

The failure detector 6 detects whether or not a failure has occurred in the above-describe remote copying configuration. For example, the failure detector 6 can detect the occurrence of a failure by regularly carrying out communications between the respective sites 1 to check for life, like a heartbeat communication. Or, the failure detector 6 can also detect the occurrence of a failure by detecting the fact that a remote copy is not carried out normally. Checking for life signifies confirming whether or not the site is surviving, that is, determining whether or not this site has stopped functioning.

When a failure is detected, the candidate detector 7 detects a candidate for a new copy path starting at its own site. The method for detecting a copy path candidate will be described in detail in the embodiments explained hereinbelow. Briefly stated, for example, the candidate detector 7 can detect a path capable of remote copying, which has its own site as the starting point, by collecting information related to the preset communication paths P for the respective sites 1 (that is, information as to which sites can be copied to) from the normal sites 1. For example, when a failure occurs in site 1 (1), the respective candidate detectors 7 of site 1 (2) through site 1 (N) respectively detect copy path candidates, which respectively start at their own sites.

Figure 1B:
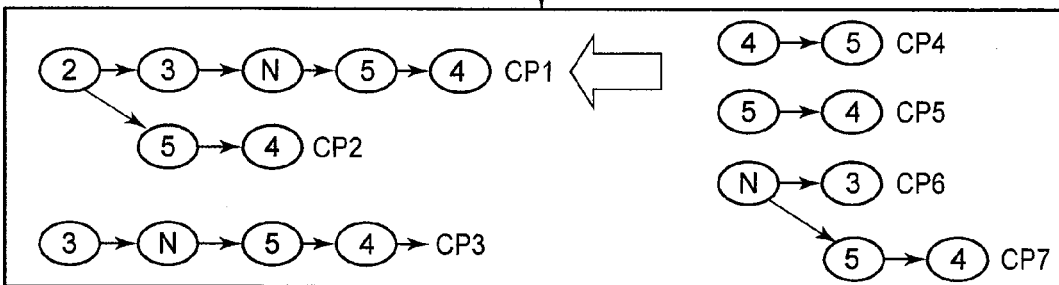

FIG. 1B shows copy path candidates detected by the respective sites. The numerals in FIG. 1B show numbers for identifying the sites 1. For example, "2" represents site 1 (2), and "3" represents site 1 (3) and so forth. In the example given in the figure, two paths CP1 and CP2 are detected as copy path candidates starting at site 1 (2). CP1 is a copy path candidate for copying data in the order of site 1 (2)→site 1 (3)→site 1 (N)→site 1 (5)→site 1 (4). CP2 is a copy path candidate for copying data in the order of site 1 (2)→site 1 (5)→site 1 (4). Copy path candidate CP3, which starts at site 1 (3), copies data in the order of site 1 (3)→site 1 (N)→site 1 (5)→site 1 (4). Similarly, as shown in the figure, copy path candidates CP4, CP5, CP6, and CP7 are respectively detected for the other site 1 (4), site 1 (5) and site 1 (N).

When a plurality of copy path candidates are detected, the candidate detectors 7 of the respective sites 1 determine if any of the copy path candidates is optimal based on a preset evaluation criterion, and select the one copy path candidate determined to be the best. For example, the candidate detectors 7 determine that the copy candidate path comprising the largest number of sites 1 is the best candidate. Therefore, the candidate detectors 7 detect the copy path candidate comprising the most sites 1.

The resume controller 8 acquires the copy path candidates detected by the respective sites 1, and selects as the new copy path the copy path candidate determined to be the best from thereamong. The resume controller 8 selects which of the copy path candidates is the best on the basis of a preset evaluation criterion. For example, the resume controller 8 selects as the new copy path the copy path candidate comprising the most numerous sites, the same as the evaluation criterion used in selecting the copy path candidates.

When there are a plurality of copy path candidates comprising the same number of sites 1, the resume controller 8 can select any one of these using a different evaluation criterion. A different evaluation criterion, for example, can include a priority or penalty, the size of a weight or the like preset by a user. For example, when there are a plurality of copy path candidates, which comprise the same number of sites, the one with the highest priority, the lowest penalty, or the largest (or smallest) weight is selected. As a weight, for example, at least one of the time required until data sent via a remote copy is stored, and the time required to recover a site can be used.

Similarly, when there are a plurality of paths available for copying, which each comprise the same number of sites 1, the candidate detector 7 can select any one of the paths using a different evaluation criterion. Furthermore, which of the above-mentioned respective evaluation criteria is used mainly can be arbitrarily configured. In the embodiment described hereinbelow, a number of examples are given in which a copy path is chosen using various different evaluation criteria.

The resume controller 8 diagnoses the availability of a new copy path. That is, the resume controller 8 determines whether or not it is appropriate to resume remote copying using this selected new copy path. The resume controller 8, for example, can carry out a diagnosis based on the criterion of whether or not the number of sites 1 included in the new copy path exceeds a preset prescribed value. In the example shown in the figure, the copy path candidate CP1 having the largest number of sites is selected as the new copy path, and the use thereof is determined to be appropriate. Furthermore, in the embodiments described hereinbelow, a different diagnosis criterion will also be explained.

Figure 1C:
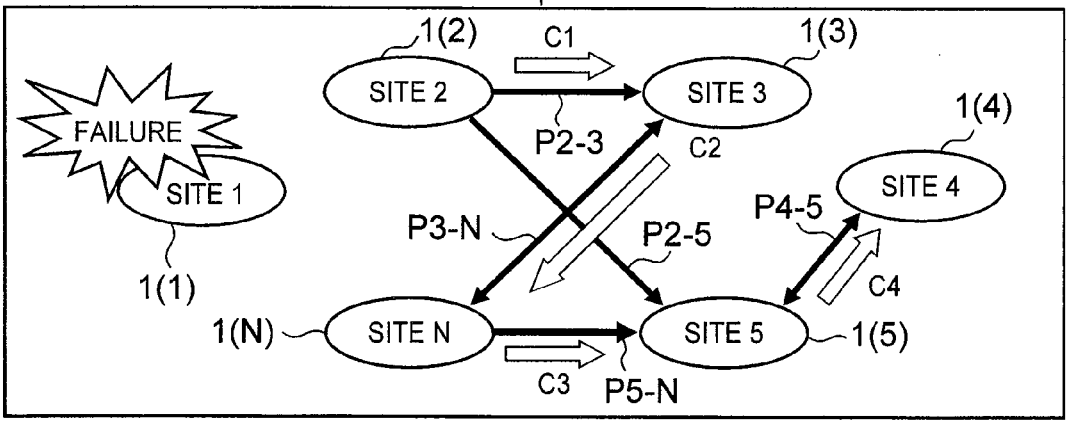

When the resume controller 8 determines that it is appropriate to use the new copy path, the resume controller 8 notifies the storage controllers 3 of the other sites 1 to resume remote copying using this new copy path, and resumes remote copying. FIG. 1C shows a state in which remote copying is resumed using the new copy path CP1.

The host 2 issues a write request to the logical volume of the storage controller 3, which constitutes the new starting point. For example, the host 2 of the new starting point site 1 (2) takes over a job in place of the host 2 of the failed site 1 (1), and issues a write command. The newly issued write command is stored in order in a plurality of sites 1 via the new copy path.

In this embodiment, even when a failure occurs in a remote copy being executed among a plurality of sites 1, it is possible to detect a copy path candidate from among paths available for remote copying, to select a new copy path from among the detected copy path candidates, and to resume remote copying using this new copy path. Consequently, it is possible to enhance fault resistance, and to maintain data protection reliability.

In this embodiment, because the respective sites 1 each detect copy path candidates, and determine that one of the copy path candidates should be made the new copy path, there is no need to separately provide a management device for managing the overall storage system. That is, in this embodiment, the respective sites 1 of the storage system can each autonomously determine a new copy configuration for remote copy recovery, and carry out arbitration among the sites 1. Therefore, it is even possible to handle a situation in which a plurality of failures occur simultaneously.

In this embodiment, remote copying is resumed after searching for a new copy path by also taking into account the remote copy direction, and diagnosing the availability of the new copy path. Therefore, it is possible to prevent the loss of data consistency and to maintain reliability among the respective sites 1 involved in a remote copy. This embodiment will be explained in more detail.

First Embodiment

Figure 2:
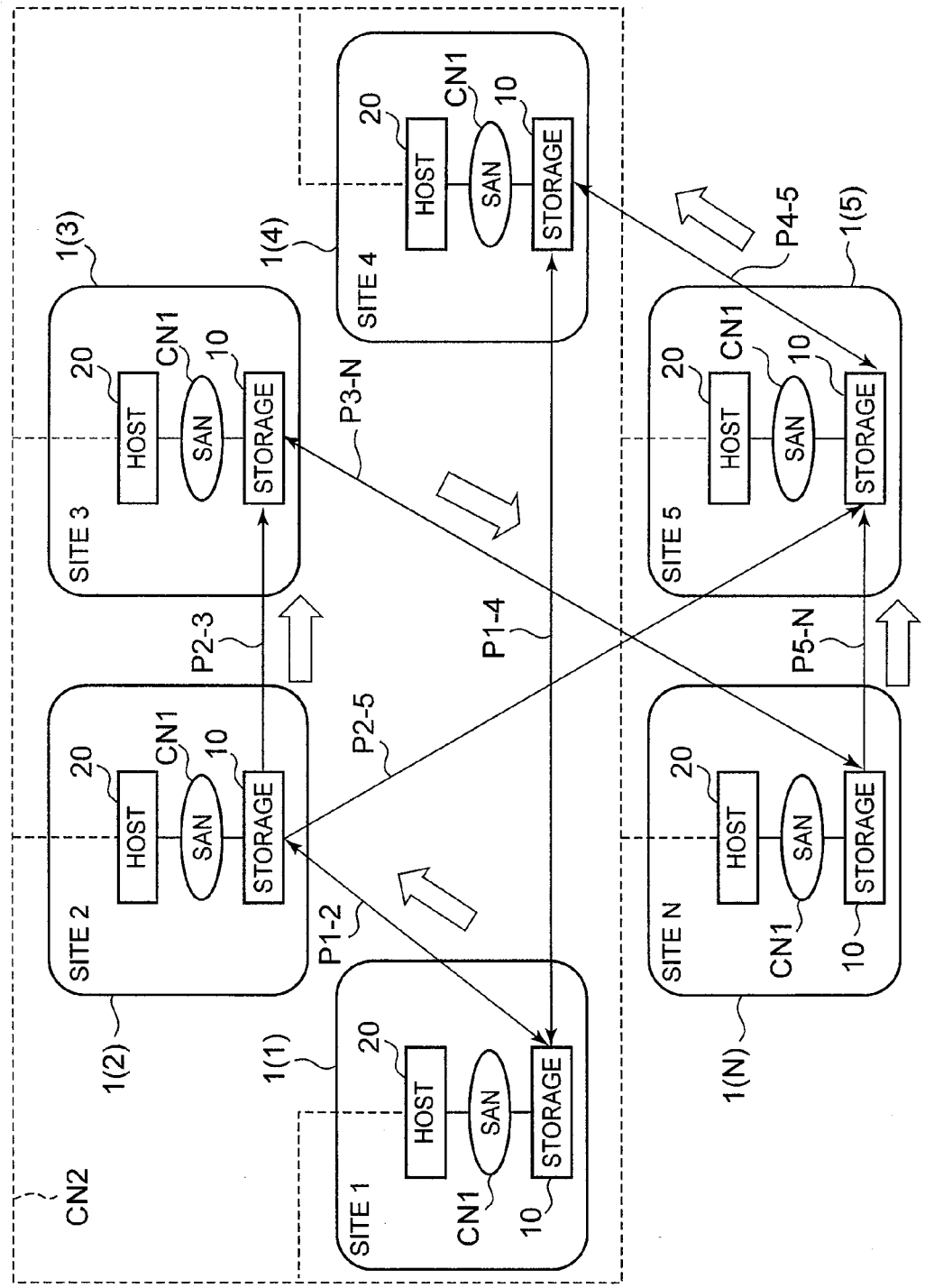
FIG. 2 is a schematic diagram showing the overall constitution of a storage system related to a first embodiment.

FIG. 2 is a schematic diagram showing the overall configuration of a storage system related to the present invention. The storage system comprises a plurality (for example, not less than four) sites 1 (1) through 1 (N). Each site 1 comprises a storage 10 as a "storage controller" and a host 20. The storage 10 and host 20, for example, are connected via an in-site network CN 1, such as a SAN (Storage Area Network).

As described using FIG. 1, prescribed sites of the respective sites 1 are connected via communication paths P for remote copying. The copy direction (direction in which data can be sent) is preset for the remote copy communication paths P. The respective sites 1, for example, are connected via a management network CN 2 such as the Internet. The respective sites 1 check the life of the other sites 1 via this network CN 2.

By way of describing the corresponding relationship with FIG. 1, for example, the storage 10 corresponds to the storage controller 3 in FIG. 1, the host 20 corresponds to the host 2 in FIG. 1, and the controller 110 (refer to FIG. 3) corresponds to the controller 4 in FIG. 1.

Figure 3:
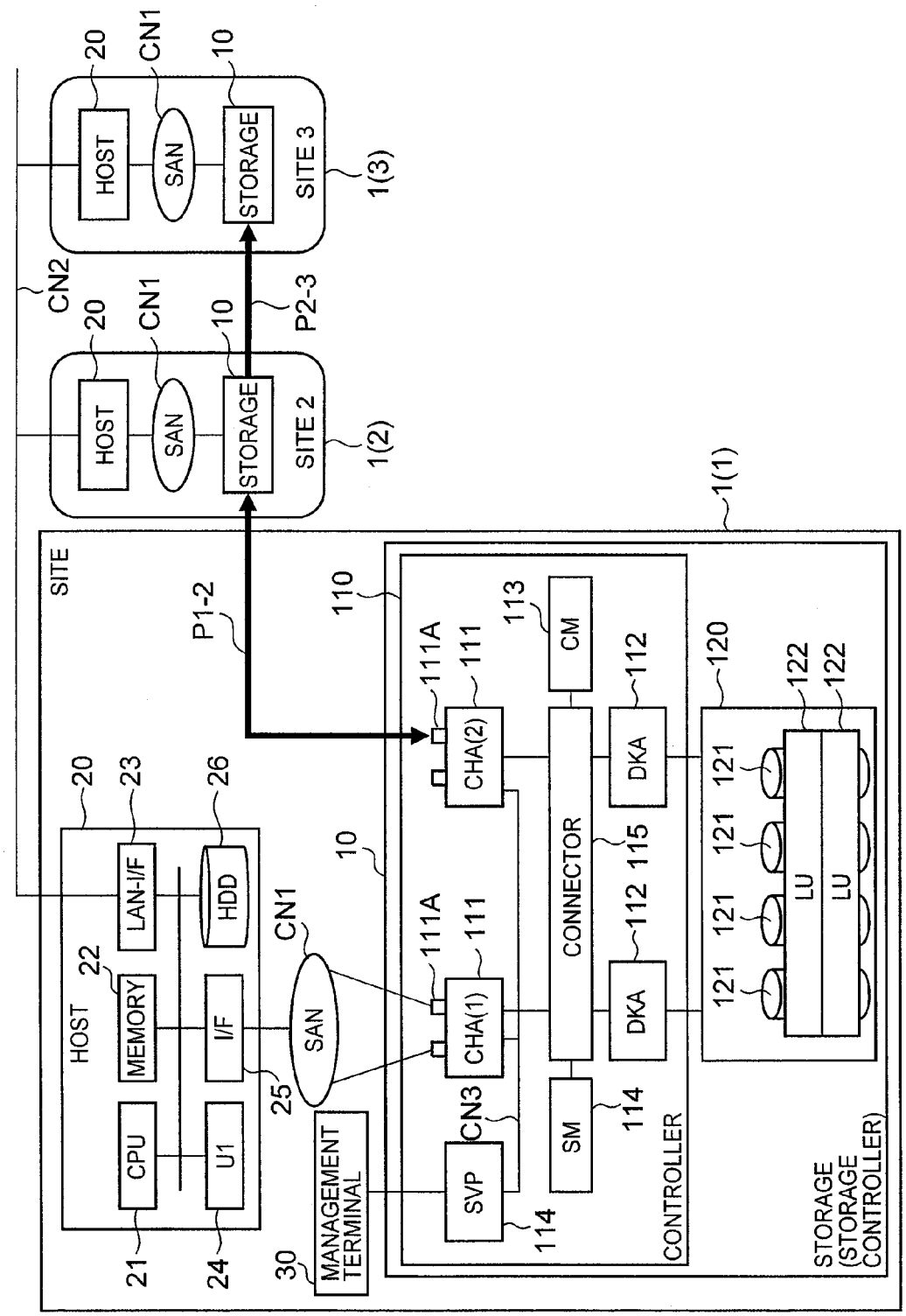
FIG. 3 is a schematic diagram showing the configurations of a storage and a host.

FIG. 3 is a schematic diagram showing examples of the hardware configurations of the storage 10 and the host 20. First, the configuration of the host 20 will be explained. The host 20, for example, is constituted as a computer device, such as a server computer, or mainframe machine. The host 20, for example, comprises a processor (CPU in the figure) 21, a memory 22, a first communication unit (LAN-IF in the figure) 23, a user interface (UI in the figure) 24, a second communication unit (I/F in the figure) 25, and an auxiliary storage device (HDD in the figure) 26.

The processor 21 reads in and executes computer programs stored in the memory 22 or the auxiliary storage device 26, thereby realizing prescribed functions. An application program, which uses the storage 10, and a program for managing storage 10 are stored in the memory 22 and the auxiliary storage device 26. Furthermore, various types of tables and the like utilized for recovering from a remote copy failure, which will be explained hereinbelow, are also stored in the memory 22 and the auxiliary storage device 26.

The first communication unit 23 exchanges management information with the hosts 20 of the other sites 1 via the management network CN 2. Management information can include information (a heartbeat signal) for checking the life of the other sites, information used in reconfiguring a copy path, and so forth.

The user interface 24 comprises an information output unit for providing information to the user, and an information input unit for receiving information from the user. The information output unit, for example, can include a display device, voice output device, and the like. The information input unit, for example, can include a keyboard switch, pointing device, touch panel, microphone, and so forth.

The second communication unit 25 is for carrying out communications with the storage 10 via the in-site network CN 1. The host 20 can write data to the storage 10, and read data from the storage 10 via the second communication unit 25 and the in-site network CN 1.

The configuration of the storage 10 will be explained. The storage 10, for example, is constituted from a controller 110 for controlling the operation of the storage 10, and a storage unit 120, which is controlled by the controller 110.

The controller 110 can be constituted comprising at least one channel adapter (hereinafter, CHA) 111, at least one disk adapter (hereinafter, DKA) 112, at least one cache memory (CM in the figure) 113, at least one shared memory (SM in the figure) 114, a connector 115, a service processor (hereinafter, SVP) 116, and a storage unit 120.

The CHA 111 is a higher-level communication controller for carrying out the exchange of data with the host 20, and, for example, can comprise a microprocessor, local memory, data transfer circuit, and so forth. The CHA 111 comprises a communication port 111A.

The one CHA (1) 111 is used for processing communications with the host 20. The communication port 111A of this CHA (1) 111 is the target port, and is connected to the second communication unit 25 of the host 20 via the network CN 1.

The other one CHA (2) 111 is used for processing communications with the storage 10 inside other sites 1. That is, CHA (2) 111 is used for carrying out remote copying.

The DKA 112 is a lower-level communication controller for carrying out the exchange of data with the storage unit 120, and, for example, can be constituted comprising a microprocessor, local memory, data transfer circuit, and so forth. The DKA 112 can be constituted as a separate control board from the CHA 111, or the CHA 111 functions and DKA 112 functions can co-exist on the same control board.

The cache memory 113, for example, is a memory for storing data received from the host 20, or information for temporary management. The shared memory 114, for example, is a memory for storing various types of control information for controlling the storage 10. A portion of the control information is also copied to the local memory inside the CHA 111 and to the local memory inside the DKA 112. The control information can also comprise tables and the like, which will be explained hereinbelow.

The cache memory 113 and shared memory 114 can each be constituted on separate memory boards, or the cache memory 113 and the shared memory 114 can co-exist on the same memory board.

The connector 115 is for interconnecting the respective CHA 111, the respective DKA 112, the cache memory 113, and the shared memory 114. The connector 115, for example, is constituted as a bus or crossbar switch.

The SVP 116 is for monitoring the various types of statuses of the storage 10, and for rewriting the control information in accordance with an indication from the management terminal 30. The SVP 116, for example, is connected to the respective CHA 111 via an in-device network CN3. The SVP 116 can also obtain the information of the DKA 112 and shared memory 114 via either one of the CHA 111. Furthermore, the constitution can be such that the SVP 116 is connected to the respective CHA 111 and respective DKA 112 via the in-device network CN3.

The storage unit 120 comprises a plurality of disk drives 121. The disk drives 121 correspond to the "storage device". The disk drives 121, for example, can include hard disk drives, semiconductor memory devices (including flash memory devices), holographic memory drives, optical disk drives, magneto-optical disk drives, magnetic tape drives, and so forth.

By virtualizing the physical storage area of a disk drive 121, it is possible to create at least one logical storage area. This logical storage area is called a logical volume 122. The host 20 accesses the logical volume 122 as an access target.

First, the operations inside the storage 10 will be briefly explained. When the host 20 issues a read command, the CHA 111 checks whether or not the data requested from the host 20 resides in the cache memory 113. When this data is stored in the cache memory 113, the CHA 111 reads this data from the cache memory 113 and sends the data to the host 20.

By contrast, when the data requested from the host 20 does not reside in the cache memory 113, the CHA 111 requests the DKA 112 for a read-out of this data. An indication from the CHA 111 to the DKA 112 is carried out via the shared memory 114. When the DKA 112, which is constantly referencing the shared memory 114, discovers the indication from the CHA 111, the DKA 112 reads this data from the disk drive 121, and stores this data in the cache memory 113. The process for copying the data stored in the disk drive 121 to the cache memory 113 is called staging. The end of the staging process is notified to the CHA 111 via the shared memory 114. During staging, the DKA 112 converts a physical address to a logical address (LBA: Logical Block Address). Furthermore, for example, the DKA 112 can shut off the power supply, or reduce the rotational frequency of a disk drive 121, which has not been accessed for a prescribed time or longer. Consequently, the power consumption of the storage unit 120 can be lowered.

When the host 20 issues a write command, the CHA 111 checks the free capacity of the cache memory 113, and if it is possible to receive write data, receives the write data from the host 20. The CHA 111 stores the received write data in the cache memory 113. Further, the CHA 111 indicates to the DKA 112 to write this data into the logical volume 122. This indication is carried out via the shared memory 114. Transmitting various types of indications and reports via the shared memory 114 makes it possible to independently and parallelly operate a plurality of CHA 111 and DKA 112 using a relatively simple constitution.

The DKA 112, upon discovering the write command via the shared memory 114, writes the data stored in the cache memory 113 to the logical volume 122. More specifically, the DKA 112 converts the logical address of this write data to a physical address, and stores the write data in a prescribe location of the disk drive 121, which constitutes the write-target logical volume 122. When this logical volume has a RAID configuration, the write data is divided up and written to a plurality of disk drives 121. The transfer of data from the cache memory 113 to the disk drive 121 is called a destaging process. The end of the destaging process is notified to the CHA 111 via the shared memory 114. The CHA 111 reports to the host 20 that write command processing has ended.

Furthermore, the destaging process can be carried out at the proper timing based on the processing load of the storage 10, and the free capacity of the cache memory 113. There is no need to carry out a destaging process immediately upon receiving a write command. The method of reporting write command process-end to the host 20 subsequent to finishing the destaging process is called a synchronous mode, and the method of reporting write command process-end to the host 20 prior to the end of the destaging process is called the asynchronous mode.

When the write target of the write command issued by the host 20 is the logical volume 122', which constitutes the target of the remote copy, the write data received from the host 20 is not only stored in this write-target logical volume 122, but rather, is also sent to the copy-target volume, set in advance as the remote copy pair. The CHA 111 makes a sequence number correspondent to the write command and write data from the host 20, and sends the write command and write data to the remote copy-target logical volume 122 (a logical volume, which resides in another site).

The management terminal 30, for example, is a computer device for indicating a storage 10 configuration change, and for collecting the internal status of the storage 10 and displaying this status on a display screen. The management terminal 30 provides an indication to the storage 10, and acquires information from the storage 10 via the SVP 116. Furthermore, the functions for managing the storage 10 can also be provided inside the host 20.

Figure 4:
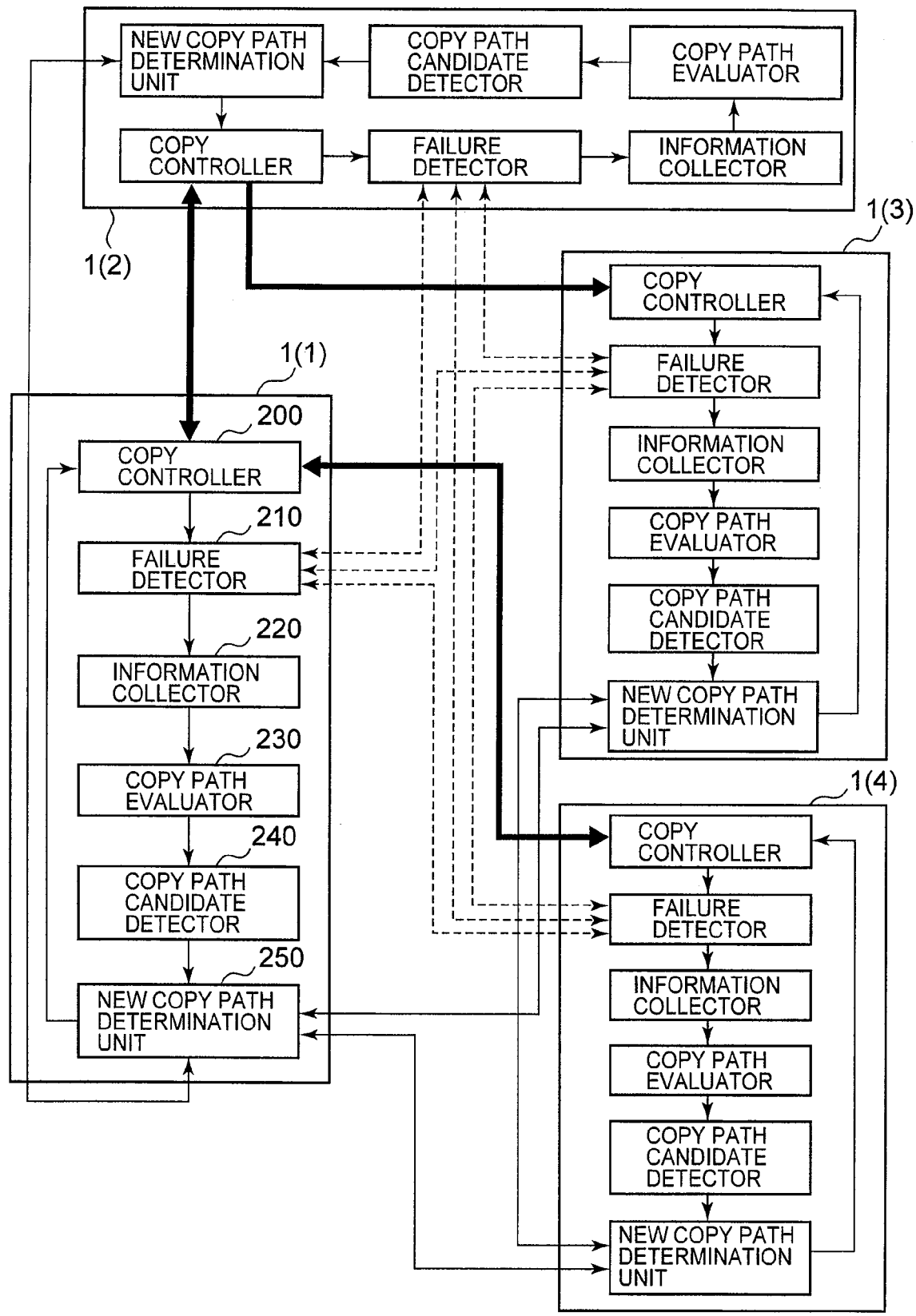
FIG. 4 is a schematic diagram showing the functional configuration of a site.

FIG. 4 is a diagram schematically showing the functional configuration of the storage system. Each site 1, for example, comprises the respective functions of a copy controller 200, failure detector 210, information collector 220, copy path evaluator 230, copy path candidate detector 240, and new copy path determination unit 250.

The corresponding relationship with FIG. 1 will be explained. The copy controller 200 corresponds to the copy controller 5 in FIG. 1, the failure detector 210 corresponds to the failure detector 6 in FIG. 1, the information collector 220, copy path evaluator 230 and copy path candidate detector 240 correspond to the candidate detector 7 in FIG. 1, and the new copy path determination unit 250 corresponds to the resume controller 8 in FIG. 1. These various functions 200 through 250 can be realized by software inside either the storage 10 or the host 20. As shown in FIG. 4, the above-mentioned functions 200 through 250 are provided in the respective sites 1. Each site 1 is capable of executing the respective functions 200 through 250.

FIG. 5 is a schematic diagram showing paths available for remote copying inside the storage system. As described hereinabove, remote copy communication paths P, for which the directions in which remote copying is possible are stipulated, are preset inside the storage system. Therefore, combining available communication paths P results in a plurality of available remote copy paths (may be abbreviated as copy paths). To identify the respective remote copy paths, unique path IDs (PID in the figure) can be assigned to the paths inside the storage system.

For example, there are three path IDs, PID 1, PID 2, and PID 3, for the remote copy paths (may be abbreviated as copy paths) starting at site 1 (1). As shown in FIG. 5, PID 1 is a path for copying write data in the order of site 1 (1)→site 1 (2)→site 1 (3)→site 1 (N)→site 1 (5)→site 1 (4). PID 2 is a path for copying write data in the order of site 1 (1)→site 1 (2)→site 1 (5)→site 1 (4). PID 3 is a path for copying write data in the order of site 1 (1)→site 1 (4)→site 1 (5).

There are three path IDs, PID 4, PID 5, and PID 6, for the copy paths starting at site 1 (2). There is one path ID, PID 7, for the copy path starting at site 1 (3). There are three path IDs, PID 8, PID 9, and PID 10, for the copy paths starting at site 1 (4). There is only one path ID, PID 11, for the copy path starting at site 1 (5). There are two path IDs, PID 12 and PID 13, for the copy paths starting at site 1 (N).

In this embodiment, of the 13 types of copy paths PID 1 through PID 13, PID 1 is used as the remote copy path. In the following explanation, the copy path currently in use can be called the active path.

FIG. 6 is a schematic diagram showing a copy-target information table T1 maintained in the respective sites 1. Each site 1 only maintains a copy-target information table T1 related to its own site. For example, site 1 (1), site 1 (2) and site 1 (3), respectively, maintain in advance tables T1 (1), T1 (2), and T1 (3).

The copy-target information table T1 manages sites to which it is possible to send data from one's own site, that is, manages sites to which remote copying is possible from one's own site. The copy-target information table T1 correspondently manages information for identifying the copy-source site (for example, the site number) C11, the number of sites to which copying is possible C12, and information for identifying the sites to which copying is possible C13. Furthermore, the constitution can be such that other information not shown in FIG. 6 is managed by table T1. For example, when a plurality of copy-target sites exist, it is also possible to provide a flag for distinguishing the site currently being used to send data in a remote copy from other copy-target sites.

Using table T1 (1) as an example, data can be sent from site 1 (1) to either site 1 (2) or site 1 (4). In the case of table T1 (2), data can be sent from site 1 (2) to site 1 (1), site 1 (3) and site 1 (5).

FIG. 7 is a schematic diagram showing a site information table T2. This table T2 is maintained by the respective sites 1. The site information table T2 is used for carrying out heartbeat signals between each site 1 and the other respective sites 1, and for carrying out arbitrations related to a new copy path, which will be explained hereinbelow.

The site information table T2, for example, correspondently manages the number of sites C21, site number C22, IP address C23, priority C24, life determination C25, table creation flag C26, count C27, and path ID C28.

The number of sites C21 is the number of sites 1 comprised inside the storage system. The site number C22 is the number for identifying the respective sites inside the storage system. The IP address C23 shows the IP address preset for the site. The priority C24 shows the priority preset for the site. The life determination C25 shows the result of a determination as to whether or not a site has stopped functioning. The table creation flag C26 shows whether or not tables T3 and T4, which will be explained below, have been created in the site. The count C27 shows the number of sites included in the copy path candidates selected by the site. The path ID C28 is information for identifying a copy path candidate selected by the site.

Of the respective items C21 through C28 mentioned above, items C21 through C24 are set in advance. The remaining items C25 through C28 are configured when carrying out new copy path arbitration. The top portion of FIG. 7 shows the normal status of table T2. The bottom portion of FIG. 7 shows the status of table T2 when a failure has occurred.

FIG. 8 is a schematic diagram showing tables T3 and T4, which are created by the respective sites 1 subsequent to the occurrence of a failure. When a failure occurs during remote copying in the storage system, each site 1 creates a copy path management table T3 and a path configuration management table T4. However, each site 1 only creates tables related to its own site. FIG. 8 shows tables T3 (2) and T4 (2) created by site 1 (2). FIG. 9 shows tables T3 (N) and T4 (N) created by site 1 (N). Similarly, the other sites also create tables T3 and T4 related to their own sites when a failure occurs.

The copy path management table T3 manages the path available for remote copying, which starts at the site. Table T3, for example, makes the number of copy paths C31, path ID C32, count C33, and next site priority C34 correspondent to one another.

The number of copy paths C31 shows the total number of paths available for copying, which have the site as the starting point. The count C33 shows the number of non-functioning sites included in the path available for remote copying. The next site priority C34 shows the priority configured for the initial copy-target site.

Site 1 (2) will be explained as an example. Table T3 (2) is created inside site 1 (2) when a failure occurs during remote copying inside the storage system. Various types of information regarding the path available for remote copying starting at site 1 (2) are stored in this table T3 (2). The next site is the site, which initially receives data from site 1 (2), and in the case of path PID5, the next site is site 1 (3). For path PID6, the next site is site 1 (5).

In this embodiment, an explanation is given of an example in which a failure occurs in site 1 (1), which is the starting point of the active path, and site 1 (1) stops functioning completely. As shown in FIG. 5, the next site in path PID4 is site 1 (1). Therefore, since it is not possible to use path PID4, "0" is configured in the count C33. Since site 1 (1), which is the next site, has stopped functioning, a priority is not configured in C34.

The path configuration table T4 will be explained. The path configuration table T4 manages the configuration of a path available for remote copying. The path configuration table T4, for example, comprises the path ID C41, number of sites on path C42, a first connection-target site C43, a second connection-target site C44, a third connection-target site C45, a fourth connection-target site C46, a fifth connection-target site C47, and so forth.

The number of sites on path C42 is the total number of sites included in a path available for remote copying. However, the starting-point site is not included in the number of sites C42. Further, no mention is made in the number of sites C42 as to whether or not the site is functioning. The number of sites C42 is used when checking the life of a site by carrying out heartbeat communications. In C43 through C47, site numbers are configured in the order in which remote copying is performed. For convenience of explanation, up to a fifth connection-target site C47 is shown, but the present invention is not limited to this, and a number of connection-target site items corresponding to the total number of sites included in the storage system can be provided.

Figure 10:
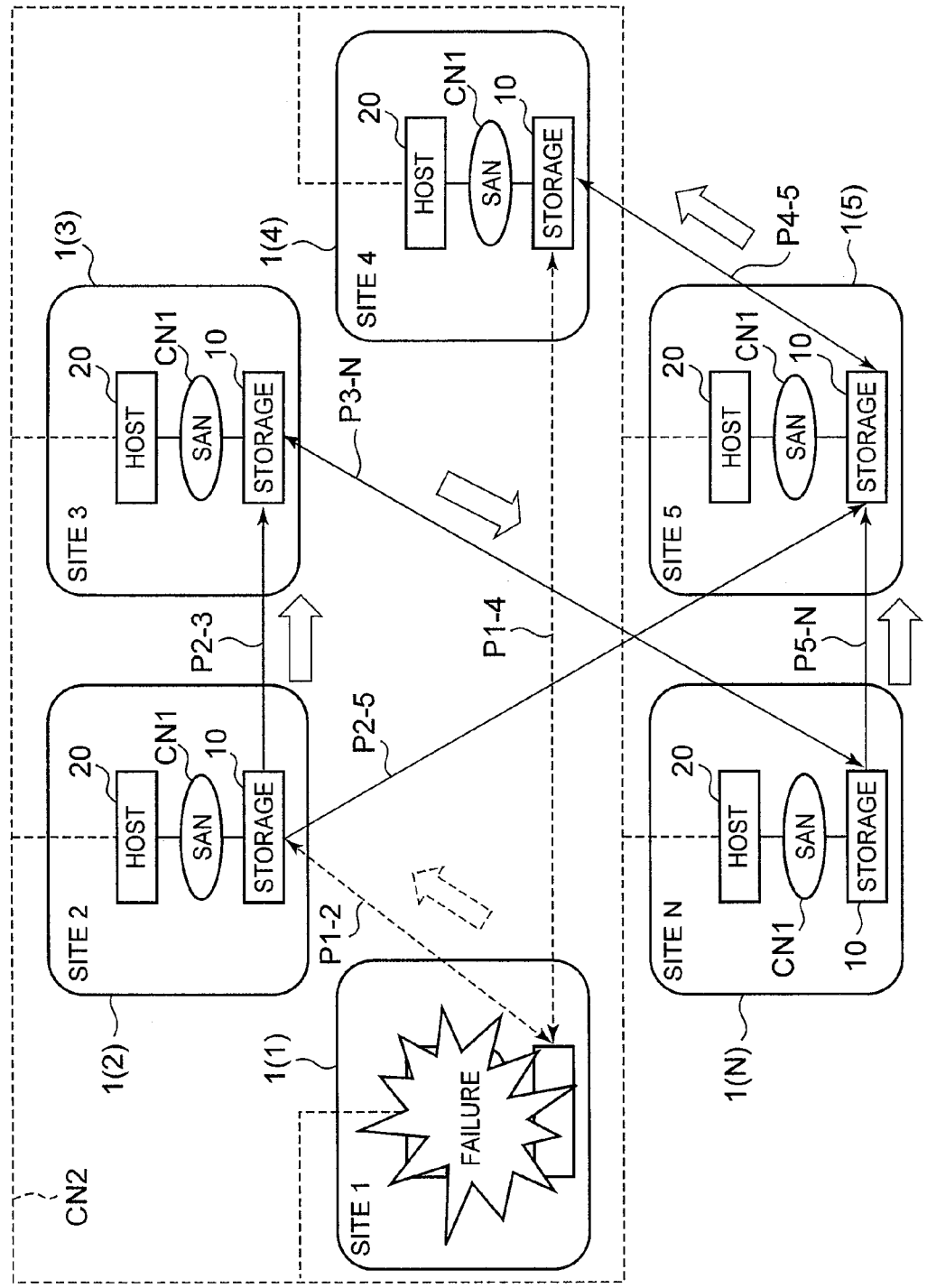
FIG. 10 is a schematic diagram showing a case in which a failure occurred in a remote copy.

FIG. 10 is a schematic diagram showing a state in which a failure has occurred during a storage system remote copy. Normally, remote copying is executed by making path PID1 of site 1 (1)→site 1 (2)→site 1 (3)→site 1 (N)→site 1 (5)→site 1 (4) the active path. It is supposed that site 1 (1) stopped functioning due to a natural disaster or the like.

Figure 11:
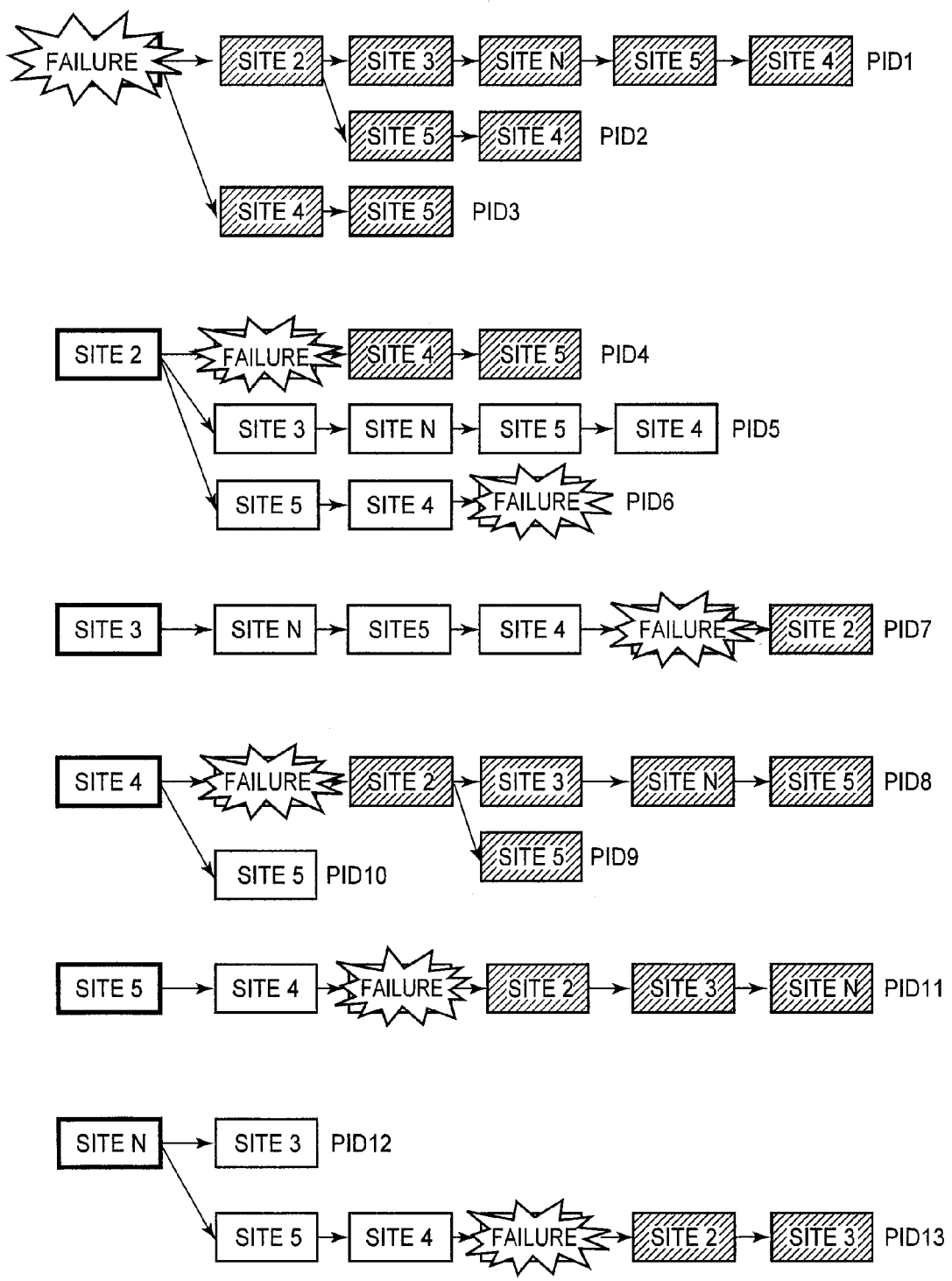
FIG. 11 is a schematic diagram showing paths available for remote copying, which have the respective sites as their starting points.

FIG. 11 is a schematic diagram showing a state in which paths available for remote copying decrease due to a failure. When site 1 (1) shuts down, all of the paths comprising site 1 (1) are affected by the failure. Furthermore, since remote copying copies data in a preset prescribed order, when a failure occurs in the upstream side of a copy path (upstream side of the copy direction), it is not possible to copy data to downstream-side sites.

Therefore, paths PID1 through PID3 cannot be used at all due to the shutting down of site 1 (1), which is located the furthest upstream. PID4 substantially cannot be used because site 1 (1), which is located subsequent to site 1 (2), is shut down. Further, in PID13, the stoppage of site 1 (1) makes it impossible to send data to site 1 (2) and site 1 (3), which are located downstream of site 1 (1). Therefore, in the case of PID13, there are a total of "5" sites on this path, but (with the exception of site 1 (N), which is the starting point) the number of sites in operation works out to "2".

Figure 12:
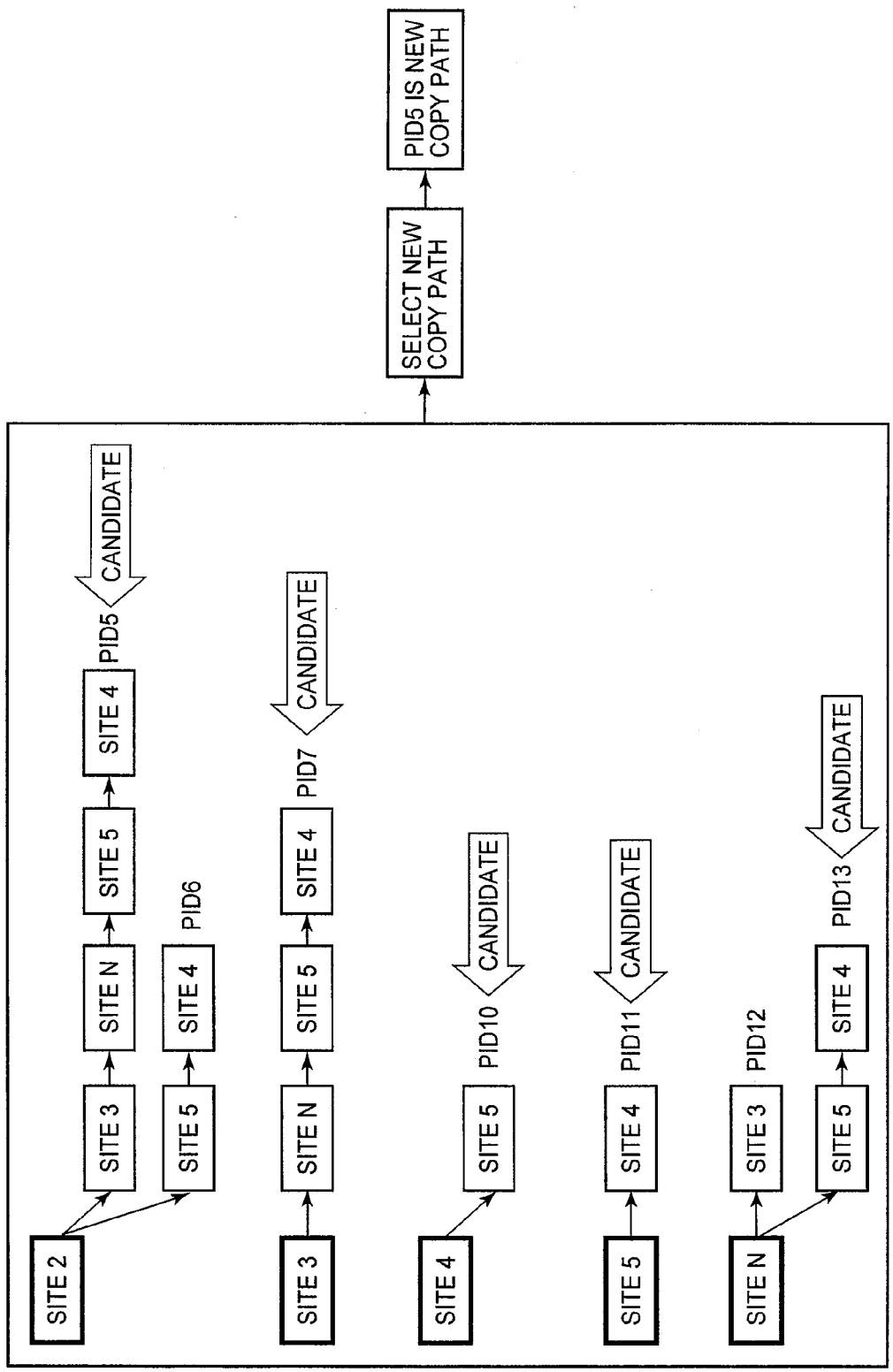
FIG. 12 is a schematic diagram showing how a new copy path is selected from among copy path candidates respectively chosen at each site.

FIG. 12 is a schematic diagram showing a state in which copy path candidates are detected in the respective sites 1. The respective sites 1 select, from among the respective communication paths, which have the site as the starting point, and which are available for remote copying, the communication path having the largest number of functioning sites as a copy path candidate.

In site 1 (2), since PID5 comprises "4" valid sites (the number of sites in operation), and PID6 comprises "2" valid sites, PID5 is selected as the copy path candidate. That is, path PID5 becomes the path recommended by site 1 (2).

Similarly, path PID7 is selected in site 1 (3), path PID10 is selected in site 1 (4), PID11 is selected in site 1 (5), and PID13 is selected in site 1 (N).

In this embodiment, as will be explained hereinbelow, the copy path candidate selected by each site 1 is notified to the other sites 1. The respective sites 1 select the copy path candidate, which is the most suitable of all the copy path candidates, as the new copy path. In this embodiment, path PID5, which starts at site 1 (2), is selected as the new copy path.

Figure 13:
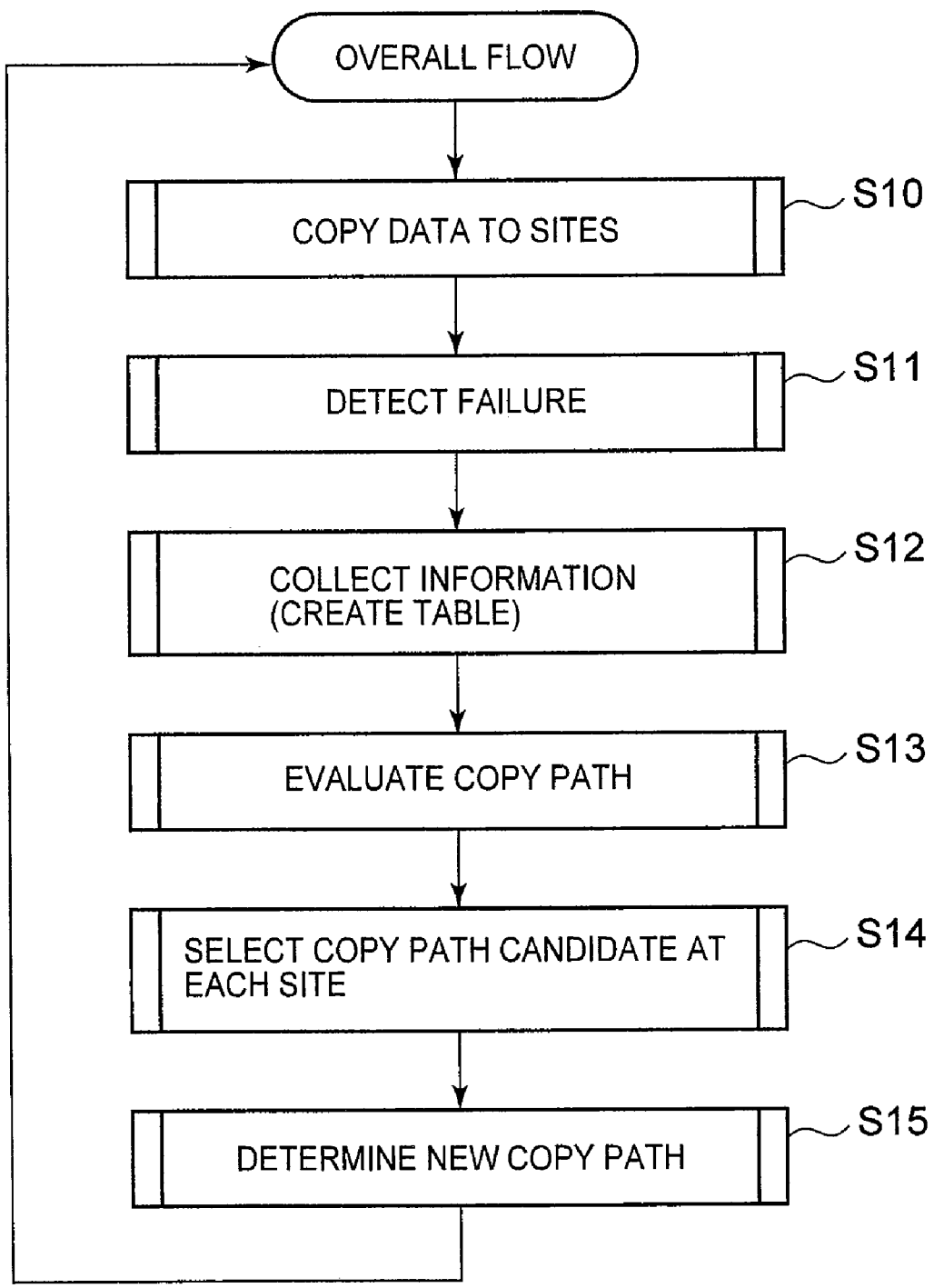
FIG. 13 is a flowchart showing the overall flow of processing carried out in the storage system.

FIG. 13 is a flowchart showing the overall flow when recovering from a failure, which occurred during remote copying. The respective flowcharts shown below show the concepts of processing within the scope needed to comprehend and implement the present invention, and there will be circumstances when this processing differs from that of an actual computer program. A so-called person skilled in the art should be able to rearrange and change the steps in the respective flowcharts.

The storage system executes a remote copy among a plurality of sites 1 under a condition configured by the user (S10). When a failure is detected (S11), normally functioning sites 1 collect information from the other sites 1, and respectively create tables T3 and T4 (S12).

The respective sites 1 evaluate paths available for remote copying (S13), and detect copy path candidates (S14). The respective sites 1 acquire the copy path candidates selected by the other sites 1, and select the most suitable copy path candidate from among all the copy path candidates as the new copy path (S15). Consequently, the storage system resumes remote copying using the new copy path (S10).

Figure 14:
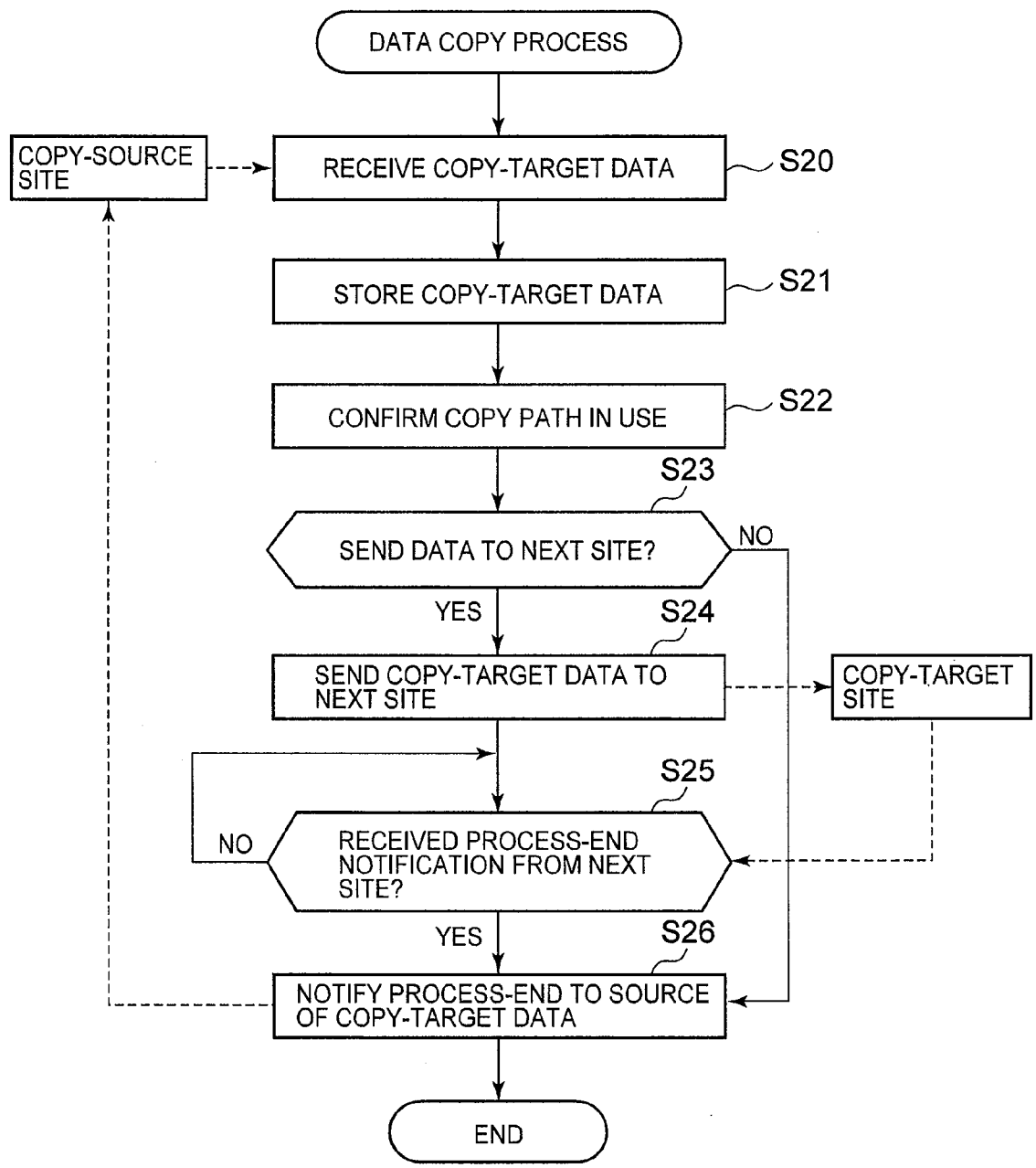
FIG. 14 is a flowchart showing a data copy process.

FIG. 14 is a flowchart showing the details of S10 in FIG. 13. The storage 10, upon receiving data targeted for a remote copy from the storage 10 inside the source site (S20), stores this data in the logical volume 122 (S21). The storage 10 can store the data received from the source in the cache memory 113, and does not need to write this data to the disk drive 121. The destaging process can be carried out at a different timing.

The storage 10, for example, checks the remote copy path currently in use by referencing the copy-target information table T1 (S22), and determines whether or not to send the data to the next site (S23). When the site itself is the ending point of the remote copy (S23: NO), processing moves to S26.

When there is a site to which to send the data (S23: YES), the storage 10 sends the data targeted for remote copying to the storage 10 inside the copy-target site (next site) (S24). The storage 10 waits until it receives a process-end notification from the storage 10 inside the copy-target site (S25). Upon receiving a notification from the copy-target site to the effect that processing has ended (S25: YES), the storage 10 notifies the copy-source site that processing has ended (S26).

Figure 15:
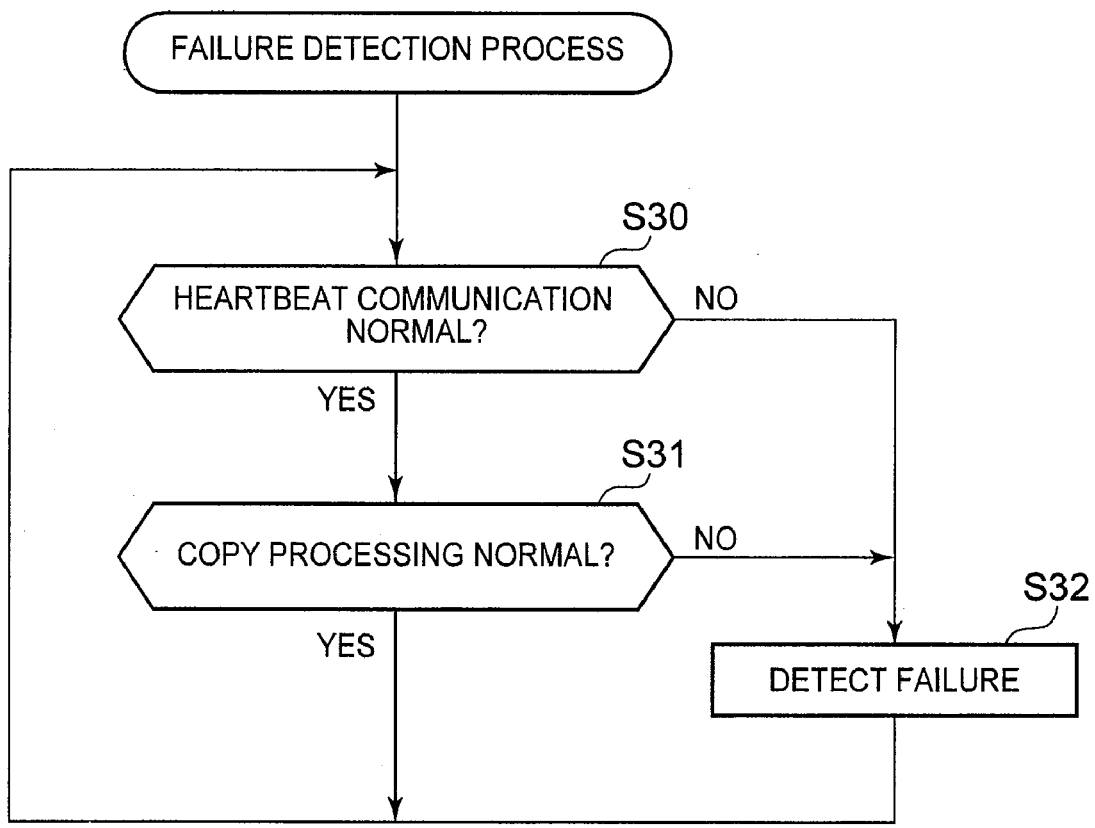
FIG. 15 is a flowchart showing a failure detection process.

FIG. 15 is a flowchart showing the details of S11 in FIG. 13. The host 20 specifies whether or not the heartbeat communication carried out with the host 20 inside the other site is normal (S30). The hosts 20 of the respective sites 1 regularly exchange heartbeat signals using the management network CN2. When a failure of some sort occurs, a heartbeat signal is not sent from the site where the failure occurred. Therefore, it is possible to determine whether or not a failure has occurred based on whether or not a heartbeat signal is received. Furthermore, there are circumstances in which the sending of a heartbeat signal is temporarily delayed due to the physical distance between sites 1, the degree of traffic on the communication network, and the load on the host 20. Accordingly, the constitution can also be such that a temporary delay of the heartbeat signal like this is not detected in S30.

Next, the host 20 determines whether or not remote copy processing is being carried out normally (S31). When a failure of some sort has occurred on the remote copy path, the process-end notification will not reach the host 20, making it possible to detect the failure.

The host 20 detects the occurrence of a failure (S32) either upon realizing an abnormality in the heartbeat communication (S30: NO), or upon realizing an abnormality in the remote copy process (S31: NO). Furthermore, the processing shown in FIG. 15, as will become clear from the embodiments explained hereinbelow, can also be executed by the storage 10.

Figure 16:
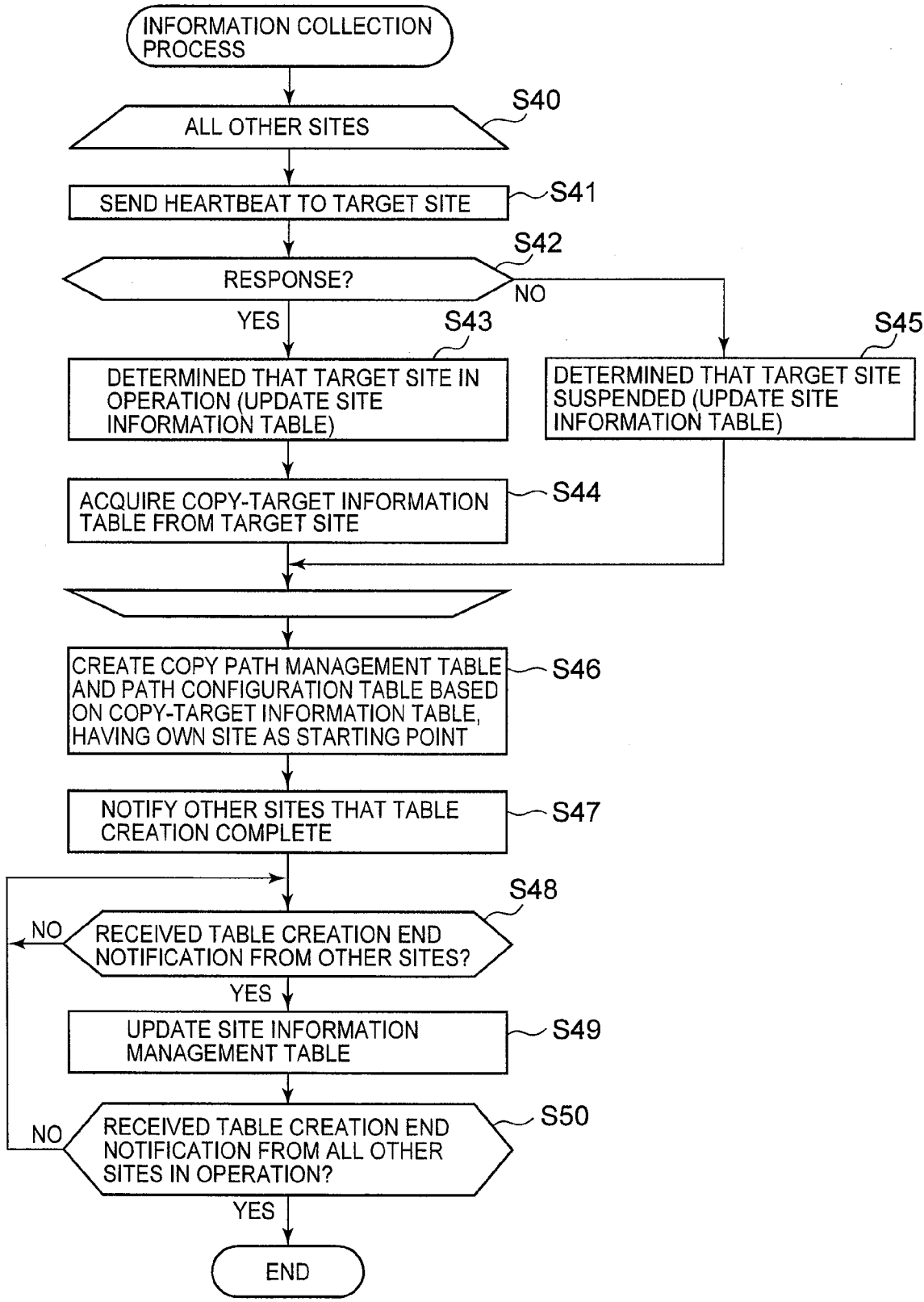
FIG. 16 is a flowchart showing an information collection process.

FIG. 16 is a flowchart showing the details of S12 in FIG. 13. This process can be executed by the hosts 20 of the respective sites 1. However, a constitution in which this process is executed by the storage 10 is also possible.

The host 20 executes steps S41 through S44 for other sites, which are functioning normally (S40). First, the host 20 sends a heartbeat signal to the host 20 inside the target site (S41), and determines whether or not there is a response from the target site (S42). When there is a response from the target site (S42: YES), the host 20 determines that the target site is surviving (S43). That is, the host 20 determines that the target site, which responded to the heartbeat signal, is operating normally (S43).

The host 20 acquires from the target site the copy-target information table T1 maintained by the target site (S44). The host 20 stores information showing that the target site is operating normally in item C25 of the site information table T2 (S44). By contrast, when there is no response to a heartbeat signal (S42: NO), the host 20 determines that the target site is down (S45). The host 20 stores information showing that the target site is down in item C25 of the site information table T2 (S45).

The above mentioned steps S41 through S45 are executed for all the other sites. Consequently, which sites are operating normally and which sites are down is stored in the site information table T2.

The host 20 creates a copy path management table T3 and path configuration table T4 having its own site as the starting point based on the copy-target information table T1 stored in its own site, and on the copy-target information tables T1 acquired from the other sites that are operating normally (S46). The host 20 notifies the other normally operating sites to the effect that the creation of table T3 and table T4 has ended (S47).

The host 20 determines whether or not notifications to the effect that the creation of table T3 and table T4 has ended are received from the other normally operating sites (S48). When end notifications are received from the other sites (S48: YES), the host 20 records information showing that table T3 and table T4 have been created in item C26 of the site information table T2 (S49). The host 20 repeats S48 and S49 until notifications to the effect that the tables have been created are received from all the other sites in operation (S50). When notifications have been received from all the other sites in operation (S50: YES), the host 20 ends this process.

Figure 17:
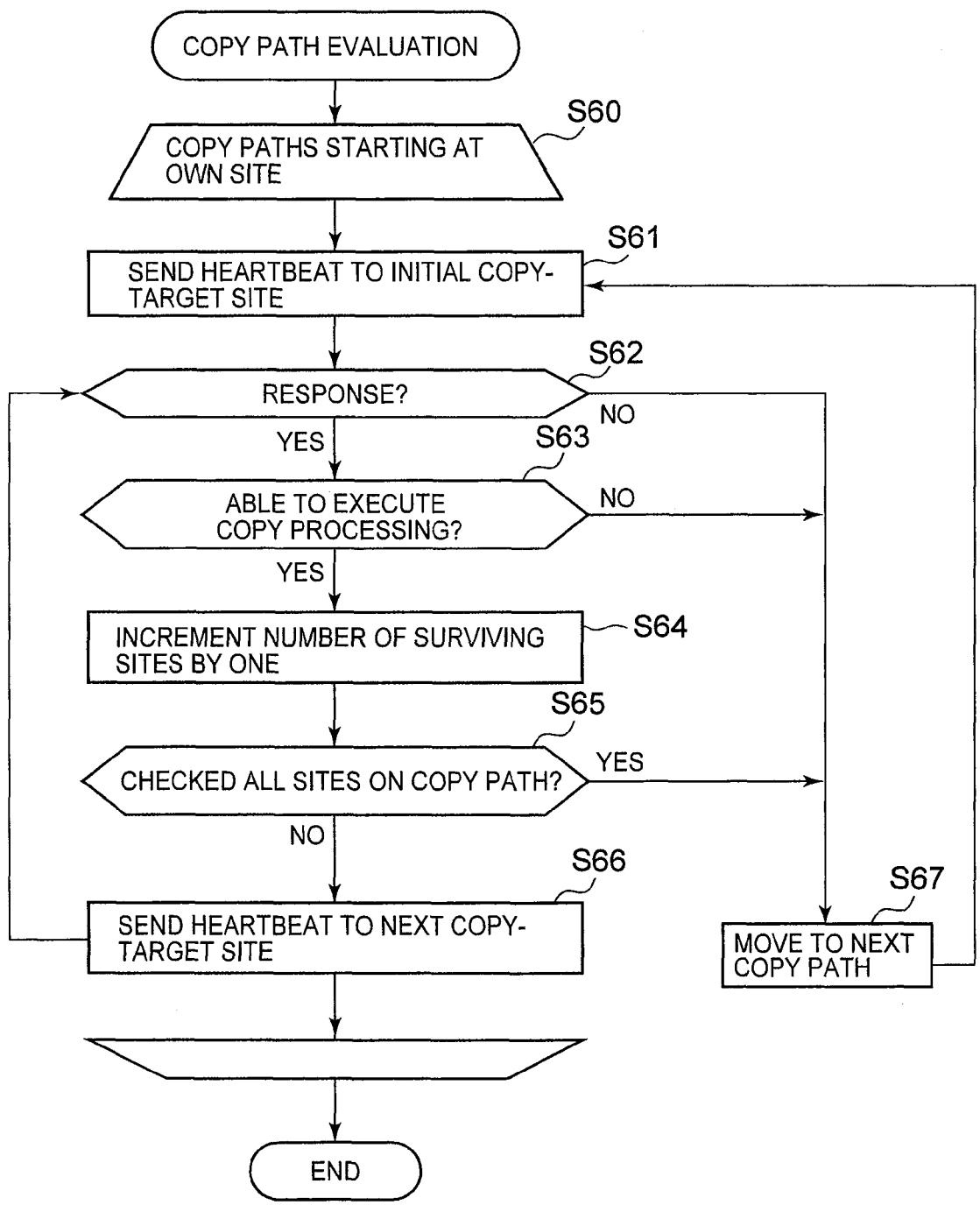
FIG. 17 is a flowchart showing a process for evaluating a copy path.

FIG. 17 is a flowchart showing the details of S13 in FIG. 13. This process, for example, is executed by the host 20. However, as already mentioned, the respective flowcharts shown in this embodiment can also be executed by the storage 10.

The host 20 executes steps S61 through S67 for the copy paths, which start at its own site (copy path alluded to in FIG. 17 signifies "a path available for remote copying") (S60).

The host 20 sends a heartbeat signal to the first copy-target site for the copy path targeted for processing (S61). Next, the host 20 determines whether or not the first copy-target site (that is, the site located subsequent to its own site) returned a response to the heartbeat signal (S62). When there is a response (S62: YES), the host 20 determines whether or not it is possible to copy data to this first copy-target site (S63). When it is determined that copying is possible (S63: YES), the host 20 increments by one the value of the count C33, which shows the number of sites surviving on the process-target copy path (S64).

The host 20 determines whether or not the advisability of executing remote copying for all the sites on the process-target copy path has been determined (S65). When unchecked sites remain (S65: YES), the host 20 also sends a heartbeat signal to the next site on the process-target copy path (S66).

When the advisability of executing remote copying has been determined for all the sites (S65: YES), the host 20 switches the process-target copy path to the next copy path (S67), and repeats steps S61 through S66.

When "NO" is determined in either S62 or S63, the host 20 moves processing to S67, and switches the process-target copy path to the next copy path. Since remote copying must be carried out in order, when any of the sites on the copy path are incapable of a remote copy, there is no need to check the sites further downstream therefrom.

For example, the execution of this process by the host 20 of site 1 (3) will be explained by referring to FIG. 11. The host 20 sends a heartbeat signal to site 1 (N) (S61), and upon confirming a response thereto (S62: YES), checks whether or not remote copying can be executing with site 1 (N) (S63). When it is possible to use site 1 (N) for remote copy processing (S63: YES), the host 20 configures "1" in the count C33 related to path PID7 of the copy path management table T4 (3) (S64).

Similarly, thereafter the host 20 determines whether or not the next site, site 1 (5), and the site after that, site 1 (4), can also be used in remote copying (S62, S63), and increments the values of the counts C33 by one each (S64).

As shown in FIG. 5, site 1 (1) is located downstream of site 1 (4) in path PID7. However, a failure has occurred in site 1 (1). Therefore, even if the host 20 were to send a heartbeat signal to site 1 (1) (S66), a response will not be returned from site 1 (1) (S62: NO). Accordingly, the host 20 ends its inspection of path PID7 (job to confirm whether or not path PID7 can be used in remote copying), and proceeds to the next path (S67). However, since path PID7 is the only path available for remote copying starting at site 1 (3), the host 20 ends this process.

Figure 18:
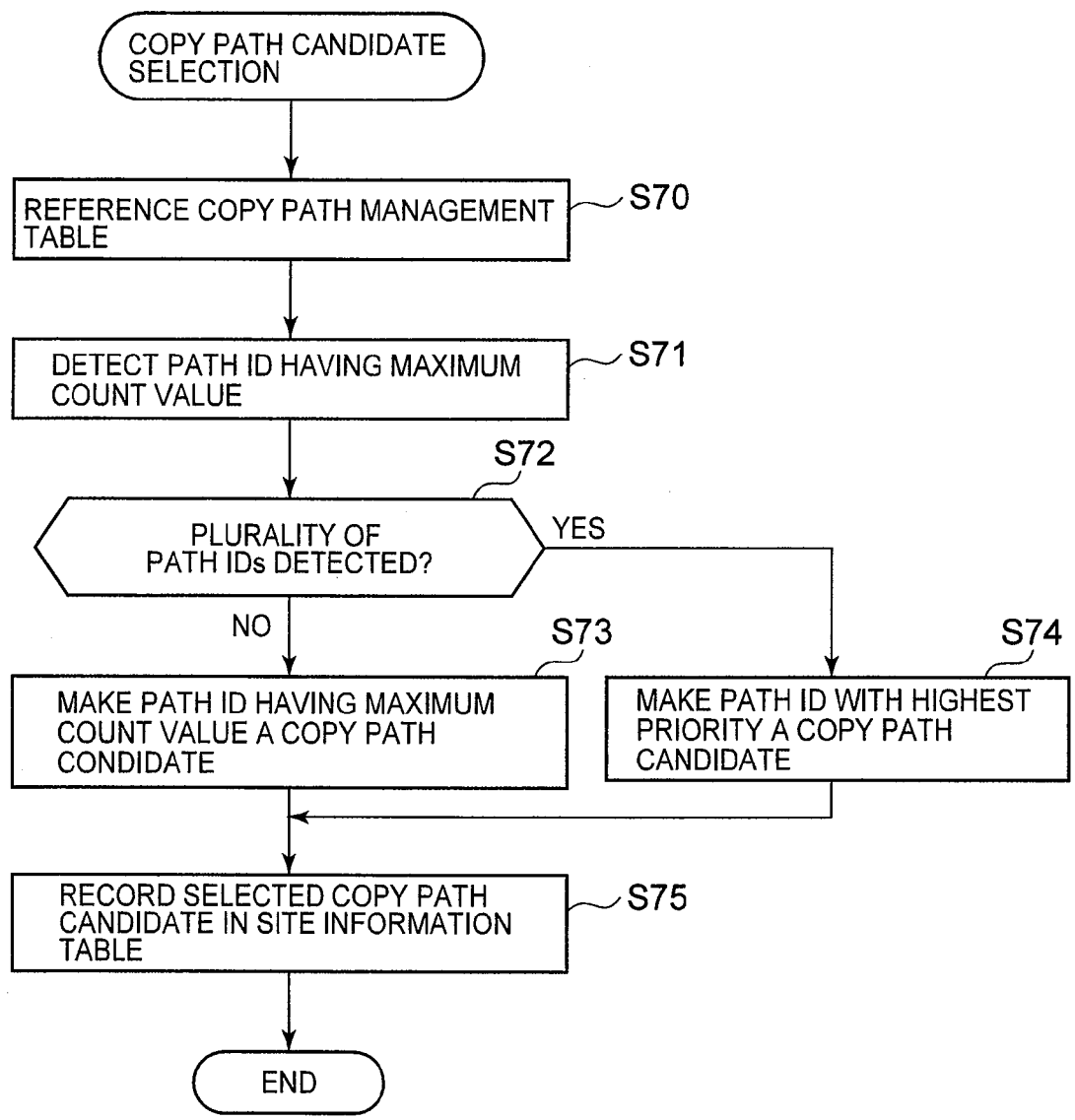
FIG. 18 is a flowchart showing a process for selecting a copy path candidate.

FIG. 18 is a flowchart showing the details of S14 in FIG. 13. The host 20 references the copy path management table T3 (S70), and detects the path ID with the maximum count C33 value of the respective path IDs (C32) registered in the table T3 (S71).

The host 20 determines whether or not a plurality of path IDs having the maximum count C33 value are detected (S72). When only one path ID having the maximum count C33 value is detected (S72: NO), the host 20 selects the path having this path ID as the copy path candidate (S73), and records the selected copy path candidate in item C28 of the site information table T2 (S75).

By contrast, when a plurality of path IDs having the maximum count C33 value are detected (S72: YES), the host 20 selects the path having a path ID of the highest priority C34 as the copy path candidate (S74). That is, when the number of sites surviving on the paths is the same, the path in which the next site has the higher priority is selected as the copy path candidate.

Furthermore, in this embodiment, the relative merits of a path are decided by the priority of the next site, but the present invention is not limited to this, and, for example, the constitution can be such that relative merit is decided by the total value of the priorities of the respective sites surviving on the path.

Figure 19:
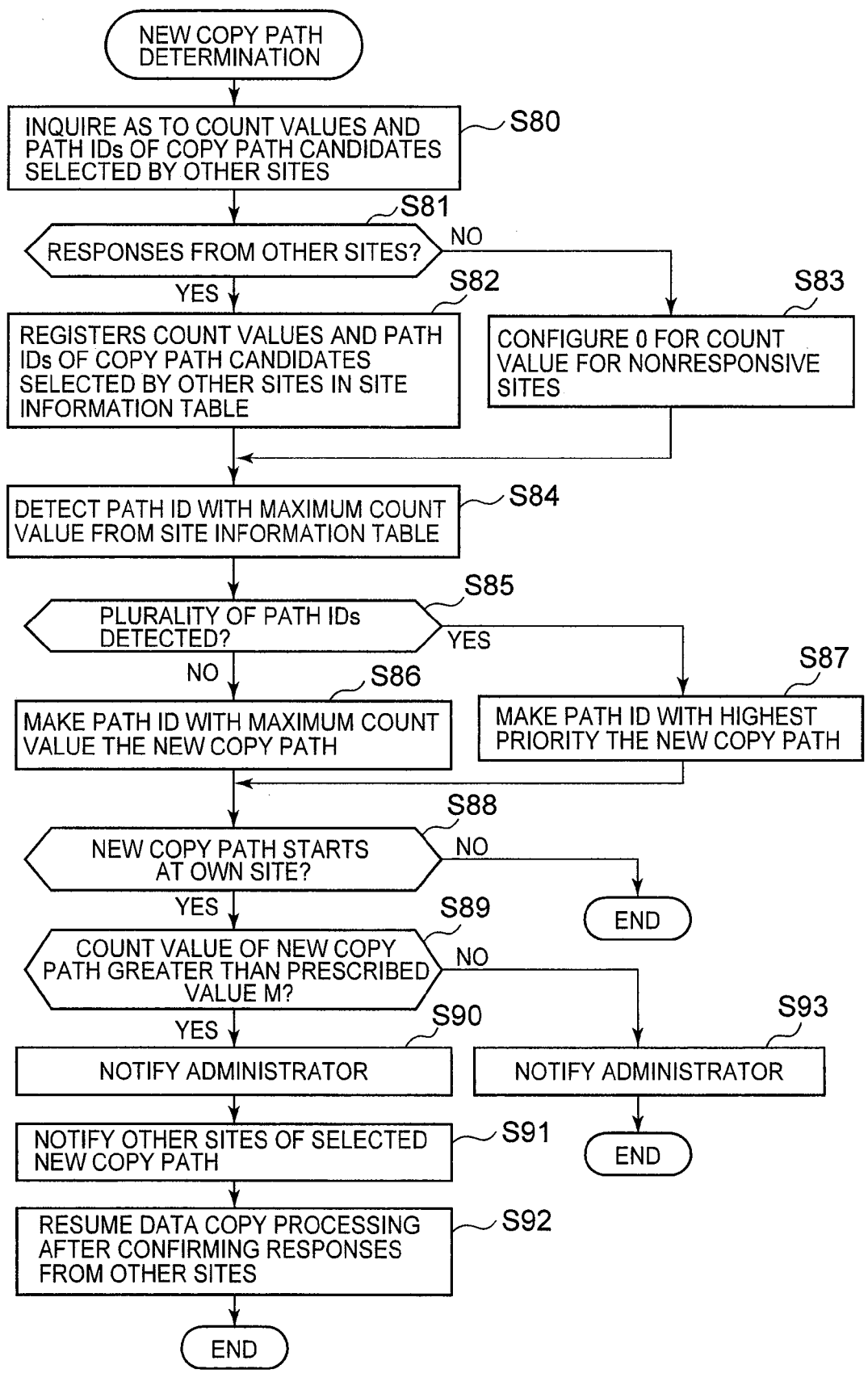
FIG. 19 is a flowchart showing a process for determining a new copy path.

FIG. 19 is a flowchart showing the details of S15 in FIG. 13. The host 20 inquires about the path IDs and count values of the copy path candidates selected by the other sites 1 (S80). When there are responses from the other sites to this query (S81: YES), the host 20 registers the count values and path IDs of the copy path candidates selected by the other sites in items C27 and C28 of the site information table T2 (S82). For a site, which does not respond to the above-mentioned query (S81: NO), the host 20 configures "0" in the count value C27 of the site information table T2 (S83).

The host 20 detects the path ID having the maximum count value of the respective path IDs registered in the site information table T2 (S84). The host 20 determines whether or not a plurality of path IDs having the maximum count value are detected (S85). When only one path ID having the maximum count value is detected (S85: NO), the host 20 selects the copy path candidate having this path ID as the new copy path (S86).

When a plurality of path IDs having the maximum count value are detected (S85: YES), the host 20 selects the copy path candidate having a path ID with the highest priority as the new copy path (S87).

The host 20 determines whether or not the site, which constitutes the starting point of the new copy path selected in either S86 or S87, is its own site (S88). When the starting point of the new copy path is not its own site (S88: NO), the host 20 ends this process.

When the starting point of the new copy path is its own site (S88: YES), the host 20 diagnosis whether or not it is suitable to use the new copy path. The host 20 determines whether or not the number of sites 1 included in the new copy path is a preset prescribed value M or more (S89). The prescribed value M, for example, is configured as a value that is greater than one-half of the total number N of sites included in the storage system (M>N/2). The host 20 does not inquire as to whether or not the sites are operating normally. A number of greater than one-half the total number N of sites included in the storage system prior to the occurrence of a failure can be configured as the prescribed value M. Consequently, even if the storage system is divided into a plurality of island by a failure, the resumption of remote copying by the respective islands can be prevented, thereby enabling data consistency to be maintained.

When the number of sites included in the new copy path is greater than the prescribed value M (S89: YES), the host 20 notifies the user (administrator) to the effect that a new copy path has been selected and remote copying will be resumed (S90). The host 20 notifies the other sites 1 of the new copy path being used to resume remote copying (S91), and subsequent to confirming responses from the other sites, resumes the remote copy process (S92).

By contrast, when the number of sites included in the new copy path is less than the prescribed value M (S89: NO), the host 20 notifies the user to the effect that remote copying cannot be resumed (S93).

FIG. 20 is a diagram schematically showing a state in which the storage system is divided by a failure. FIG. 20A shows the status at normal times. Normally, remote copying is implemented among N sites using the active path.

Figure 20A:
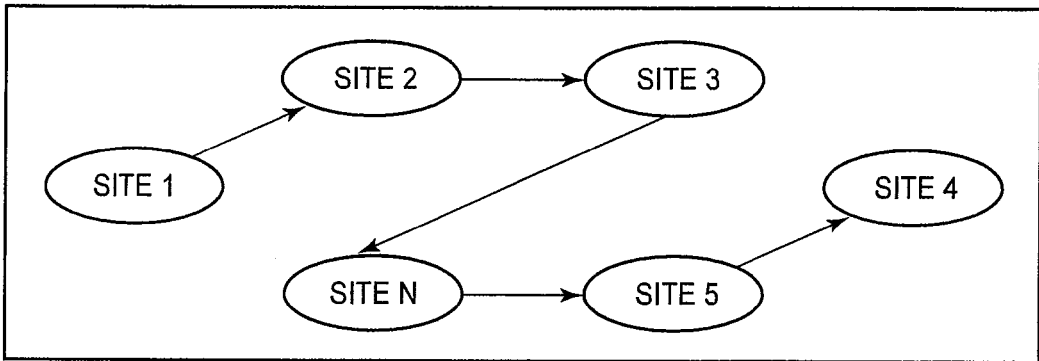
FIGS. 20A-20D are schematic diagrams showing a state in which the storage system is divided into a plurality of islands.
Figure 20B:
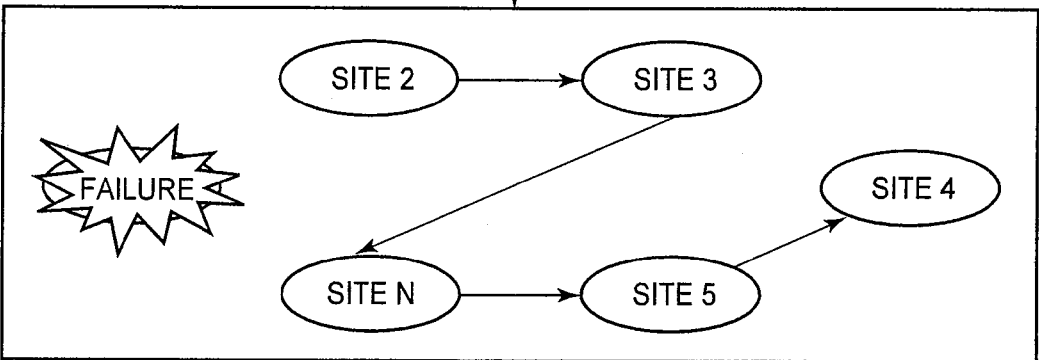

FIG. 20B shows a situation in which a failure has occurred in site 1 (1). In this case, a new copy path is selected and remote copying is resumed in accordance with the respective processes described hereinabove.

Figure 20C:
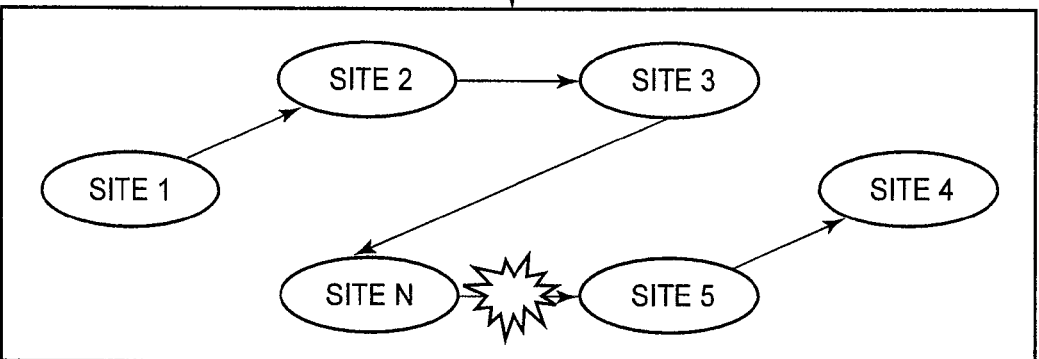
Figure 20D:
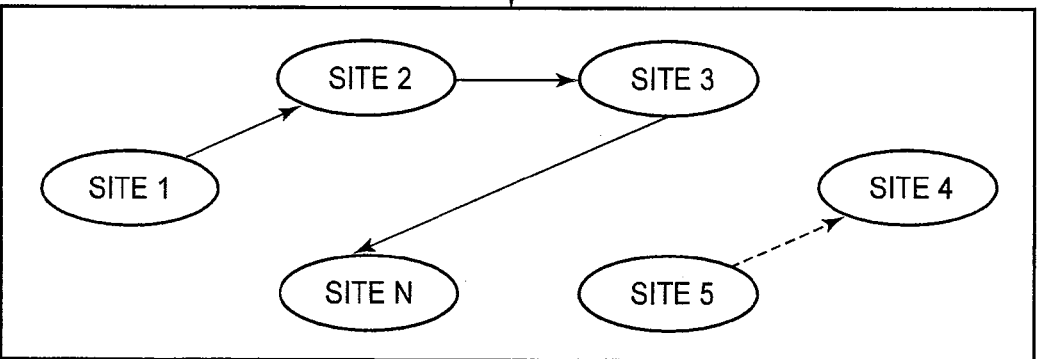

FIG. 20C shows a situation in which a failure occurs in the communication path between site 1 (N) and site 1 (5), dividing the storage system into two islands. The first island comprises site 1 (1), site 1 (2) and site 1 (N). The second island comprises site 1 (4) and site 1 (5). It is supposed that a separate communication path does not exist between the first island and the second island.

In this case, if the first island and the second island respectively select new copy paths and resume remote copying, it will not be possible to maintain the consistency of the data. When different remote copying processes are arbitrarily resumed by the respective islands, problems will occur after the communication path between site 1 (N) and site 1 (5) is restored. Accordingly, in this embodiment, the host 20 resumes remote copying using only a new copy path having sites in excess of the prescribed value M. Therefore, in the example shown in FIG. 20D, remote copying is resumed only for the first island, and remote copying is not resumed for the second island.

Being constituted as described hereinabove, this embodiment exhibits the following effects. In this embodiment, even when a failure occurs in a remote copy being executed among a plurality of sites 1, a copy path candidate is detected from among the paths available for remote copying, a new copy path is selected from among the selected copy path candidates, and remote copying is resumed using the new copy path. Consequently, it is possible to enhance fault resistance, and to maintain data protection reliability.

In this embodiment, because the respective sites 1 each detect a copy path candidate, and determine which of the copy path candidates should be the new copy path, there is no need to separately provide a management device for managing the storage system as a whole. That is, in this embodiment, the respective sites 1 of the storage system can each autonomously determine a new copy configuration for restoring remote copying, and can carry out arbitration among the sites 1. Therefore, this embodiment can even deal with a situation in which a plurality of failures occur simultaneously.

In this embodiment, remote copying is resumed after searching for a new copy path taking into account also the remote copy direction, and diagnosing the availability of the new copy path. Therefore, it is possible to prevent the loss of data consistency and to maintain reliability among the respective sites 1 involved in a remote copy.

In this embodiment, a diagnosis is made as to whether or not it is suitable to use the selected new copy path, and remote copying is resumed only when this use has been determined appropriate. Therefore, data consistency can be maintained and data copies can be saved to as many sites as possible even when the remote copy system is divided into a plurality of islands.

Second Embodiment

A second embodiment of the present invention will be explained based on FIGS. 21 through 26. The following embodiments, including this embodiment, correspond to variations of the first embodiment. Furthermore, in the following explanations, duplication will be omitted, and the explanations will focus on characteristic parts of the present invention.

FIG. 21 is a schematic diagram showing an example of a copy-target information table T1A. As shown in item C14 of the table T1A, in this embodiment, a copy path is selected based on "weight" instead of the number of sites on a copy path (count value). The weight, for example, is set in advance by the user.

FIG. 22 shows a site information table T2A. This table T2A manages the total value C29 of the weights of the respective copy path candidates. FIG. 23 shows a copy path management table T3A and a path configuration table T4A. Table T3A manages the total value of the weights C35 and the priorities C34 of the respective copy paths starting at the site itself. The weights of the respective sites on a copy path are respectively recorded in the path configuration table T4A.

Figure 24:
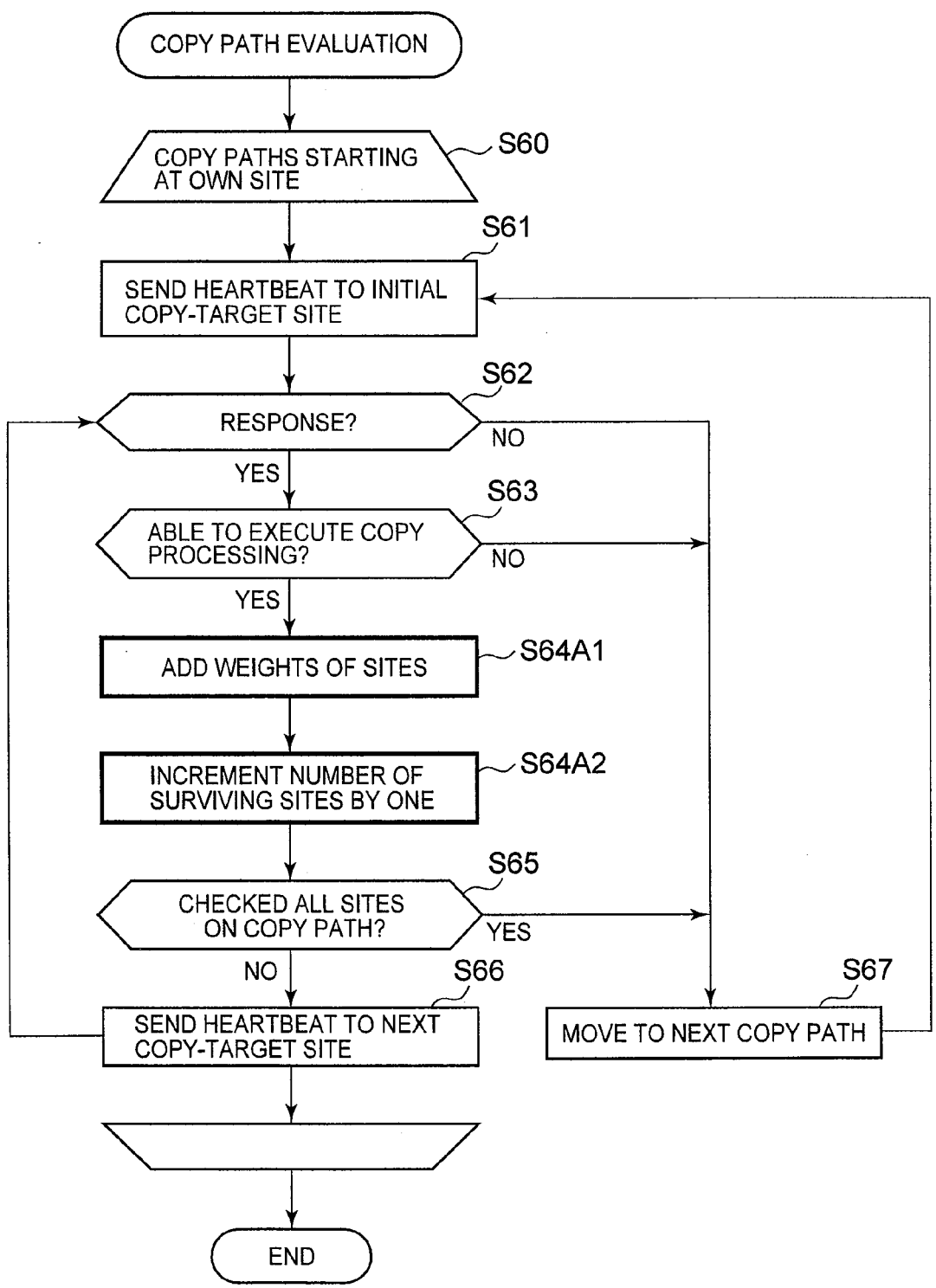
FIG. 24 is a flowchart showing a process for evaluating a copy path.

FIG. 24 is a flowchart showing the process for evaluating a copy path. This flowchart comprises numerous steps in common with the flowchart shown in FIG. 17. Focusing on the parts characteristic of this embodiment, when the host 20 determines that it is possible to copy data to the copy-target site (S63: YES), the host 20 acquires the weight associated with this copy-target site, and adds this weight to the total weight value C35 (S64A1). Furthermore, the host 20 increments by one the value of the count C33, which shows the number of sites surviving on the process-target copy path (S64A2).

Figure 25:
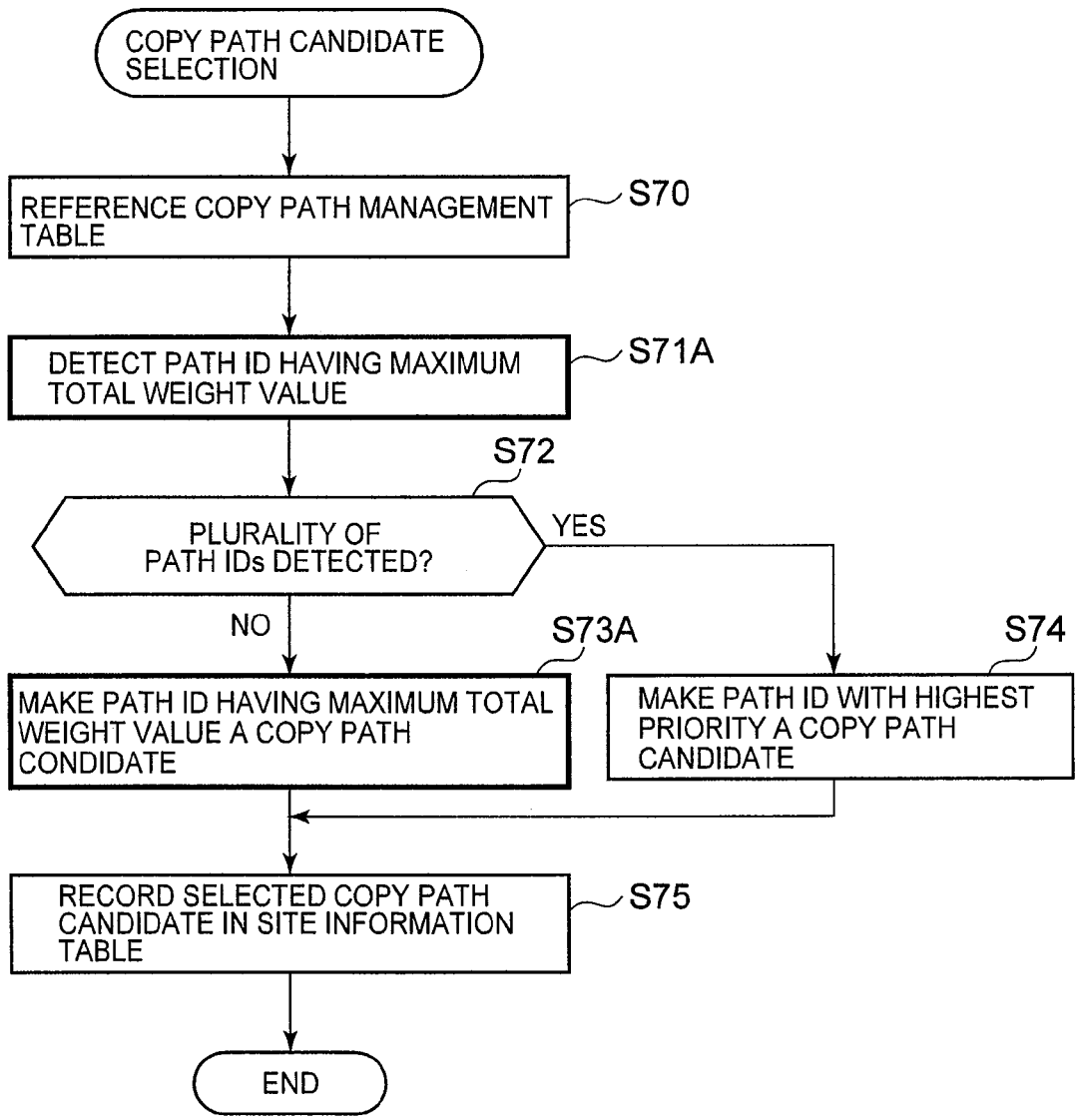
FIG. 25 is a flowchart showing a process for selecting a copy path candidate.

FIG. 25 is a flowchart showing the process for selecting a copy path candidate. This flowchart comprises steps in common with those of the flowchart shown in FIG. 18. The host 20 detects the path ID with the maximum value of the total weight value C35 of the respective path IDs (C32) registered in the copy path management table T3 (S71A).

The host 20 determines whether or not a plurality of path IDs with the maximum value of the total weight value C35 are detected (S72). When only one path ID with the maximum value of the total weight value C35 is detected (S72: NO), the host 20 selects the path having this path ID as the copy path candidate (S73A), and records the selected copy path candidate in item C28 of the site information table T2 (S75). When a plurality of path IDs with the maximum value of the total weight value C35 have been detected (S72: YES), the host 20 selects the path having the path ID with the highest priority C34 as the copy path candidate. (S74).

Figure 26:
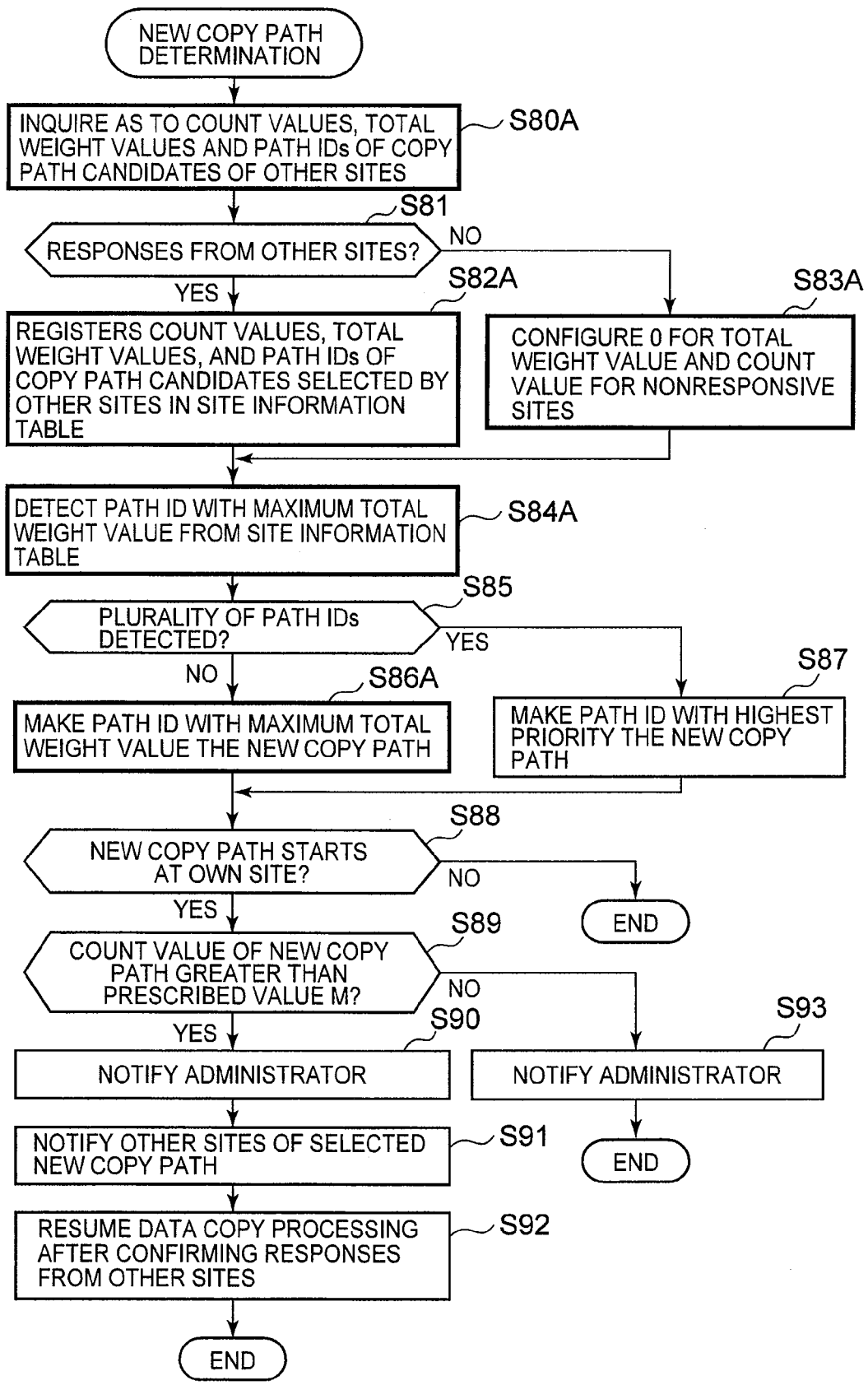
FIG. 26 is a flowchart showing a process for determining a new copy path.

FIG. 26 is a flowchart showing the process for determining a new copy path. This flowchart comprises steps in common with those of the flowchart shown in FIG. 19. The host 20 inquires about the path IDs, count values and total weight values of the copy path candidates respectively selected by the other sites 1 (S80A). When there are responses from the other sites concerning this query (S81: YES), the host 20 respectively registers the count values, total weight values, and path IDs of the copy path candidates selected by the other sites in the site information table T2 (S82A). For a site, which does not respond to the above-mentioned query (S81: NO), the host 20 configures "0" in both the count value and total weight value columns of the site information table T2 (S83A).

The host 20 detects the path ID having the maximum total weight value of the respective path IDs registered in the site information table T2 (S84A). The host 20 determines whether or not a plurality of path IDs having the maximum total weight value are detected (S85). When only one path ID having the maximum total weight value is detected (S85: NO), the host 20 selects the copy path candidate having this path ID as the new copy path (S86A). When a plurality of path IDs having the maximum total weight value are detected (S85: YES), the host 20 selects the copy path candidate having the path ID with the highest priority as the new copy path (S87).

Being constituted like this, this embodiment exhibits the same effects as the above-described first embodiment. Furthermore, in this embodiment, usability is enhanced by the fact that a new copy path is determined on the basis of a "weight" capable of being preset by the user. For example, the user can configure a large weight in advance for an important site in which he wants a data copy to be maintained.

Third Embodiment

A third embodiment will be explained on the basis of FIGS. 27 and 28. In this embodiment, when a plurality of competing copy paths exist, any one of the copy paths is selected based on the size of the total weight value.

Figure 27:
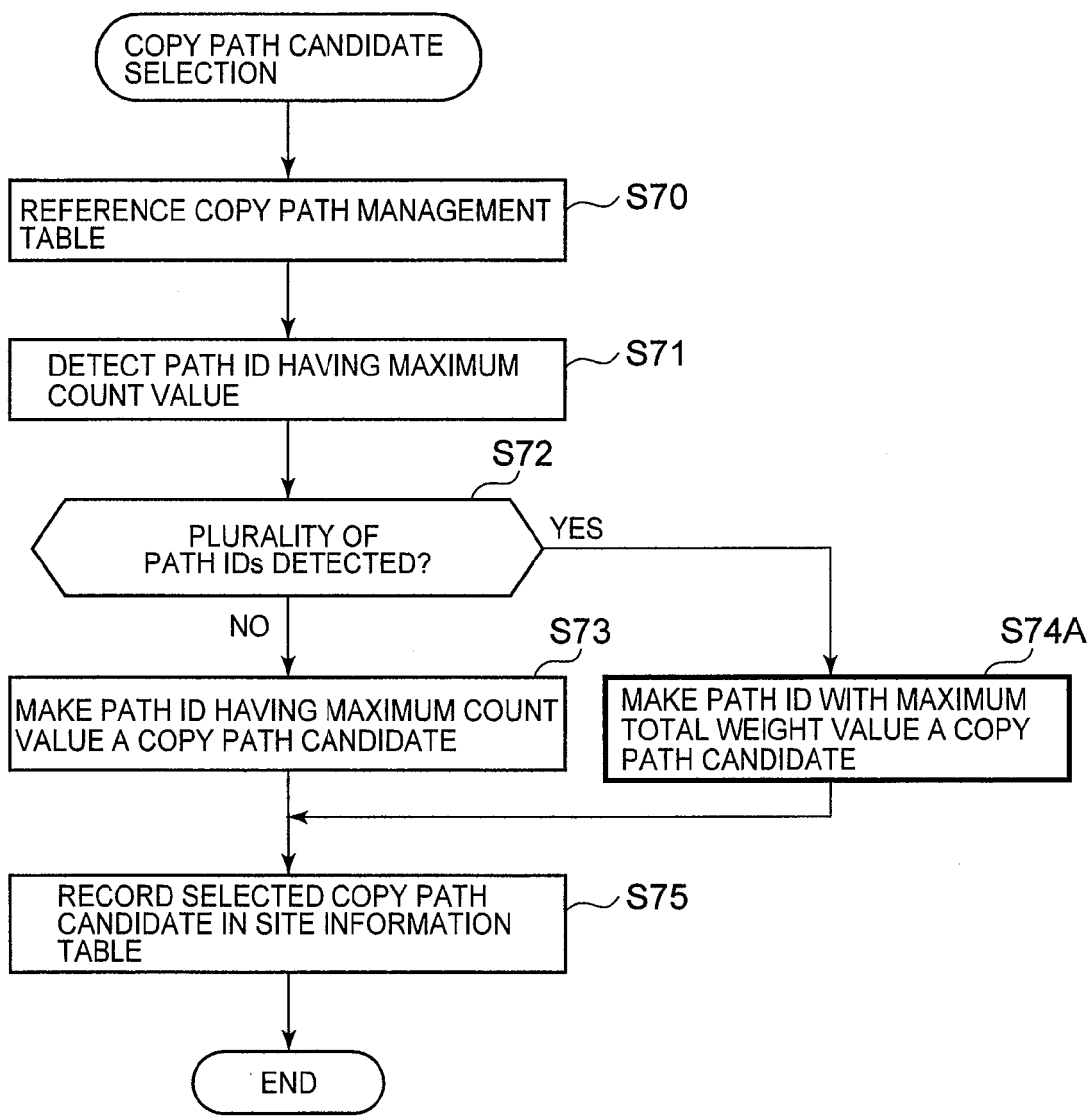
FIG. 27 is a flowchart showing a copy path candidate-selection process executed in a storage system related to a third embodiment.

FIG. 27 is a flowchart showing the process for selecting a copy path candidate in accordance with this embodiment. This process comprises steps in common with those of the flowchart shown in FIG. 18. The host 20 detects the path ID with the maximum count C33 value of the respective path IDs (C32) registered in the copy path management table T3 (S71).

The host 20 determines whether or not a plurality of path IDs with the maximum count C33 value are detected (S72). When only one path ID with the maximum count C33 value is detected (S72: NO), the host 20 selects the path having this path ID as the copy path candidate (S73). When a plurality of path IDs having the maximum count C33 value are detected (S72: YES), the host 20 selects the path having the path ID with the largest total weight value as the copy path candidate (S74A).

Figure 28:
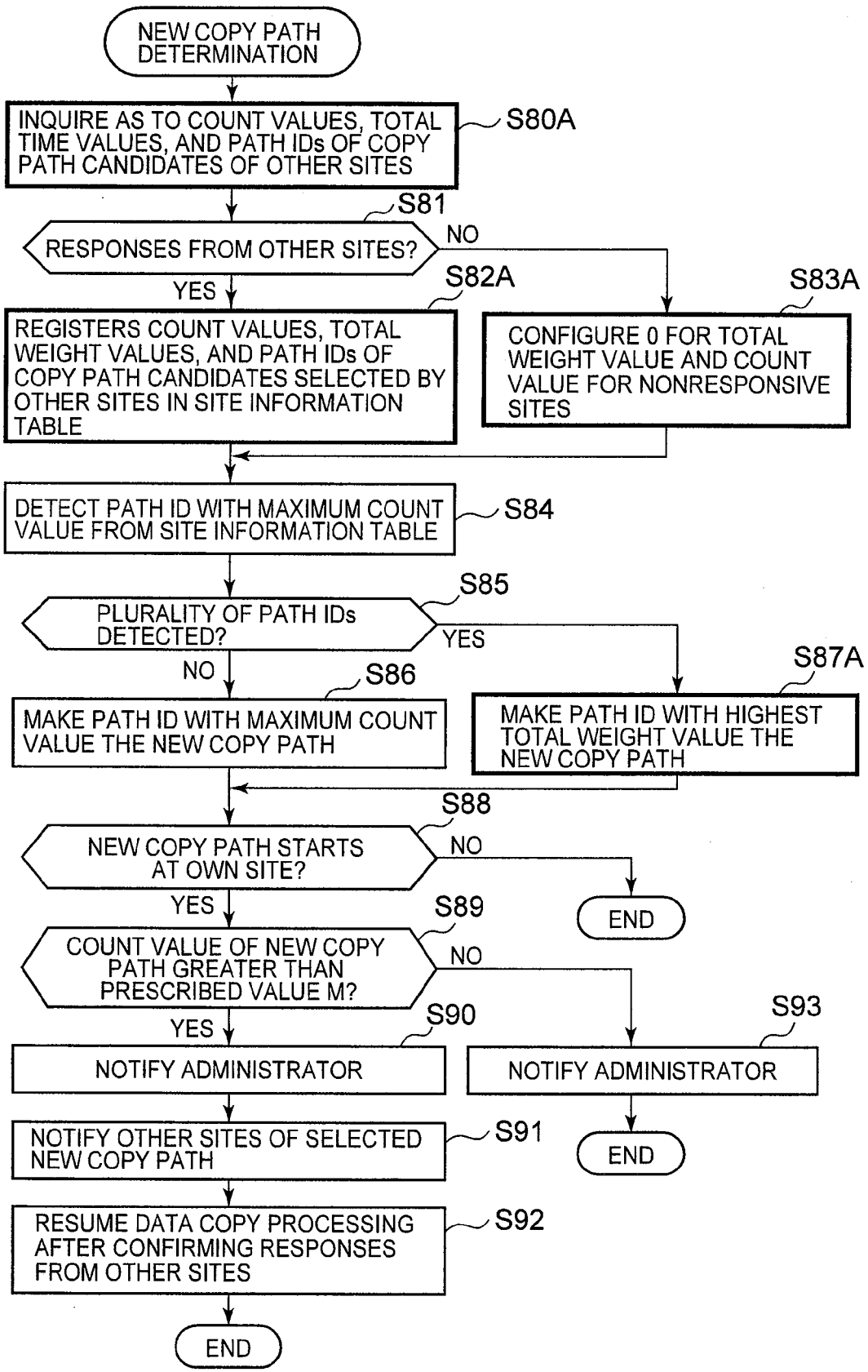
FIG. 28 is a flowchart showing a process for determining a new copy path.

FIG. 28 is a flowchart showing a process for determining a new copy path. This flowchart comprises steps in common with those of the flowchart shown in FIGS. 19 and 26. The host 20 inquires about the path IDs, count values and total weight values of the copy path candidates respectively selected by the other sites 1 (S80A).

When there are responses from the other sites concerning this query (S81: YES), the host 20 respectively registers the count values, total weight values, and path IDs of the copy path candidates selected by the other sites in the site information table T2 (S82A). For a site, which does not respond to the above-mentioned query (S81: NO), the host 20 configures "0" in both the count value and total weight columns of the site information table T2 (S83A).

The host 20 detects the path ID having the maximum count value of the respective path IDs registered in the site information table T2 (S84). The host 20 determines whether or not a plurality of path IDs having the maximum count value are detected (S85). When only one path ID having the maximum count value is detected (S85: NO), the host 20 selects the copy path candidate having this path ID as the new copy path (S86).

When a plurality of path IDs having the maximum count value are detected (S85: YES), the host 20 selects the copy path candidate having the path ID with the highest total weight value as the new copy path (S87A). Being constituted like this, this embodiment exhibits the same effects as the above-described first embodiment.

Fourth Embodiment

A fourth embodiment will be explained based on FIG. 29. In this embodiment, the total weight value is used to diagnose whether or not it is suitable to use a selected new copy path. As one example, a case, which applies the second embodiment, will be explained, but the present invention is not limited to this, and it is also possible to apply other embodiments. Similarly, the respective embodiments described hereinbelow are not limited to the embodiment shown in the figure, but rather can also make use of other embodiments.

Figure 29:
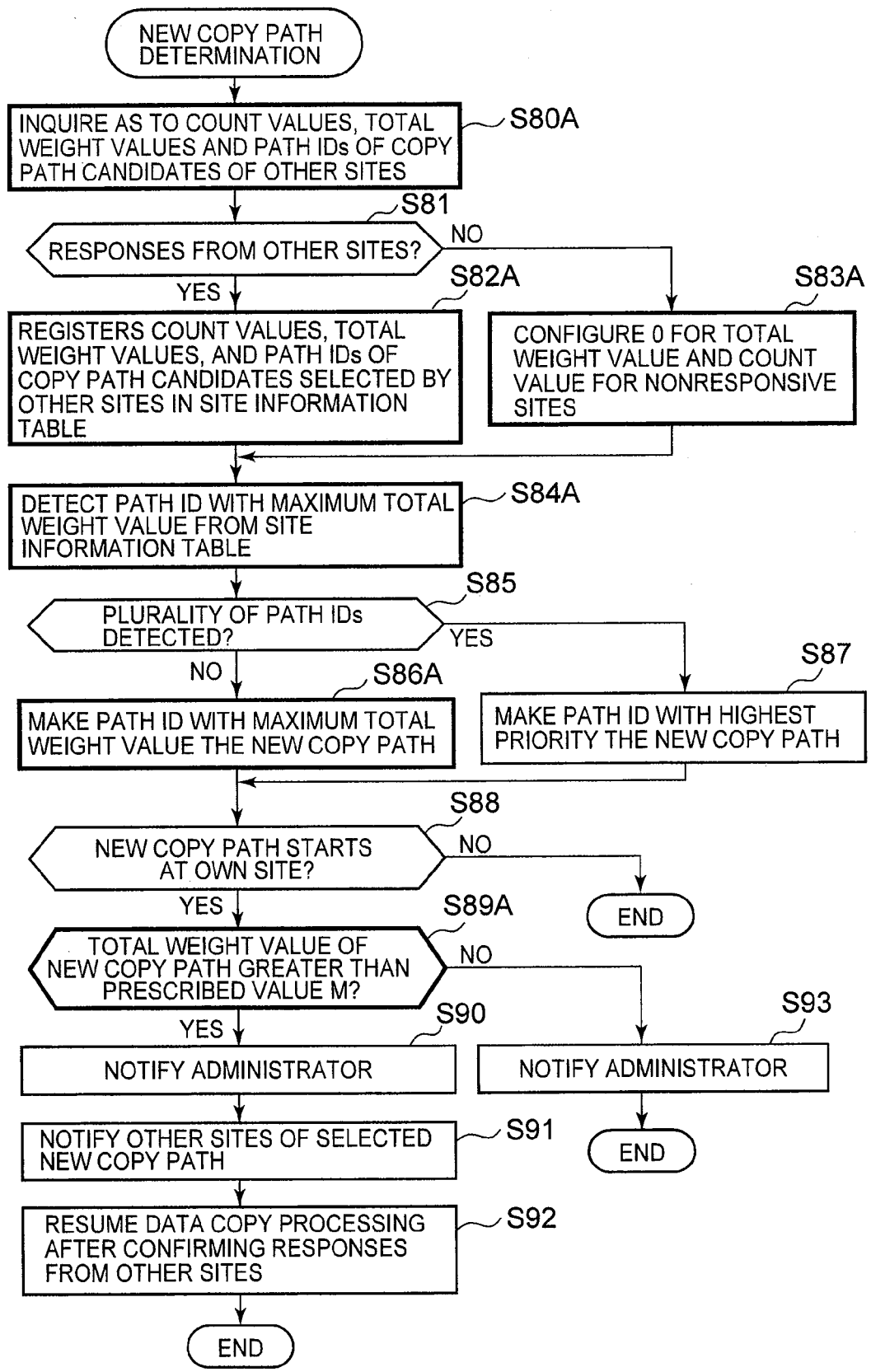
FIG. 29 is a flowchart showing a new copy path-determination process executed in a storage system related to a fourth embodiment.

FIG. 29 is a flowchart showing a process for determining a new copy path. This flowchart comprises steps in common with those of the flowchart shown in FIG. 26. In this embodiment, subsequent to "NO" being determined in S88, the host 20 determines whether or not the total weight value of the new copy path is greater than a preset prescribed value M1 (S89A).

Being constituted like this, this embodiment exhibits the same effects as the above-described first embodiment. Furthermore, in this embodiment, user usability is enhanced by the fact that the availability of the new copy path is determined on the basis of a total weight value.

For example, by the user configuring a large weight for important sites, which comprise high-performance storages 10 and large numbers of maintenance personnel, it is possible to resume remote copying in an island comprising mostly important sites even when the storage system is divided into a plurality of islands.

Fifth Embodiment

A fifth embodiment will be explained based on FIG. 30. In this embodiment, an explanation will be given of a case in which the above-described fourth embodiment is applied to the above-described third embodiment.

Figure 30:
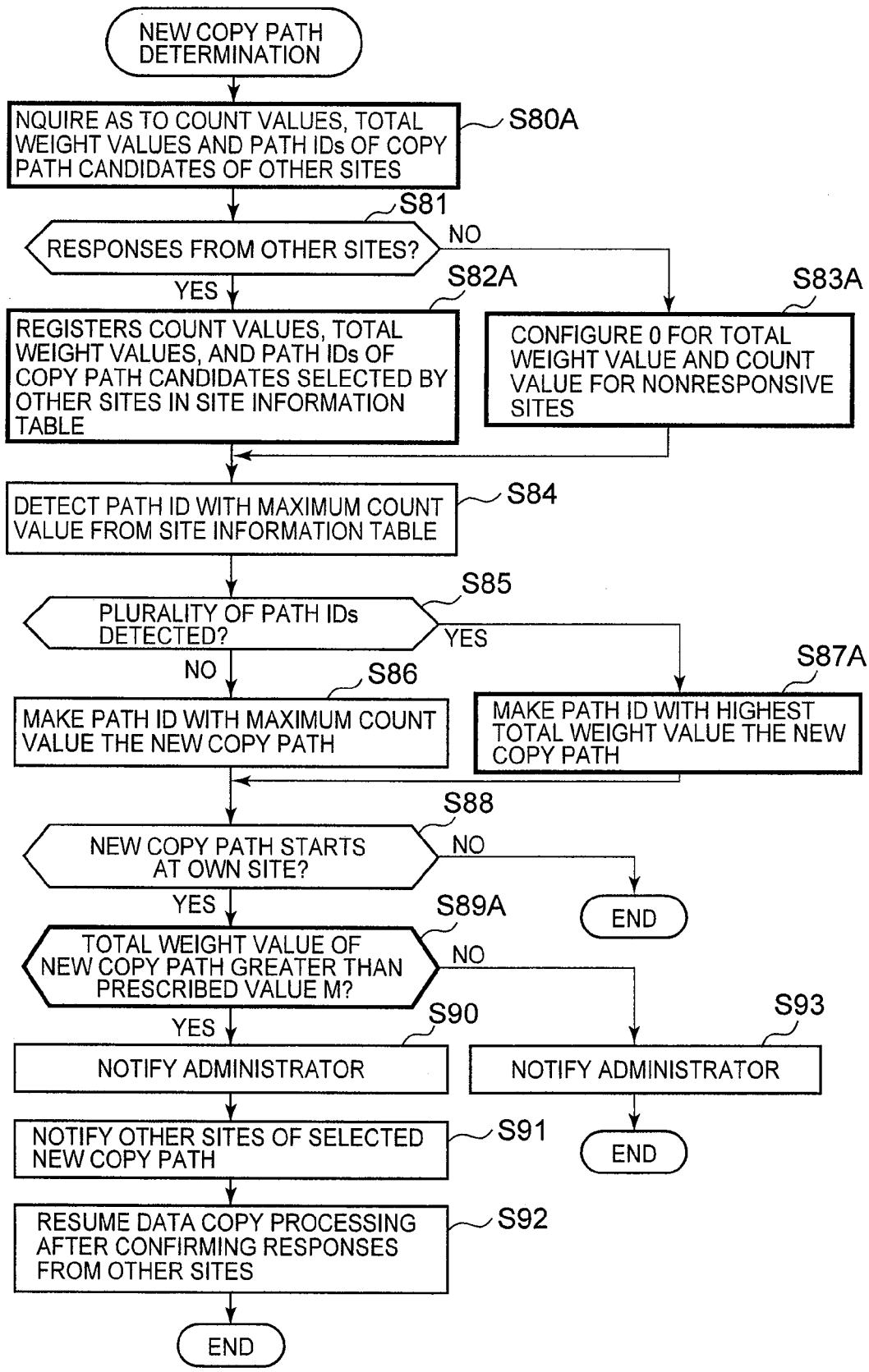
FIG. 30 is a flowchart showing a new copy path-determination process executed in a storage system related to a fifth embodiment.

FIG. 30 is a flowchart showing a process for determining a new copy path. This flowchart comprises steps in common with those of the flowchart shown in FIG. 28.

The host 20 detects the path ID having the maximum count value of the respective path IDs registered in the site information table T2 (S84). When a plurality of path IDs having the maximum count value are detected (S85: YES), the host 20 selects the copy path candidate having the path ID with the highest total weight value as the new copy path (S87A).

Then, the host 20 determines whether or not the total weight value of the new copy path is greater than a preset prescribed value M1 (S89A). Being constituted like this, this embodiment exhibits the same effects as the above-described first embodiment.

Sixth Embodiment

Figure 31:
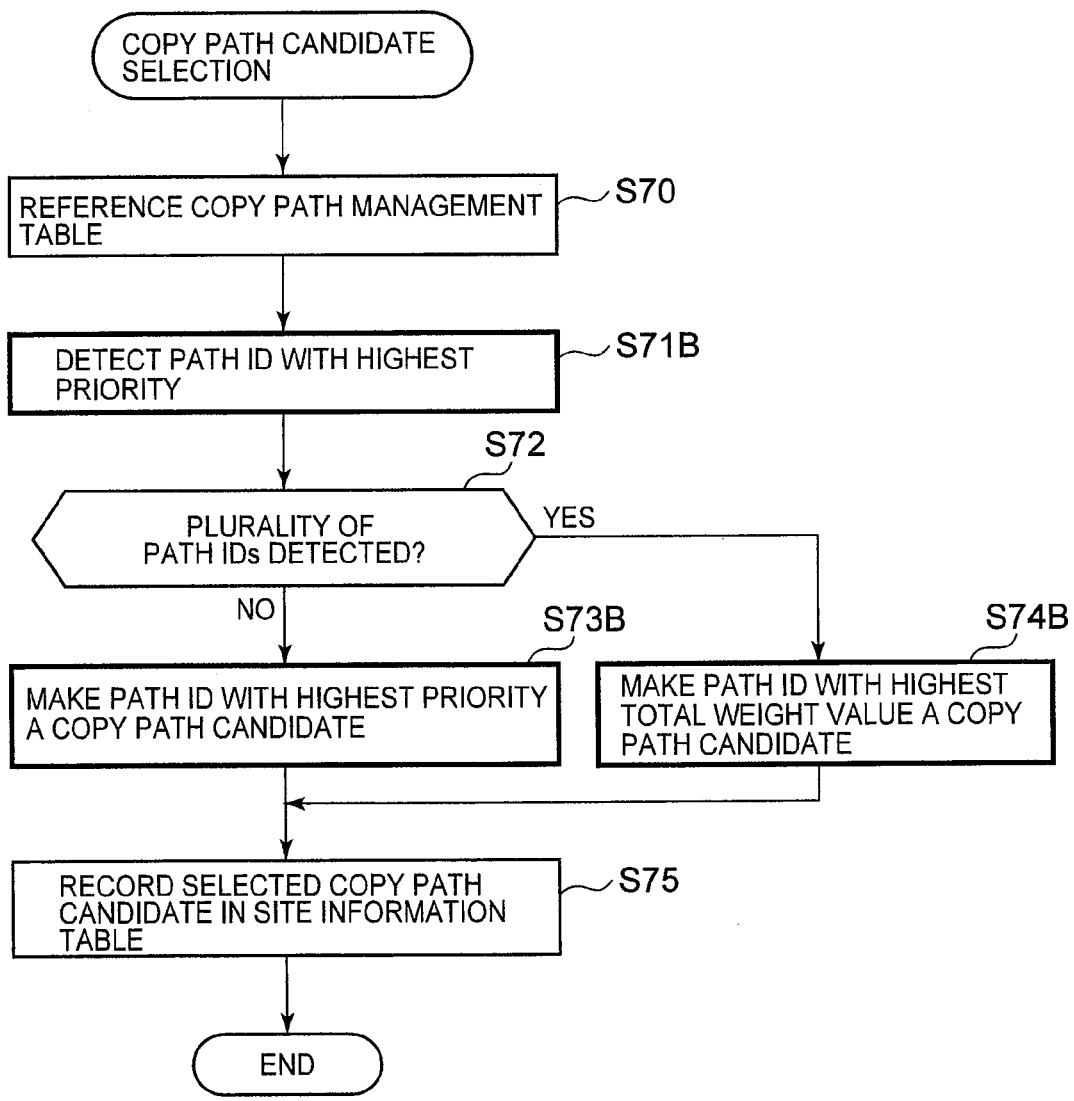
FIG. 31 is a flowchart showing a copy path candidate-selection process executed in a storage system related to a sixth embodiment.

A sixth embodiment will be explained based on FIG. 31. This embodiment selects a copy path with a high priority instead of a count value. FIG. 31 is a flowchart showing a process for selecting a copy path candidate. This flowchart comprises steps in common with those of the flowchart shown in FIG. 18.

The host 20 detects the path ID with the maximum priority C34 value of the respective path IDs (C32) registered in the copy path management table T3 (S71B). The host 20 determines whether or not a plurality of path IDs with the maximum priority C34 value are detected (S72). When only one path ID with the maximum priority C34 value is detected (S72: NO), the host 20 selects the path having this path ID as the copy path candidate (S73B).

When a plurality of path IDs with the maximum priority C34 value have been detected (S72: YES), the host 20 selects the path having the path ID with the highest total weight value as the copy path candidate (S74B).

Furthermore, although omitted from the figures, a so-called person skilled in the art will be able to understand that even in a process for determining a new copy path, first a determination is made based on the priority, and if it is not possible to decide relative merits based solely on priority, a determination can be made based on the total weight value. Being constituted like this, this embodiment exhibits the same effects as those of the above-described first embodiment.

Seventh Embodiment

A seventh embodiment will be explained based on FIGS. 32 through 37. This embodiment uses a penalty as the main evaluation criterion instead of a priority. The penalty, for example, is preset by the user.

FIG. 32 is a schematic diagram showing a copy-target information table T1B. This table T1B manages penalties C14A instead of the priorities in the above-described first embodiment. As shown in FIG. 33, the site information table T2B manages the total value of penalties C29A instead of priorities.

As shown in FIG. 34, the copy path management table T3B manages the total value of penalties C35A, and the path configuration table T4B manages the penalty of each site on a copy path.

The copy path management table T3B collectively manages site priorities as well. In this embodiment, when a determination cannot be made using penalties alone in a process for selecting a copy path candidate or a process for determining a new copy path, the "priority" is used as a secondary criterion.

Figure 35:
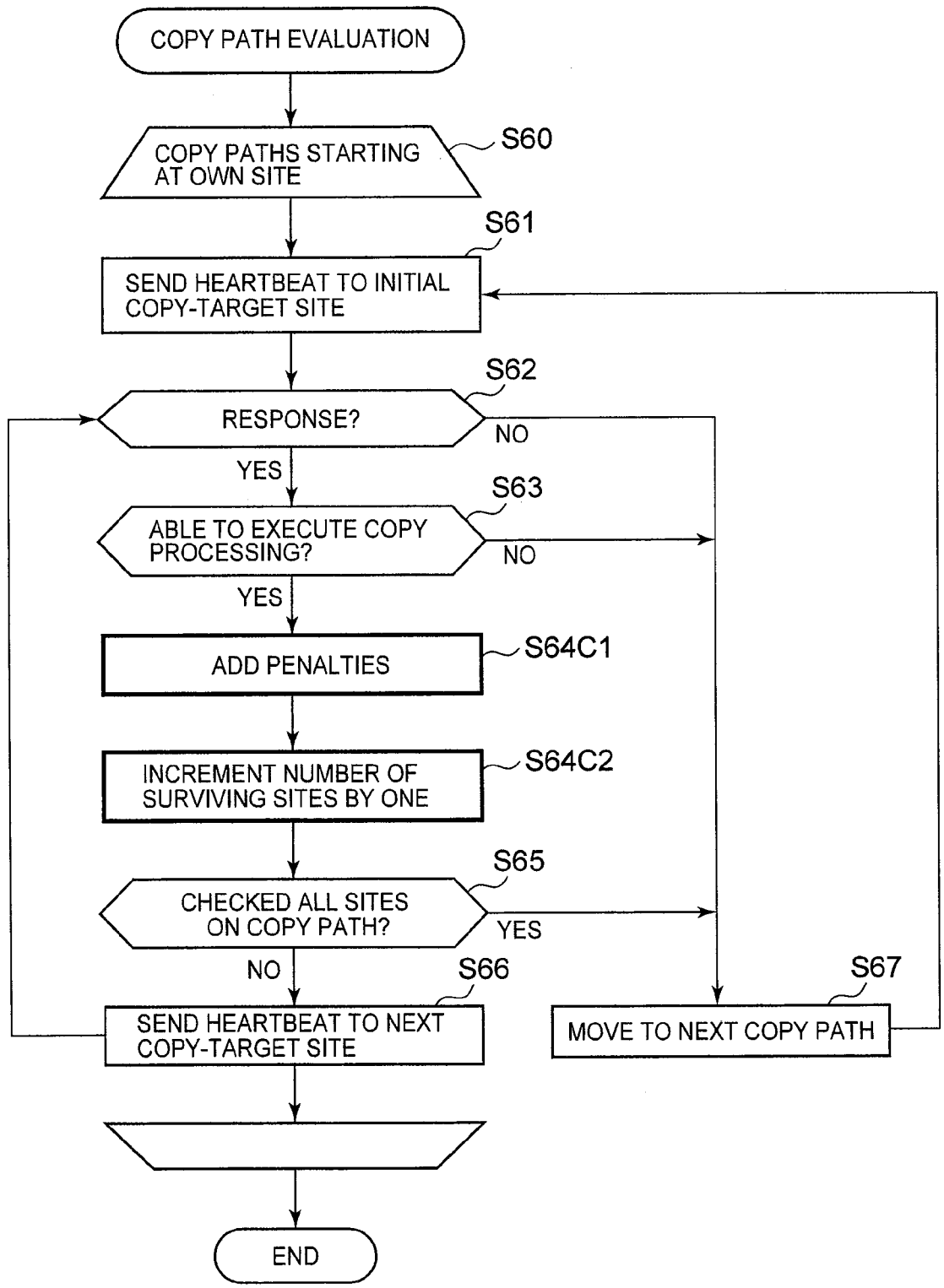
FIG. 35 is a flowchart showing a process for evaluating a copy path.

FIG. 35 is a flowchart showing a process for evaluating a copy path. The host 20 adds a penalty to a path available for remote copying (S64C1), and increments the count value by one (S64C2).

Figure 36:
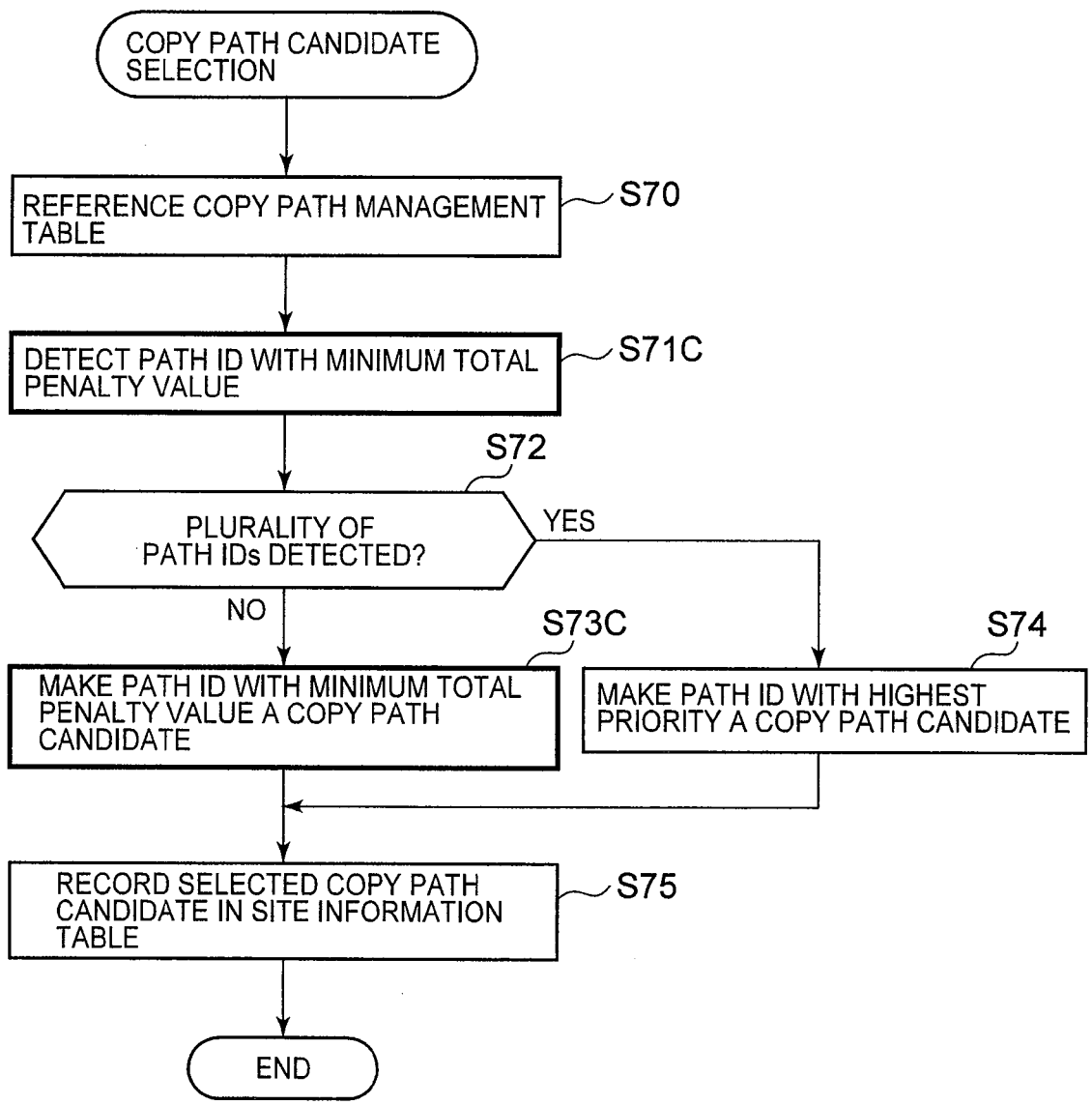
FIG. 36 is a flowchart showing a process for selecting a copy path candidate.

FIG. 36 is a flowchart showing a process for selecting a copy path candidate. The host 20 detects the path ID with the minimum total value of penalties of the respective paths available for remote copying (S71C).

When only one path ID with a minimum total penalties value is detected (S72: NO), the host 20 selects the copy path having this path ID as the copy path candidate (S73C). When a plurality of path IDs with the minimum total penalties value is detected (S72: YES), the host 20 selects the copy path having the path ID with the highest priority as the copy path candidate (S74).

Figure 37:
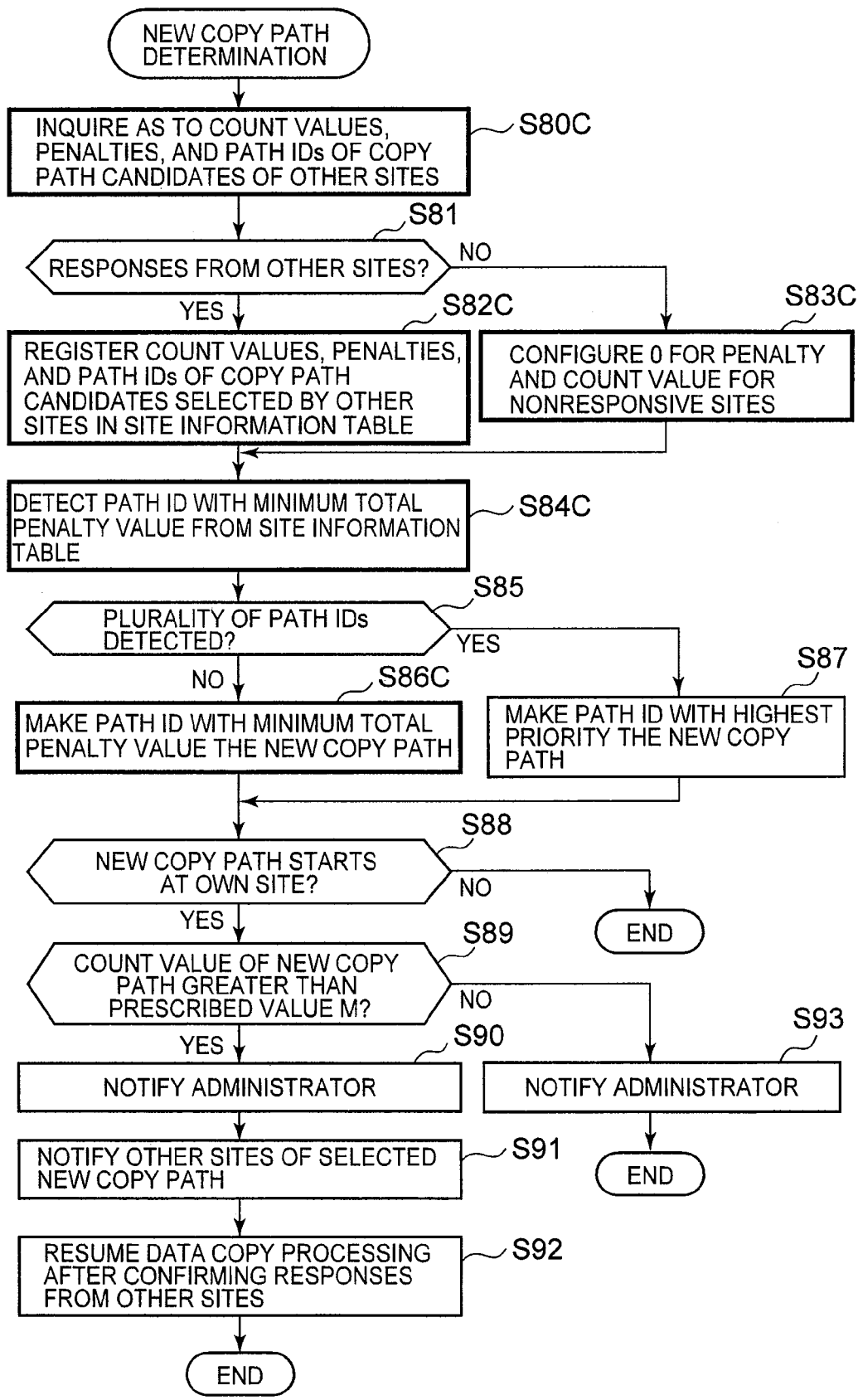
FIG. 37 is a flowchart showing a process for determining a new copy path.

FIG. 37 is a flowchart showing a process for determining a new copy path. The host 20 inquires about the path IDs, count values, and total penalties values of the copy path candidates respectively selected by the other sites 1 (S80C). The host 20 respectively registers the count values, total penalties values, and path IDs of the copy path candidates selected by the other sites in the site information table T2 (S82C). For a site, which does not respond to the query (S81: NO), the host 20 respectively configures "0" in the count value and total penalty value columns of the site information table T2 (S83C).

The host 20 detects the path ID having the minimum total penalties value of the respective path IDs registered in the site information table T2 (S84C). The host 20 determines whether or not a plurality of path IDs having the minimum total penalties value are detected (S85). When only one path ID having the minimum total penalties value is detected (S85: NO), the host 20 selects the copy path candidate having this path ID as the new copy path (S86C). When a plurality of path IDs having the minimum total penalties value are detected (S85: YES), the host 20 selects the copy path candidate having a path ID with the highest priority as the new copy path (S87). Being constituted like this, this embodiment also exhibits the same effects as the above-described first embodiment.

Eight Embodiment

An eighth embodiment will be explained based on FIGS. 38 through 43. In this embodiment, data reflection time will be used as an example of a "weight". Data reflection time is the time required until data transferred to the copy-target site is stored in the copy-target site. Data reflection time can be measured in advance. Or, the constitution can also be such that data reflection time is estimated based on one or a plurality of indices.

As shown in FIG. 38, copy-target information table T1D comprises an item C14D for managing data reflection time. As shown in FIG. 39, the site information table T2D comprises an item C29D for managing the total value of data reflection times. As shown in FIG. 40, the copy path management table T3D comprises an item C35D for managing the total value of data reflection times. The path configuration table T4D manages information for identifying the respective sites, together with the data reflection times configured for these sites.

Figure 41:
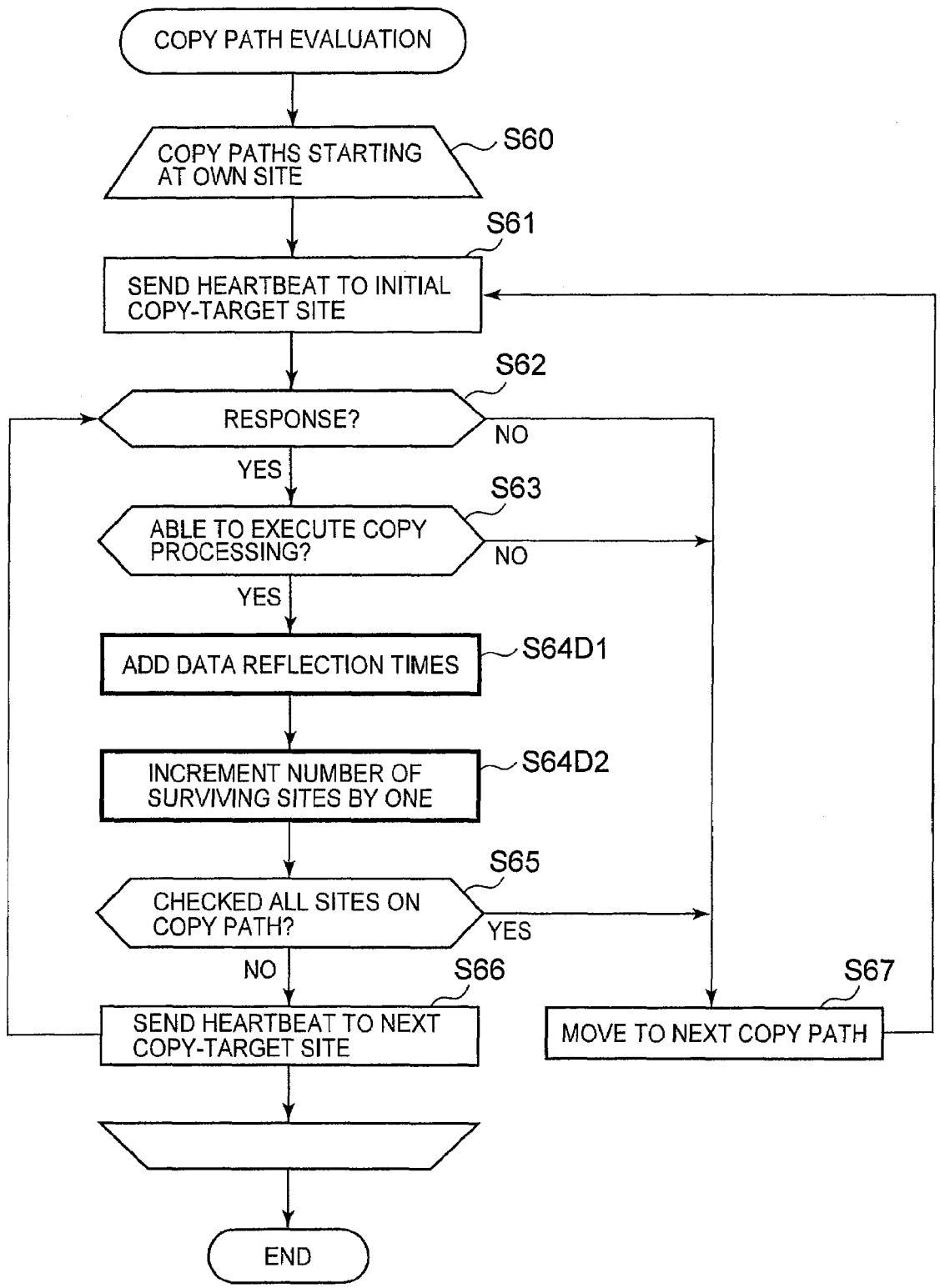
FIG. 41 is a flowchart showing a process for evaluating a copy path.

FIG. 41 is a flowchart showing a process for evaluating a copy path. The host 20 adds a data reflection time to a path available for remote copying (S64D1), and increments the count value by one (S64D2).

Figure 42:
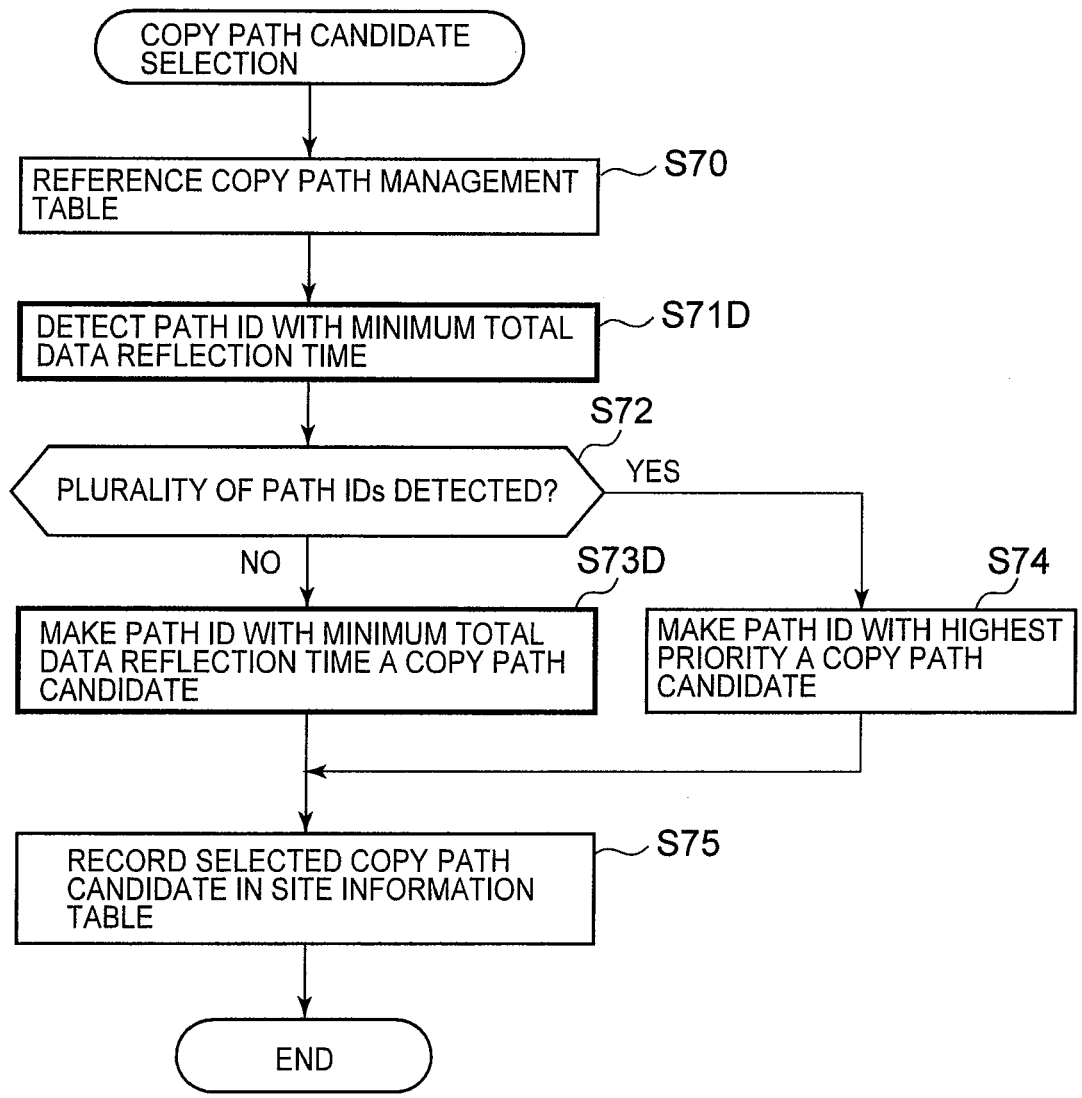
FIG. 42 is a flowchart showing a process for selecting a copy path candidate.

FIG. 42 is a flowchart showing a process for selecting a copy path candidate. The host 20 detects the path ID with the minimum total value of data reflection times of the respective paths available for remote copying (S71D). When only one path ID with the minimum total value of data reflection times is detected (S72: NO), the host 20 selects the copy path having this path ID as the copy path candidate (S73D). When a plurality of path IDs with the minimum total value of data reflection times have been detected (S72: YES), the host 20 selects the copy path having the path ID with the highest priority as the copy path candidate (S74).

Figure 43:
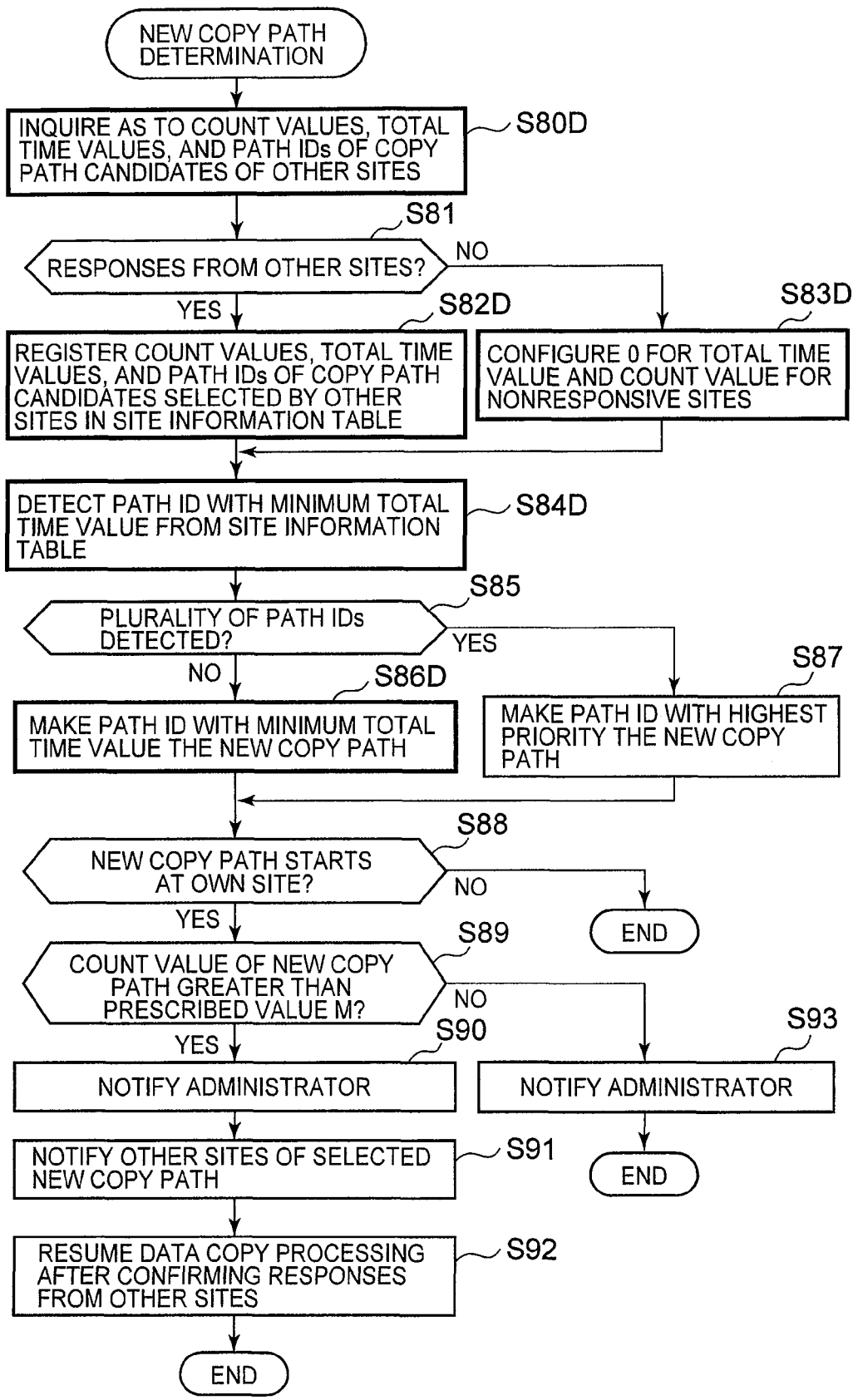
FIG. 43 is a flowchart showing a process for determining a new copy path.

FIG. 43 is a flowchart showing a process for determining a new copy path. The host 20 inquires about the path IDs, count values, and total data reflection time values of the copy path candidates respectively selected by the other sites 1 (S80D). The host 20 respectively registers the count values, total data reflection time values, and path IDs of the copy path candidates selected by the other sites in the site information table T2 (S82D). For a site, which does not respond to the query (S81: NO), the host 20 respectively configures "0" in the count value and total data reflection time value columns of the site information table T2 (S83D).

The host 20 detects the path ID having the minimum total data reflection time value of the respective path IDs registered in the site information table T2 (S84D). The host 20 determines whether or not a plurality of path IDs having the minimum total data reflection time value are detected (S85). When only one path ID having the minimum total data reflection time value is detected (S85: NO), the host 20 selects the copy path candidate having this path ID as the new copy path (S86D). When a plurality of path IDs having the minimum total data reflection time value are detected (S85: YES), the host 20 selects the copy path candidate having a path ID with the highest priority as the new copy path (S87). Being constituted like this, this embodiment also exhibits the same effects as the above-described first embodiment.

Ninth Embodiment

A ninth embodiment will be explained based on FIG. 44. In this embodiment, "recovery time" will be used as another example of a "weight". Recovery time signifies the time required for booting up from a standby state. Recovery time, for example, can be preset taking into account the time required to start up an application program, and the number and quality of maintenance personnel assigned to the site.

Other configurations can be constituted the same as in the above-mentioned eighth embodiment. The "data reflection time" in the eighth embodiment can be replaced by "recovery time". Being constituted like this, this embodiment also exhibits the same effects as the above-described first embodiment.

Tenth Embodiment

Figure 45:
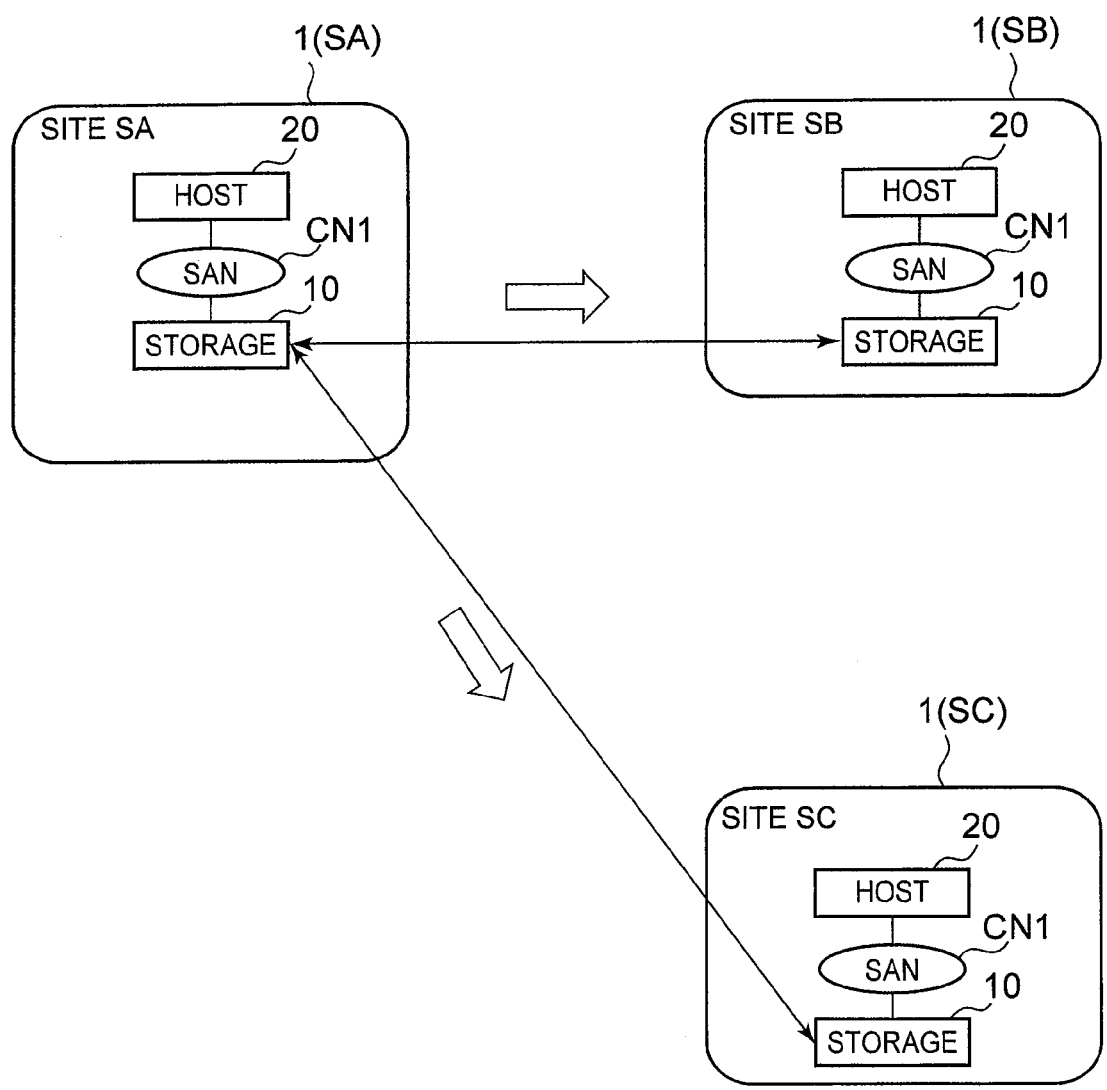
FIG. 45 is a schematic diagram showing a portion of a storage system related to a tenth embodiment.

A tenth embodiment will be explained based on FIGS. 45 through 47. In this embodiment, the transfer of data from the same copy-source site to a plurality of copy-target sites will be explained. FIG. 45 is a schematic diagram showing a portion of the storage system according to this embodiment.

A copy-source site 1 (SA) is respectively connected to a plurality of copy-target sites 1 (SB) and 1 (SC), and the same write data is transferred to the respective copy-target sites 1 (SB) and 1 (SC). A configuration, which transfers data from one copy-source site to a plurality of copy-target sites like this may be called a multi-target configuration in the following explanation.

Figure 46:
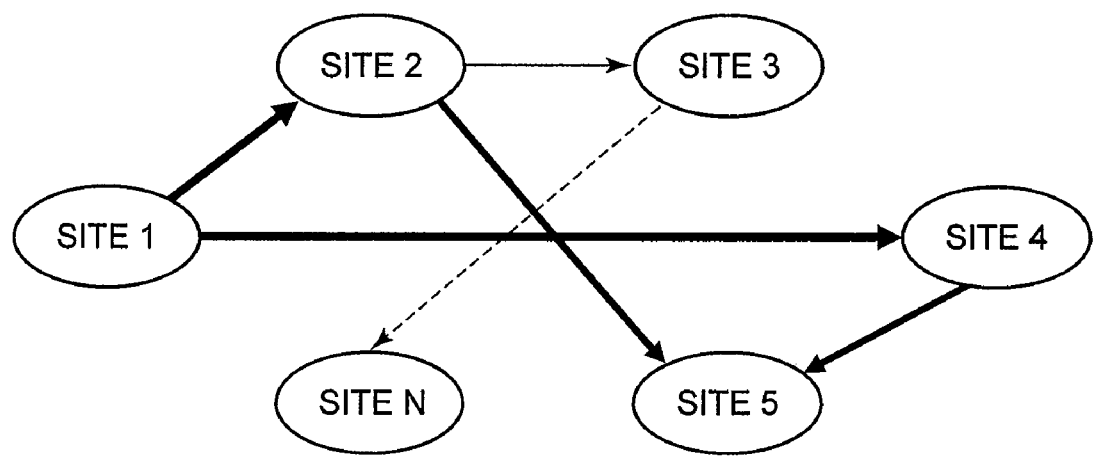
FIG. 46 is a schematic diagram showing how data is sent from one copy-source site to a plurality of copy-target sites.

FIG. 46 shows a case in which this embodiment is applied to the configuration of the above-described first embodiment. For example, site 1 (1) simultaneously sends remote copy-target data to site 1 (2) and site 1 (4). Site 1 (2) simultaneously sends remote copy-target data to site 1 (3) and site 1 (5).

FIG. 47 is a schematic diagram showing examples of a copy path management table T3F and a path configuration table T4F. Focusing on the path configuration table T4F (1) related to site 1 (1), site 1 (2) and site 1 (4) are configured as initial copy-target sites (first connection-target sites). Site 1 (3) and site 1 (5) are configured as the next connection-target sites (second connection-target sites). Being constituted like this, this embodiment also exhibits the same effects as the above-described first embodiment.

Eleventh Embodiment

An eleventh embodiment will be explained based on FIGS. 48 through 50. This embodiment executes remote copying in the asynchronous mode. In the above-described first embodiment, synchronous mode remote copying, in which the copy-source site notifies the host 20 that processing has ended subsequent to receiving an end notification from the copy-target site. In the synchronous mode, the end of processing is reported to the host 20 after confirming that the data has reached the respective sites. Therefore, the data stored at the respective sites can be made to coincide. At the same time, since it is necessary to wait for a response (process-end notification) from the copy-target site, it takes time to report the end of processing to the host 20. For example, the more the number of sites associated with remote copying increases, or the longer the physical distance between the respective sites, the more time it takes until the end of processing is reported to the host 20.

By contrast, when remote copying is carried out in the asynchronous mode, the end of processing can be reported to the host 20 without waiting for a response from the copy-target site. Therefore, the latency of the remote copy system can be improved more than in the synchronous mode. However, it is not possible to guarantee that the data stored at the respective sites is the same since no confirmation is made as to whether or not processing at the copy-target site has ended.

Figure 48:
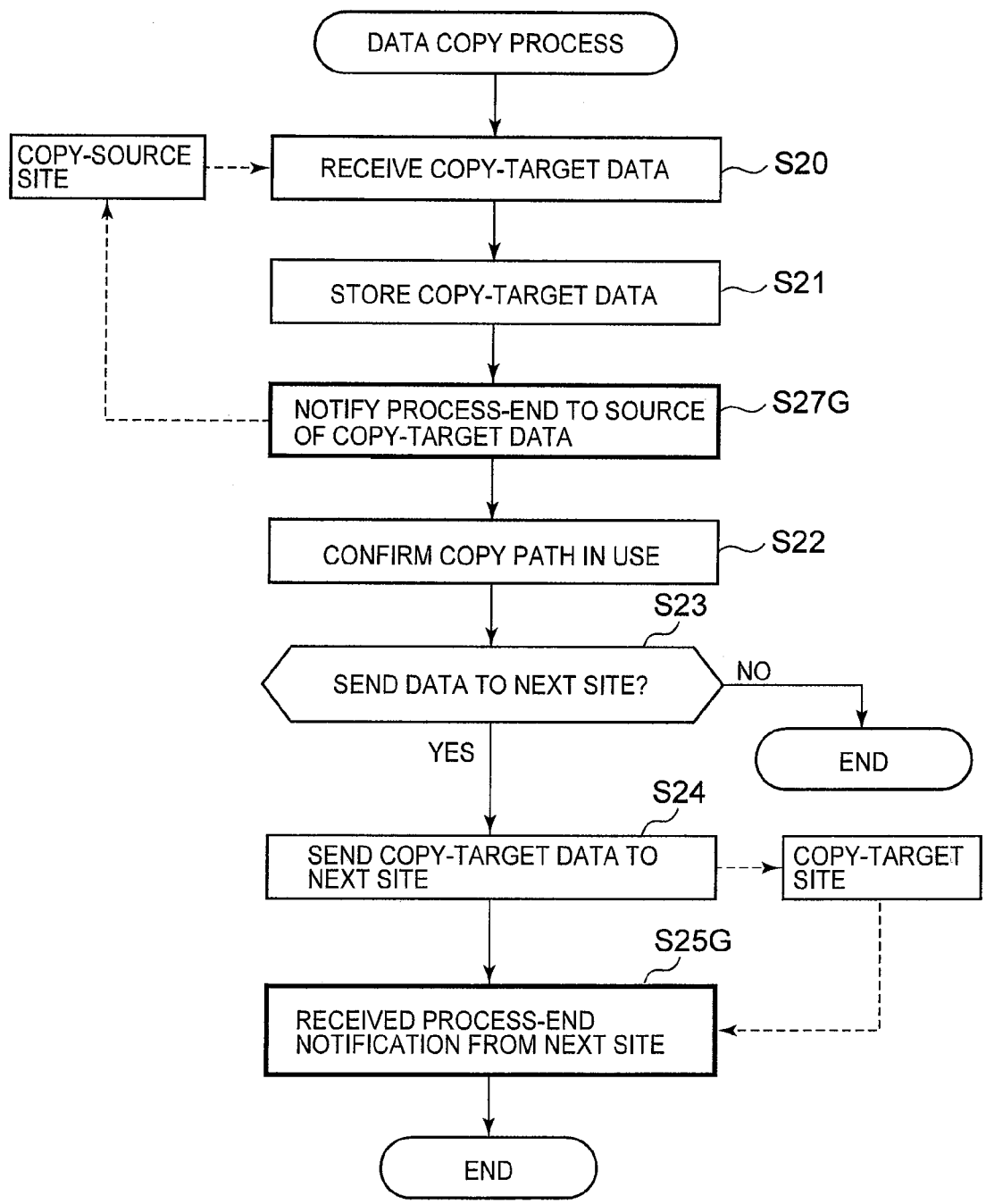
FIG. 48 is a flowchart showing a data copy process executed in a system related to an eleventh embodiment.

FIG. 48 is a flowchart showing a data copy process according to this embodiment. The storage 10, upon receiving data from the source storage 10 (S20), stores this data in the logical volume 122 (S21). The storage 10 reports process-end to the source storage 10 (S27G).

The storage 10 checks the remote copy path currently being used (S22), and determines whether or not to send data to the next site (S23). When its own site is the remote copy ending point (S23: NO), the storage 10 proceeds to S26.

When a site to which data should be sent exists (S23: YES), the storage 10 sends data, which has been targeted for remote copying, to the storage 10 inside the copy-target site (next site) (S24). Upon receiving a process-end notification from the storage 10 inside the copy-target site (S25G), the storage 10 ends this process.

Figure 49:
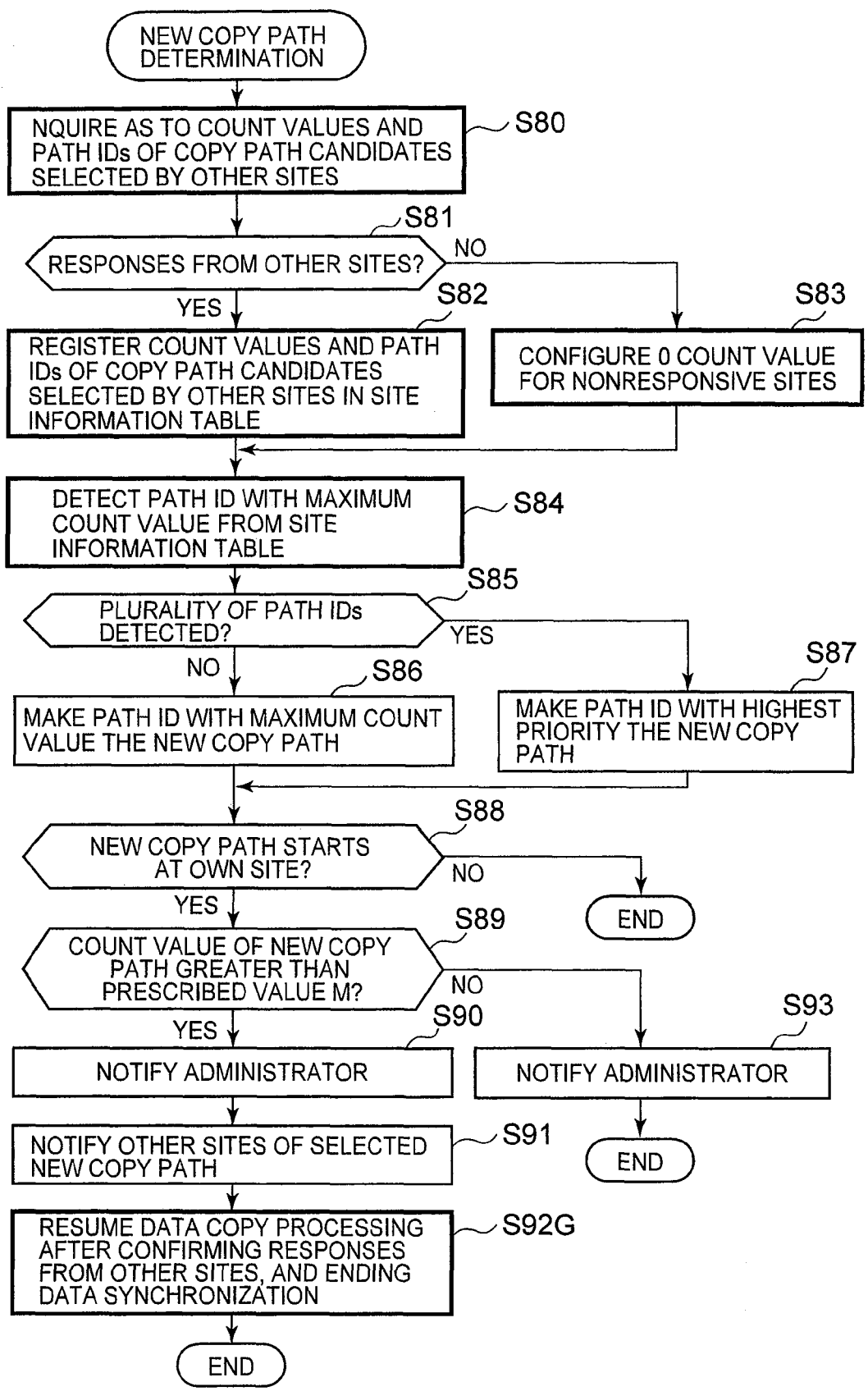
FIG. 49 is a flowchart showing a process for determining a new copy path.

FIG. 49 is a flowchart showing a process for determining a new copy path. In this process, the host 20 notifies the other sites 1 that a new copy path will be used to resume remote copying (S91). Then, the host 20 resumes remote copy processing after confirming the responses from the other sites and synchronizing the data among the respective sites (S92G).

Figure 50:
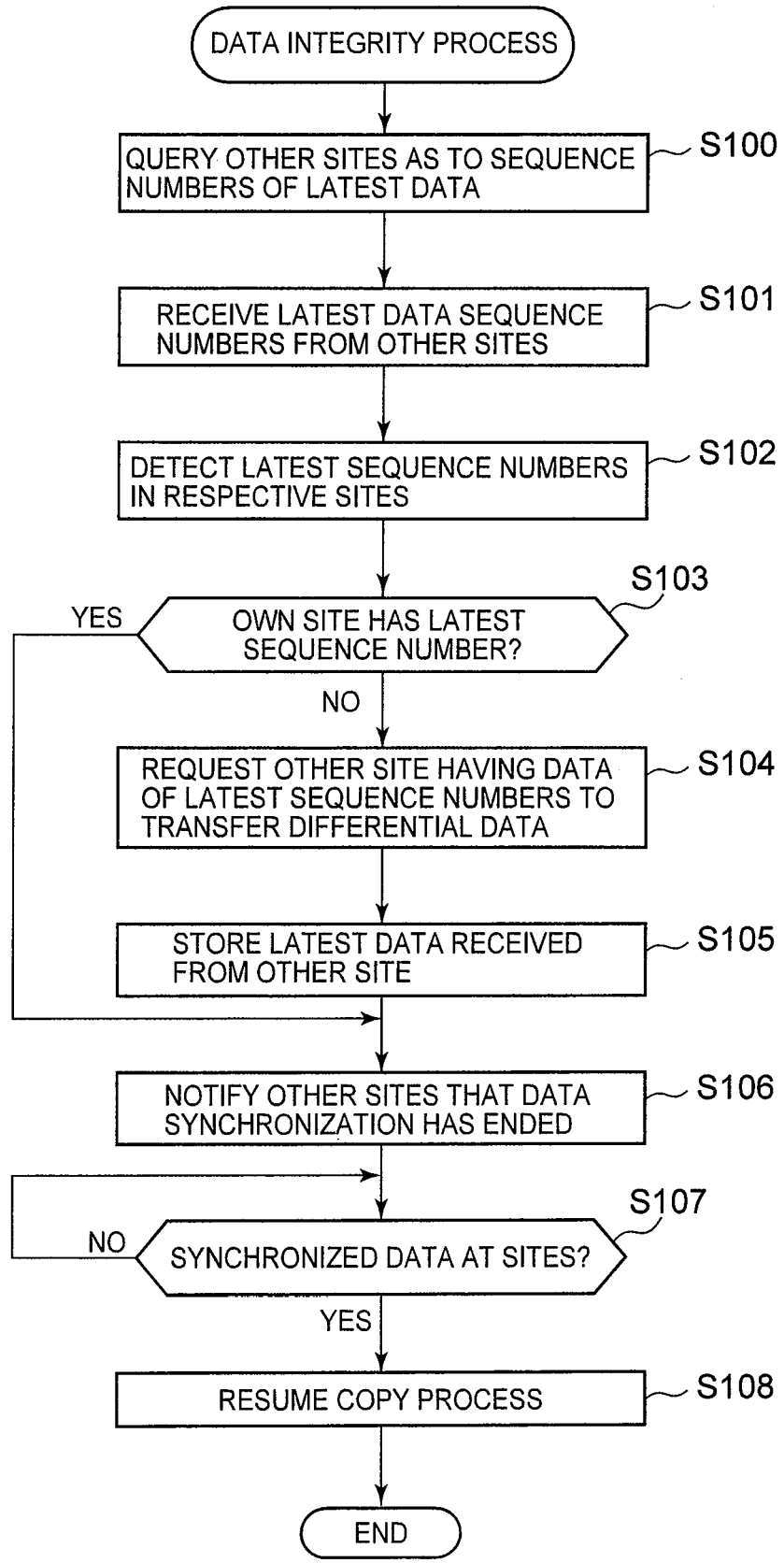
FIG. 50 is a flowchart showing a process for synchronizing data among the respective sites.

FIG. 50 is a flowchart showing the details of S92G in FIG. 49. The host 20 queries the other sites associated with the resumed remote copy about the sequence numbers configured in the latest data being stored in the respective sites (S100).

The host 20 receives the sequence numbers of the latest data from the other sites (S101), and detects the latest sequence numbers for all the sites (including its own site) associated with remote copying (S102).

The host 20 determines whether or not the sequence numbers of the data stored in its own site are the latest (S103), and when the sequence numbers related to its own site are not the latest (S103: NO), requests another site, which has the latest sequence numbers, for the data, which differs from the data of its own site (S104). A site having the latest data can also be called a reference site. The host 20 writes the differential data received from the reference site to the logical volume 122, and updates the data stored in its own site with the latest content (S105).

The host 20 respectively notifies the other sites to the effect that data synchronization processing (S105) has ended (S106). The host 20 stands by until notifications showing that data synchronization processing has ended are received from the other sites (S107). Upon confirming that data has been synchronized among the sites (S107: YES), the host 20 resumes remote copying using the new copy path (S108). Furthermore, when the sequence numbers of the data stored in its own site are the latest (S103: YES), the host 20 proceeds to S106.

More specifically, for example, when the latest data sequence number maintained in site 1 (2) is #100, the latest data sequence number maintained in site 1 (3) is #95, and the latest data sequence number maintained in site 1 (4) is #90, the latest sequence number is #100 of site 1 (2). Site 1 (2) becomes the reference site for the synchronization process, which is executed prior to resuming remote copying.

Site 1 (3) requests differential data from #96 to #100 from site 1 (2), and updates the data maintained in site 1 (3) with the latest content. Similarly, site 1 (4) acquires differential data from #91 to #100 from site 1 (2), and updates the data maintained in site 1 (4) with the latest content. By so doing, it is possible to synchronize the data among the respective sites 1 (2), 1 (3) and 1 (4). Remote copying is resumed subsequent to the synchronization of data among the respective sites 1 (2), 1 (3) and 1 (4) ending.

Being constituted like this, this embodiment also exhibits the same effects as the above-described first embodiment. Furthermore, in this embodiment, it is possible to carry out remote copying among a plurality of sites using the asynchronous mode. Therefore, remote copying can be carried out relatively quickly even when there are numerous sites, when the physical distance between sites is long, or when the communication speed between sites varies. Further, when a failure occurs, remote copying is resumed after synchronizing the data stored in the respective sites, thereby enabling reliable remote copying to be carried out.

Twelfth Embodiment

A twelfth embodiment will be explained based on FIG. 51. In this embodiment, a site 1 (SC), which receives remote copy-target data can receive the remote copy-target data from either one of the plurality of sites 1 (SA) and 1 (SB), which are capable of becoming copy sources.

Figure 51:
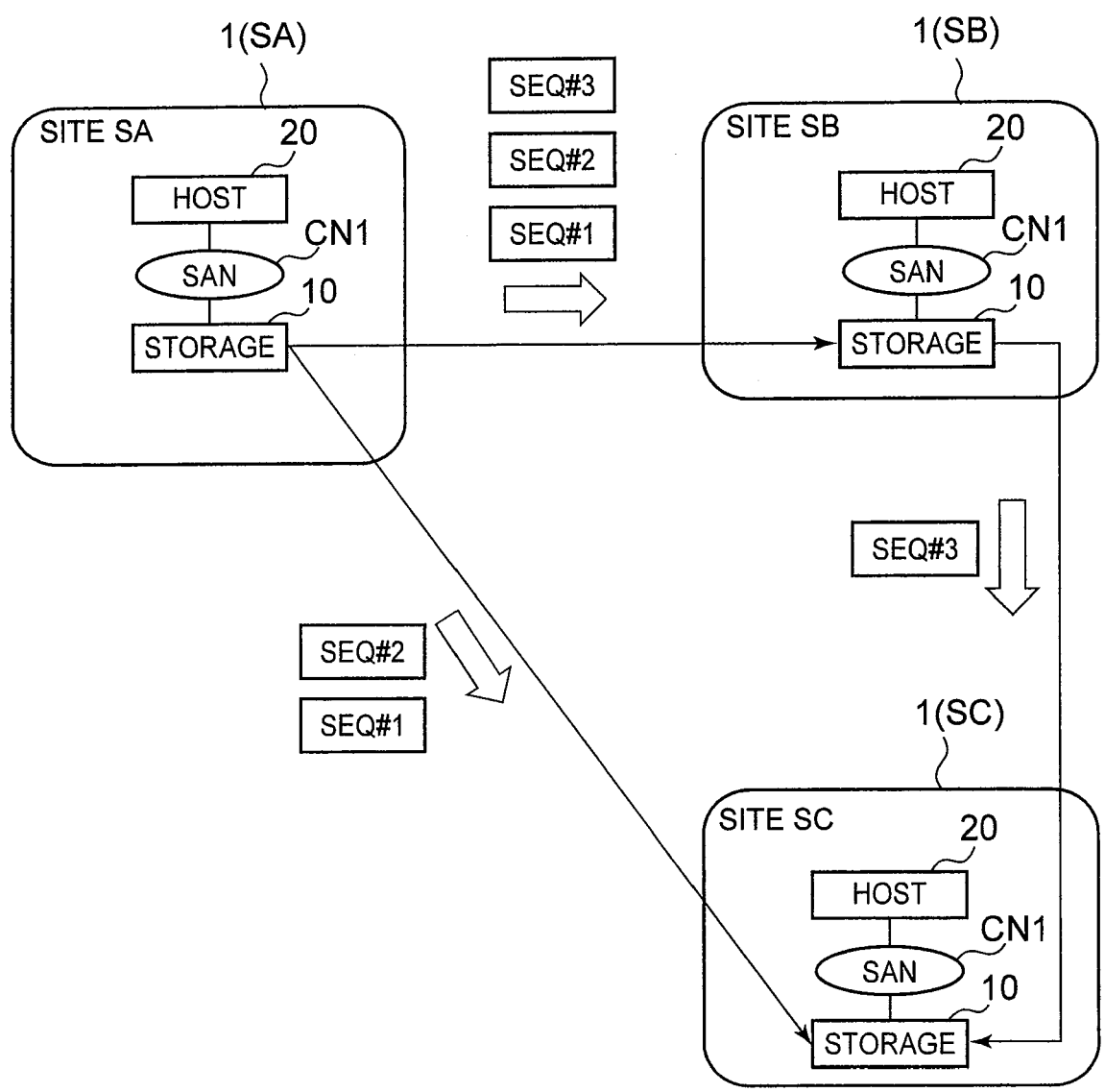
FIG. 51 is a schematic diagram showing a portion of a storage system related to a twelfth embodiment.

FIG. 51 is a schematic diagram showing a portion of the storage system of this embodiment. The respective sites 1 (SA), 1 (SB) and 1 (SC) are respectively connected via communication paths. Site 1 (SA) can send data to both site 1 (SB) and site 1 (SC). Site 1 (SB) can send data to site 1 (SC). Therefore, site 1 (SC) cam receive data from site 1 (SA) and site 1 (SB).

Site 1 (SC) receives data (SEQ#1, SEQ#2) from site 1 (SA), and receives data (SEQ#3) from site 1 (SB). For example, when the communication speed between site 1 (SB) and site 1 (SC) is faster than the communication speed between site 1 (SA) and site 1 (SC), site 1 (SC) can switch the copy-source site from site 1 (SA) to site 1 (SB).

Thirteenth Embodiment

Figure 52:
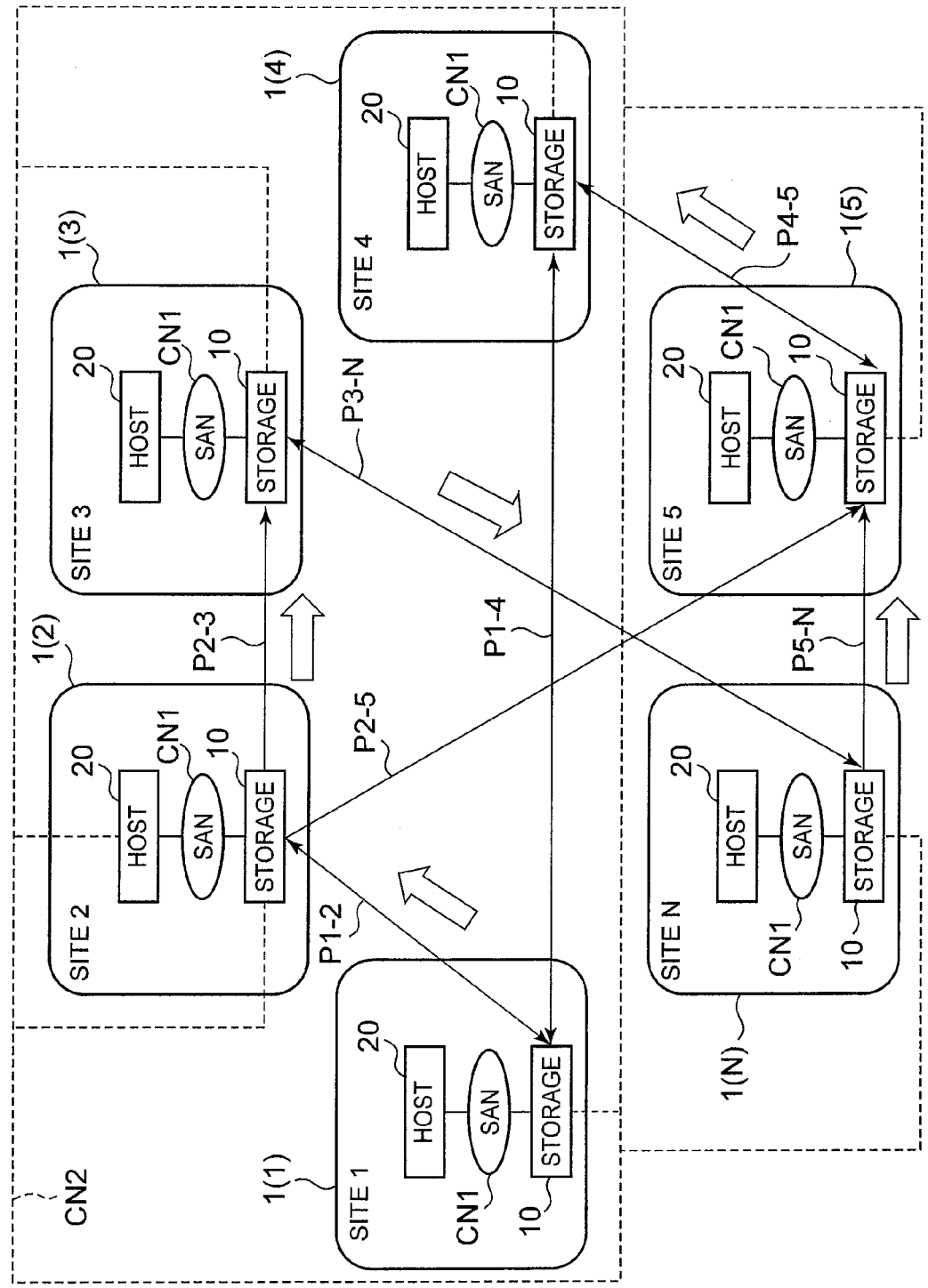
FIG. 52 is a schematic diagram showing a storage system related to a thirteenth embodiment.

A thirteenth embodiment will be explained based on FIG. 52. In this embodiment, the storages 10 inside the respective sites 1 are connected via the management network CN2. That is, the respective storages 10 comprise the above-mentioned function for resuming remote copying.

Therefore, in this embodiment, the various processes of checking for paths available for remote copying, selecting copy path candidates, and determining a new copy path are executed by the respective storages 10. The hosts 20 of the respective sites 1 do not need to be aware of the resumption of remote copying, and do not need to issue indications for the resumption of remote copying. When a failure occurs during remote copying, the respective storages 10 can be constituted to receive an access request (especially a write request) from the host 20 connected to itself, and to receive an access request subsequent to remote copying have been resumed. Being constituted like this, this embodiment also exhibits the same effects as the above-described first embodiment.

Fourteenth Embodiment

Figure 53:
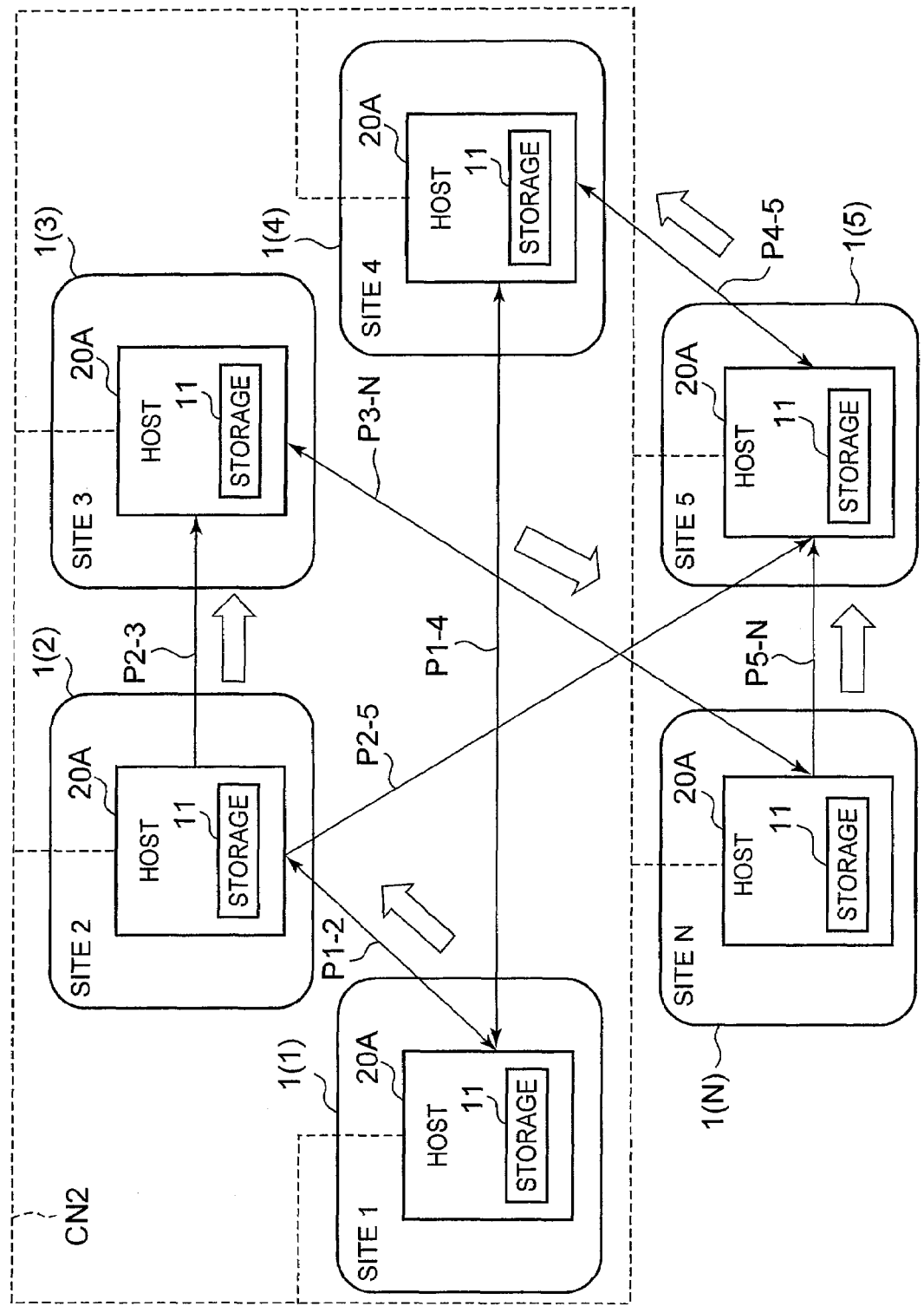
FIG. 53 is a schematic diagram showing a storage system related to a fourteenth embodiment.

A fourteenth embodiment will be explained based on FIG. 53. In this embodiment, storage 11 functions are built into the respective hosts 20A. That is, the respective hosts 20A are constituted as NAS (Network Attached Storage) servers. In this embodiment, all processing, including data copy processing, can be executed by the respective hosts 20A. Being constituted like this, this embodiment also exhibits the same effects as the above-described first embodiment.

Fifteenth Embodiment

Figure 54:
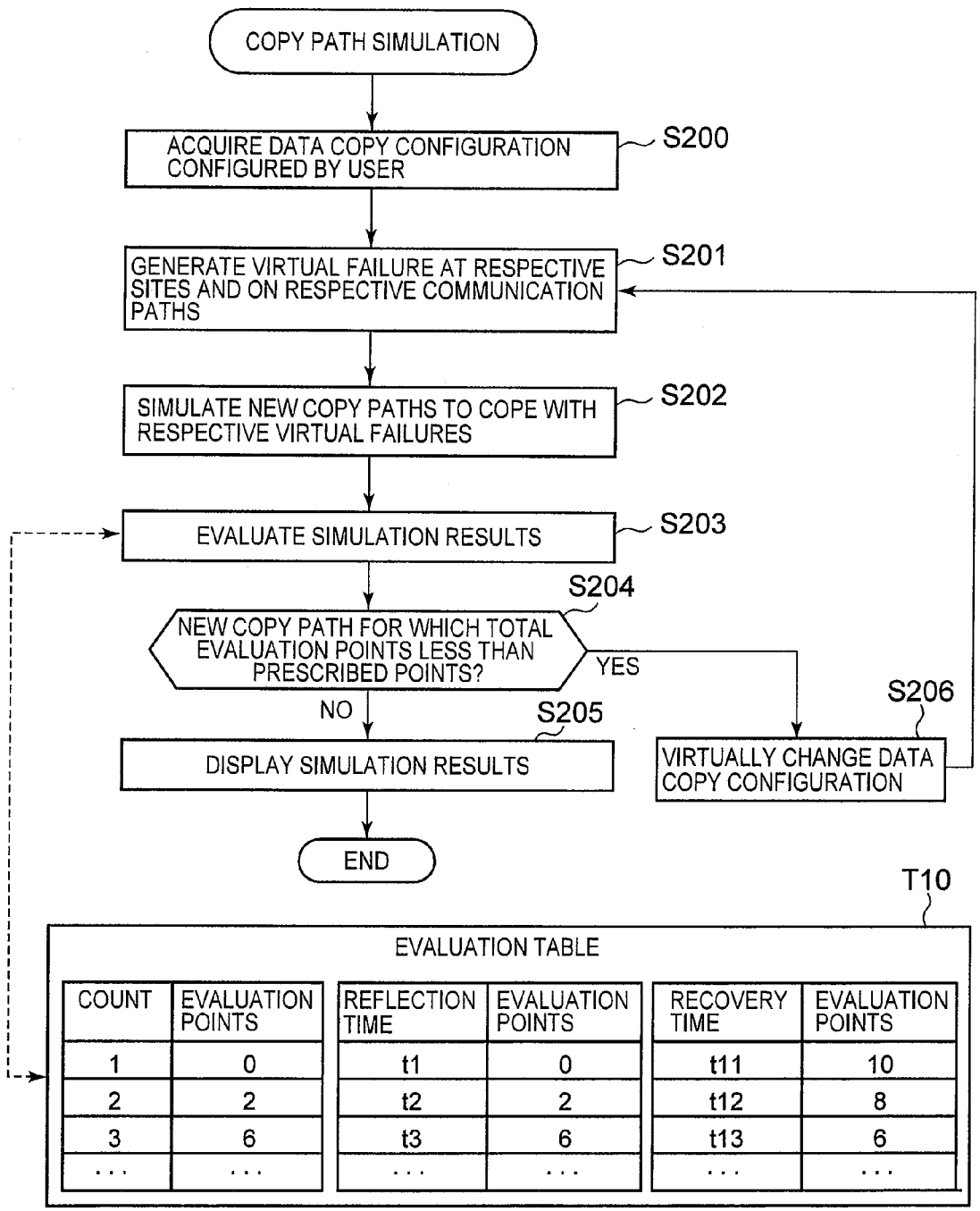
FIG. 54 is a flowchart showing a process for simulating the fault resistance of a remote copy path, which is executed in a storage system related to a fifteenth embodiment.

A fifteenth embodiment will be explained based on FIG. 54. In this embodiment, an evaluation is carried out in advance as to whether or not the user-configured remote copy configuration can withstand a failure. FIG. 54 is a flowchart showing a process for simulating a remote copy path. This process, for example, can be executed by the host 20.

The host 20 acquires the user-configured remote copy configuration (S200), and causes a virtual failure to occur in the communication paths between the respective sites (S201). The host 20 predicts new copy paths likely to be selected to recover from the virtual failure (S202), and evaluates the prediction results using an evaluation table T10 (S203).

The evaluation table T10, for example, is preset with points for each of various indices, such as the number of sites residing on the new copy path (count), the time required until data is reflected to the respective sites, and the time required for the respective sites to recover. The host 20 makes an evaluation based on the counts, data reflection times and recovery times for the new copy paths selected to cope with the virtual failure.

The host 20 determines whether or not there is a new copy path for which the evaluation points are less than a prescribed value (S204). When the evaluation points of the respective new copy paths capable of being generated in the user-configured remote copy configuration exceed a prescribed value (S204: NO), the host 20 notifies the user of the prediction results and the evaluation (S205).

When there is a new copy path having evaluation points of less than the prescribed value in a portion of the predicted new copy paths (S204: YES), the host 20, in addition to notifying the user of the prediction results and the evaluation, partially changes the remote copy configuration and returns to S201 (S206). That is, a failure evaluation is computed while automatically revising the user-configured remote copy configuration. Furthermore, when revising the remote copy configuration, it is possible to take into account the "weight" and "priority" preset by the user.

Being constituted like this, this embodiment also exhibits the same effects as the above-described first embodiment. Furthermore, in this embodiment, user usability is enhanced due to the fact that the fault tolerance of a remote copy configuration can be evaluated in advance.

Furthermore, the present invention is not limited to the embodiments described hereinabove. A person skilled in the art will be able to make various additions and changes without departing from the scope of the present invention. For example, the respective embodiments can be used in appropriate combinations. Further, although SAN and LAN were given as examples of communication protocols, the present invention is not limited to these, and, for example, can also make use of other protocols, such as iSCSI, ESCON (registered trademark), FICON (registered trademark) and so forth.

What is claimed is:

1. A storage system having a plurality of sites, comprising:
   communication paths set in advance between a prescribed plurality of sites of the respective sites;
   a copy controller for copying data among a plurality of sites pre-selected from the respective sites via a copy path, which is configured using the pre-selected plurality of sites and a plurality of communication paths pre-selected from the respective communication paths;
   a failure detector for detecting whether or not a failure has occurred during data copying by the copy controller;
   a candidate detector for detecting at least one copy path candidate when occurrence of the failure is detected by the failure detector; and
   a resume controller, which when there are a plurality of the copy path candidates detected by the candidate detector, selects one from among the plurality of copy path candidates as a new copy path, and resumes data copying by the copy controller using this new copy path,
   wherein the candidate detector detects at least one path available for the data copying based on information related to available communication paths and available sites, respectively evaluates these detected available paths based on a preset first evaluation criterion, and detects the available candidate for which the evaluation result is the best as the copy path candidate, and
   wherein the first evaluation criterion is the size of the number of the sites included in the available oaths, and the better evaluation results are obtained as the number of sites included in the available oaths increases.

2. The storage system according to claim 1, wherein the copy controller, the failure detector, the candidate detector and the resume controller are provided in each of the plurality of sites.

3. The storage system according to claim 1, wherein the failure detector detects the occurrence of the failure based on at least one of the presence or absence of a heart beat signal communicated among the respective sites, and the success or failure of communication relating to the data copying.

4. The storage system according to claim 1, wherein when a plurality of available paths have the same evaluation result according to the first evaluation criterion, the candidate detector detects any one available path as the copy path candidate in accordance with a preset second evaluation criterion.

5. The storage system according to claim 1, wherein the first evaluation criterion is the size of a weight preset for either the sites or the communication paths included in the available paths.

6. The storage system according to claim 1, wherein the first evaluation criterion is the level of priority or the size of penalty preset for either the sites or the communication paths included in the available paths.

7. The storage system according to claim 5, wherein at least one of a time required until data is stored in sites included in the available paths, and a time required to recover sites included in the available paths is used as the weight.

8. The storage system according to claim 4, wherein the second evaluation criterion is the size of a weight preset for either the sites or the communication paths included in the available paths.

9. The storage system according to claim 4, wherein the second evaluation criterion is the level of priority or the size of penalty preset for either the sites or the communication paths included in the available paths.

10. The storage system according to claim 1, wherein when there are a plurality of the candidate detectors, and when the candidate detectors each detect the copy path candidate, the resume controller evaluates the respective copy path candidates based on a preset third evaluation criterion, and selects the copy path candidate for which the evaluation result is the best as the new copy path.

11. The storage system according to claim 10, wherein the third evaluation criterion is the size of the number of the sites included in the copy path candidates, and the better evaluation results are obtained as the number of sites included in the copy path candidates increases.

12. The storage system according to claim 10, wherein the third evaluation criterion is the size of a weight preset for either the sites or communication paths included in the copy path candidates.

13. The storage system according to claim 10, wherein the third evaluation criterion is the level of priority or the size of penalty preset for either the sites or the communication paths included in the copy path candidates.

14. The storage system according to claim 1, wherein the resume controller comprises a diagnostic unit for diagnosing the availability of the selected new copy path.

15. The storage system according to claim 14, wherein the diagnostic unit allows the use of the selected new copy path when the number of sites included in the selected new copy path exceeds a preset prescribed value.

16. The storage system according to claim 1, further comprising a simulation unit, which simulates the occurrence of a failure in each element of the copy path, and which evaluates new copy paths capable of being selected when this simulated failure occurs.

17. A storage system comprising:
   N sites (where N is a natural number of not less than 4), wherein:
   (1) the sites each comprise a storage controller, which reads and writes data from and to a storage device based on an access request from an external device;
   (2) first communication paths for copying data in a preset direction are established between prescribed sites of the respective sites;
   (3) the respective sites are mutually connected via a second communication path for exchanging with other sites management information for use in data copying; and
   (4) the storage controller is provided with:
      a copy controller for copying data in a prescribed order among respective storage controllers inside a pre-selected plurality of sites of the respective sites via a copy path constituted from the pre-selected plurality of storage controllers and a pre-selected plurality of first communications paths of the respective first communication paths;
      a failure detector for detecting whether or not a failure has occurred during data copying by the copy controller;

a candidate detector, which when the failure occurrence has been detected by the failure detector, detects at least one copy path candidate which has its own site as the starting point based on the management information collected from the respective storage controllers inside other sites via the second communication path and a preset first evaluation criterion and a second evaluation criterion; and a resume controller, which, by acquiring via the second communication path the respective copy path candidates detected in the respective storage controllers inside the other sites, selects as a new copy path any one of the copy path candidates, from among the copy path candidate detected in the its own site and the respective copy path candidates detected in the other sites, based on a third evaluation criterion, and when the number of storage controllers included in the selected new copy path exceeds a preset prescribed value, resumes data copying by the copy controller using the new copy path.

18. A method for copying data among a plurality of sites, in which communication paths available for data copying are preset among a prescribed plurality of sites of the respective sites, the method executing, in the respective sites, the steps of:

performing data copying using a copy path, which is constituted from a pre-selected plurality of sites of the respective sites and a pre-selected plurality of communication paths of the respective communication paths, by receiving data from a preset copy-source site, storing this received data in its own site, and also sending the received data to a preset copy-target site;

detecting whether or not a failure has occurred during the data copying;

detecting at least one copy path candidate, which has its own site as the starting point, when occurrence of the failure has been detected;

selecting as a new copy path any one of the copy path candidates from among copy path candidates respectively detected in other respective sites, and the copy path candidate detected in its own site;

diagnosing the availability of the selected new copy path;

notifying the other sites to resume the data copying using this new copy path when the use of the selected new copy path has been allowed; and detecting at least one path available for the data copying based on information related to available communication paths and available sites, respectively evaluating these detected available paths based on a preset first evaluation criterion, and detecting the available candidate for which the evaluation result is the best as the copy path candidate, wherein the first evaluation criterion is the size of the number of the sites included in the available paths, and the better evaluation results are obtained as the number of sites included in the available paths increases.

* * * * *